(12) United States Patent
Ramsay

(10) Patent No.: US 6,210,103 B1
(45) Date of Patent: Apr. 3, 2001

(54) ROTARY SEAL AND/OR BEARING

(75) Inventor: Thomas W. Ramsay, Kitchener (CA)

(73) Assignee: A. W. Chesterton Co., Stoneham, MA (US)

( * ) Notice: Subject to any disclaimer, the term of this patent is extended or adjusted under 35 U.S.C. 154(b) by 0 days.

(21) Appl. No.: 09/052,720

(22) Filed: Mar. 31, 1998

Related U.S. Application Data

(63) Continuation of application No. PCT/CA96/00659, filed on Oct. 2, 1996.

(30) Foreign Application Priority Data

| Oct. 2, 1995 | (GB) | 9520300 |
| Oct. 20, 1995 | (GB) | 9522032 |
| Nov. 8, 1995 | (GB) | 9522902 |
| Apr. 30, 1996 | (GB) | 9608902 |
| Apr. 30, 1996 | (GB) | 9608903 |

(51) Int. Cl.$^7$ .............. F04D 29/06; F04D 29/12
(52) U.S. Cl. .......... 415/112; 415/111; 415/113; 415/26; 415/49; 415/176; 415/229; 415/230; 415/231; 384/110; 384/448; 277/318; 277/375; 277/408
(58) Field of Search ............ 415/111, 112, 415/113, 176, 229, 230, 231, 26, 47, 49; 277/318, 408, 371, 375; 384/110, 448

(56) References Cited

U.S. PATENT DOCUMENTS

| 640,059 | 12/1899 | Whitney . | |
| 969,763 | 9/1910 | Newmann . | |
| 1,122,987 | 12/1914 | Myers . | |
| 1,132,759 | 3/1915 | Bache . | |
| 1,205,449 | 11/1916 | Hart . | |
| 1,923,597 | 8/1933 | Walker . | |
| 2,711,934 | * 6/1955 | Rickenmann | 384/110 |
| 2,966,381 | * 12/1960 | Menzel | 384/110 |
| 3,558,238 | 1/1971 | Van Herpt . | |
| 3,674,355 | 7/1972 | Yearout et al. . | |
| 3,877,844 | 4/1975 | Klaus et al. . | |
| 4,462,644 | 7/1984 | Conner . | |
| 4,614,445 | 9/1986 | Gerkema et al. . | |
| 5,173,019 | * 12/1992 | Sdano | 415/112 |
| 5,238,311 | 8/1993 | Katou et al. . | |
| 5,246,294 | * 9/1993 | Pan | 384/110 |
| 5,333,955 | 8/1994 | Papa . | |
| 5,827,042 | * 10/1998 | Ramsay | 415/112 |
| 5,984,627 | * 11/1999 | Ramsay | 415/112 |

FOREIGN PATENT DOCUMENTS

| 95/08067 | 3/1995 | (WO) . |
| 95/35457 | 12/1995 | (WO) . |

\* cited by examiner

*Primary Examiner*—Christopher Verdier
(74) *Attorney, Agent, or Firm*—Rockey, Milnamow & Katz, Ltd.

(57) ABSTRACT

For an impeller pump, the seal/bearing unit has two rotor-stator pairs of tapered sleeves arranged back-to-back. The sleeves have a spiral groove, and convey barrier-liquid from an entry-mouth in an entry-chamber to an exit-mouth in an exit-chamber. Having two sleeves gives the units mechanical stability, thrust support capability, and resistence to vibrations and other abuses. The tapered sleeves may be arranged wide-narrow-wide, or narrow-wide-narrow. The sleeves may be mounted for sliding in the housing and on the shaft, or may be fixed to the housing or shaft.

19 Claims, 43 Drawing Sheets

ROTARY SEAL AND/OR BEARING

This application is a continuation of PCT/CA96/00659, filed Oct. 2, 1996.

The invention relates to a development of the technologies shown in patent publication WO-95/35457 (RAMSAY) published Dec. 28, 1995 (based on PCT/CA-95/00362) and also the U.S. patent issued thereon, U.S. Pat. No. 5,827,042.

BACKGROUND TO THE INVENTION

In FIG. 10 of RAMSAY, there is shown a bearing/seal system for a pump drive-shaft, based on the use of a tapered sleeve. The sleeve is cut with grooves, which, by virtue of the rotation of the sleeve, serve to pressurise a barrier liquid, and to drive the barrier liquid towards the process fluid being pumped. As described, the tapered sleeve arrangement serves as a bearing, which is located advantageously close to the pump impeller, and is a very efficient seal.

In RAMSAY, however, as far as the bearing is concerned, only a journal bearing capability was provided, in that the tapered sleeve was allowed to float axially, along the pump drive shaft. The axial or thrust location of the shaft was handled by a separate ball-bearing.

GENERAL FEATURES OF THE INVENTION

The present invention serves as a rotary-interaction apparatus. In one preferred option, the apparatus is formatted as, and used as, a bearing—either a journal bearing, or a combined journal-and-thrust bearing. In another preferred option, the apparatus is formatted as, and used as, a seal, for example in a pump, for sealing the pump shaft against escape of process fluid.

The apparatus includes a first pair of sleeves, comprising a first rotor sleeve and a first stator sleeve, having surfaces which together define a first surface-to-surface interface between them, the interface being of a first tapered configuration. The interface-surface of the first rotor-sleeve is provided with a first spiral groove, having an entry-mouth in liquid-flow-communication with an entry-chamber, for the supply of barrier-liquid into the groove. The first-spiral-groove is so disposed in the interface-surface of the first rotor-sleeve as to define plain lands of substantial width between adjacent turns of the groove, the lands being of such dimensions and configuration as to comprise, during rotation, a means for creating and supporting a hydrodynamic film of barrier-liquid between the interface-surfaces of the first pair of sleeves.

The apparatus also includes a second pair of sleeves, having characteristics similar to those of the first pair. The exit-mouth of the groove of the second pair of sleeves discharges barrier-liquid into an exit chamber.

Each of the pairs of sleeves may be understood as being derived, individually, from the RAMSAY reference.

Preferably, the first and second pairs of sleeves are arranged in the apparatus with the first and second tapered interfaces thereof in a co-axial, in-line, end-to-end, relative configuration.

As a seal, the two-pairs-of-sleeves apparatus is an excellent means for sealing a rotary shaft in a machine, for example a pump-housing. In a typical impeller-pump, the two sleeves can have an aggregate groove length of well over a foot (12 inches), and a correspondingly long aggregate interface, so the pressure-differential-gradient along the length of the interfaces may be very small.

Basically, the interfaces are not subject to wear under steady running conditions, if the hydrodynamic film remains stable operationally. Besides, as will be explained, any wear that might take place can be compensated for by biassing.

As a seal, it is simple enough, as will be explained, to arrange for the sleeves apparatus to be sealed off from, or to be open to, the process fluid, as operational requirements may dictate. It is also simple enough, as will be explained, for the pressures in the barrier-liquid to be monitored, to be compared with process pressure, to be regulated, etc. in accordance with operational requirements.

As a seal, the apparatus is tolerant of vibrations or sudden loading abuse, and is secure, reliable, and long lasting.

As a bearing, the apparatus makes an excellent bearing for supporting a rotary shaft in a housing or fixed frame. As a bearing, the apparatus is especially suitable for shafts that experience only light journal loads, such as the shafts of impeller-pumps when driven via a torque-only coupling. As a bearing, the apparatus is excellent at coping with vibrations, out-of-balance forces, and abusive factors (such as cavitation, dead-heading, etc), which can arise occasionally, either suddenly and shortlived, or gradually and progressively, and which can lead to a reduction in the length of service life.

As a bearing, the interfaces are lubricated by the barrier-liquid, and the hydrodynamic film ensures that direct contact sleeve-to-sleeve does not occur—at least during normal operation. Occasional abuse might cause the sleeves to touch, but the fact that two pairs of sleeves are present means that the interface area is very large, and occasional touching is insignificant.

Even if prolonged touching did occur, perhaps because of a change in operating conditions, because the interfaces are so large it is unlikely that failure would be immediate. Rubbing interfaces could be expected to last long enough for correction or repair to be planned for, with minimum disruption to the operation of the machine.

As a bearing, the apparatus has a very reliable lubrication system. Of course, if all the barrier-liquid leaks away, the bearing will fail. But it may be noted that the barrier-liquid only needs to be present at the entry chamber: there is no need for the barrier-liquid to be pressurised. Once the liquid enters the first groove, it is picked up by the groove and forced, under gradually increasing pressure, through the grooves and the interfaces, by the action of the groove itself.

It may be noted that in other lubrication systems that involve the circulation of liquid lubricant, the most common cause of failure is the circulation pump; in the present case, the "circulation pump" is actually a built-in facet of the bearing interface.

The barrier liquid may be oil, or may contain a trace of oil, but an aim of the invention is to provide a system that can use water as the barrier liquid. In pumping generally, it is a common requirement that leakage of process fluid to atmosphere is a secondary failure mode: that is to say, that the primary failure mode is that the barrier liquid leaks to atmosphere, or the barrier liquid leaks into the process fluid. In other cases, contamination of the process fluid by the barrier-liquid is paramount. The invention allows water to be used as the barrier-liquid, and enables a number of different failure modes to be engineered into the design, as will be explained, which makes the apparatus of the invention very versatile as to its applicability.

One noteworthy area of application of the invention is in magnetic-drive (mag-drive) pumps, of the kind in which the impeller shaft is placed inside an isolation chamber, and is driven magnetically through the walls of the chamber. In mag-drive pumps, the difficulty has been to separate the process fluid from the lubricant for the impeller-shaft-bearings. The invention permits this to be done in a mag-drive pump in a highly reliable manner, as will be explained.

As a bearing, the apparatus is axially long, which gives a good bearing spread, for stability during running. When the apparatus is used as a seal and a bearing combined, as in an impeller-pump, there is no need for a seal (or at any rate, no need for an axially-long seal) between the seal/bearing apparatus and the impeller on the end of the shaft. In other words, the overhang of the impeller beyond the bearings can be effectively zero. This lack of overhang also makes for excellent stability during running.

Also, the lack of overhang, even though the bearing is long, means the rotary-shaft can be thinner. In rotary machines, the major cost determinant usually is the base diameter of the shaft.

As will be described, it can be arranged that the interface clearance, i.e the clearance that is filled or bridged by the hydrodynamic film, can find its own dimensions; in that case, the slack or play in the bearing is effectively zero, and remains zero throughout the life of the bearing.

The apparatuses as described herein can be expected, under the correct operating conditions, to be unaffected by vibration, cavitation, dead-heading, and sudden shock-loading. Although nothing can be guaranteed 100%, the apparatus virtually eliminates the possibility of shaft run-out over a long service life—even if the impeller should go out of balance in such a manner as by losing a blade.

DETAILED DESCRIPTION OF PREFERRED EMBODIMENTS

By way of further explanation of the invention, exemplary embodiments of the invention will now be described with reference to the accompanying drawings, in which.

Figure 1:
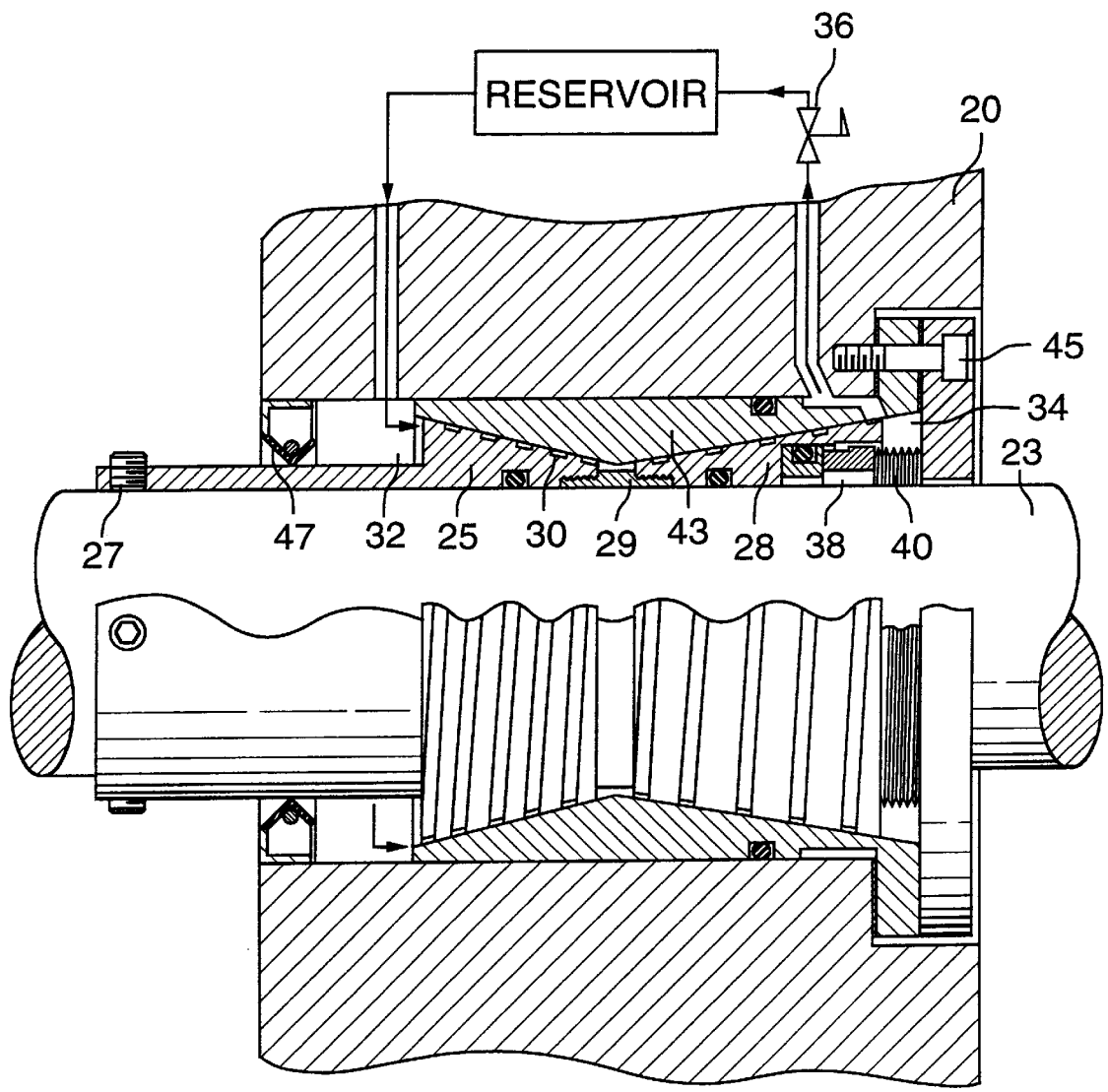
FIG. 1 is a cross-sectioned side elevation of a pump, having an electric motor to the left and an impeller to the right.
Figure 11:
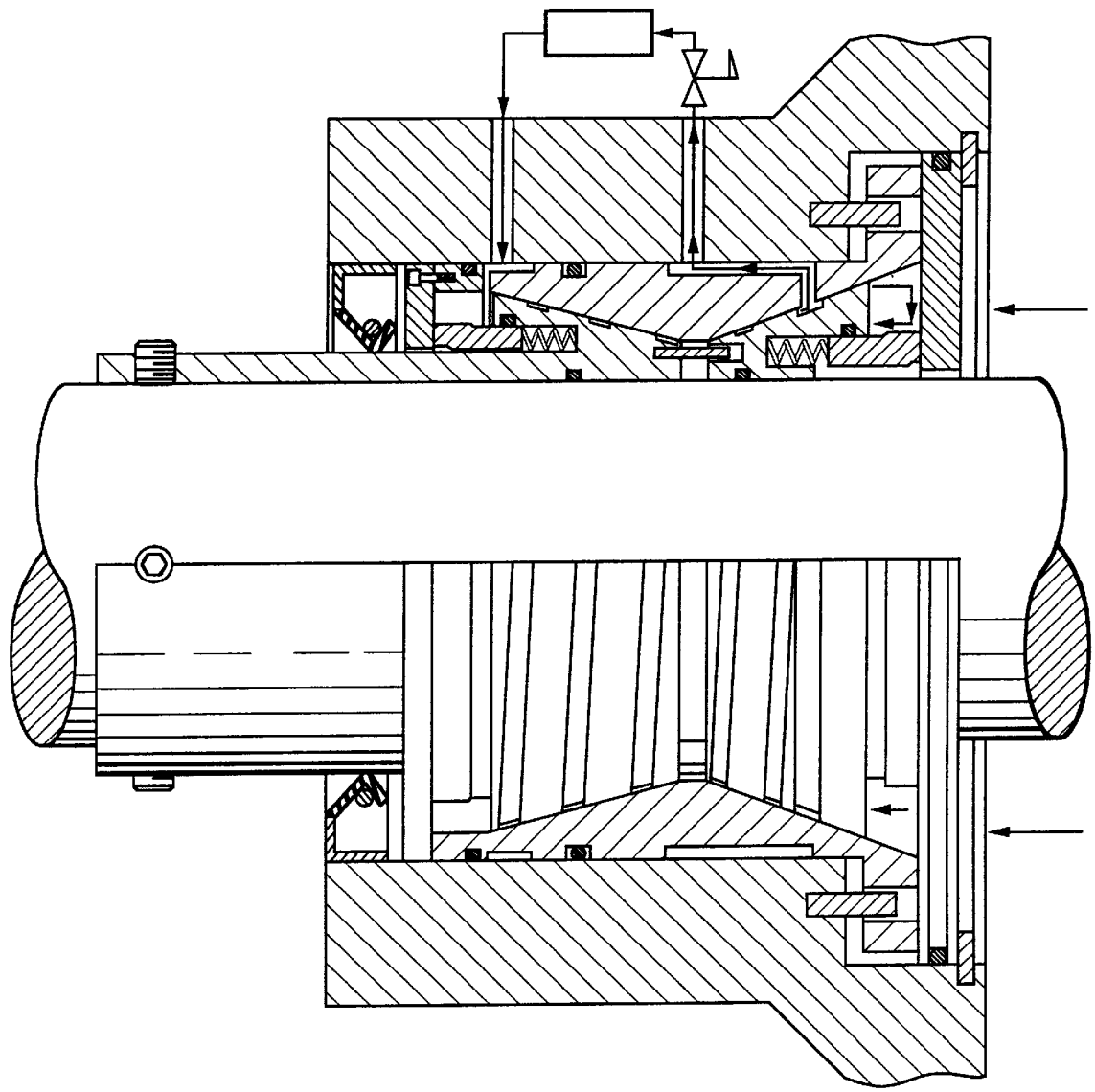
FIG. 11 is a corresponding section of another pump with an outboard lip seal behind a mechanical seal.
Figure 12:
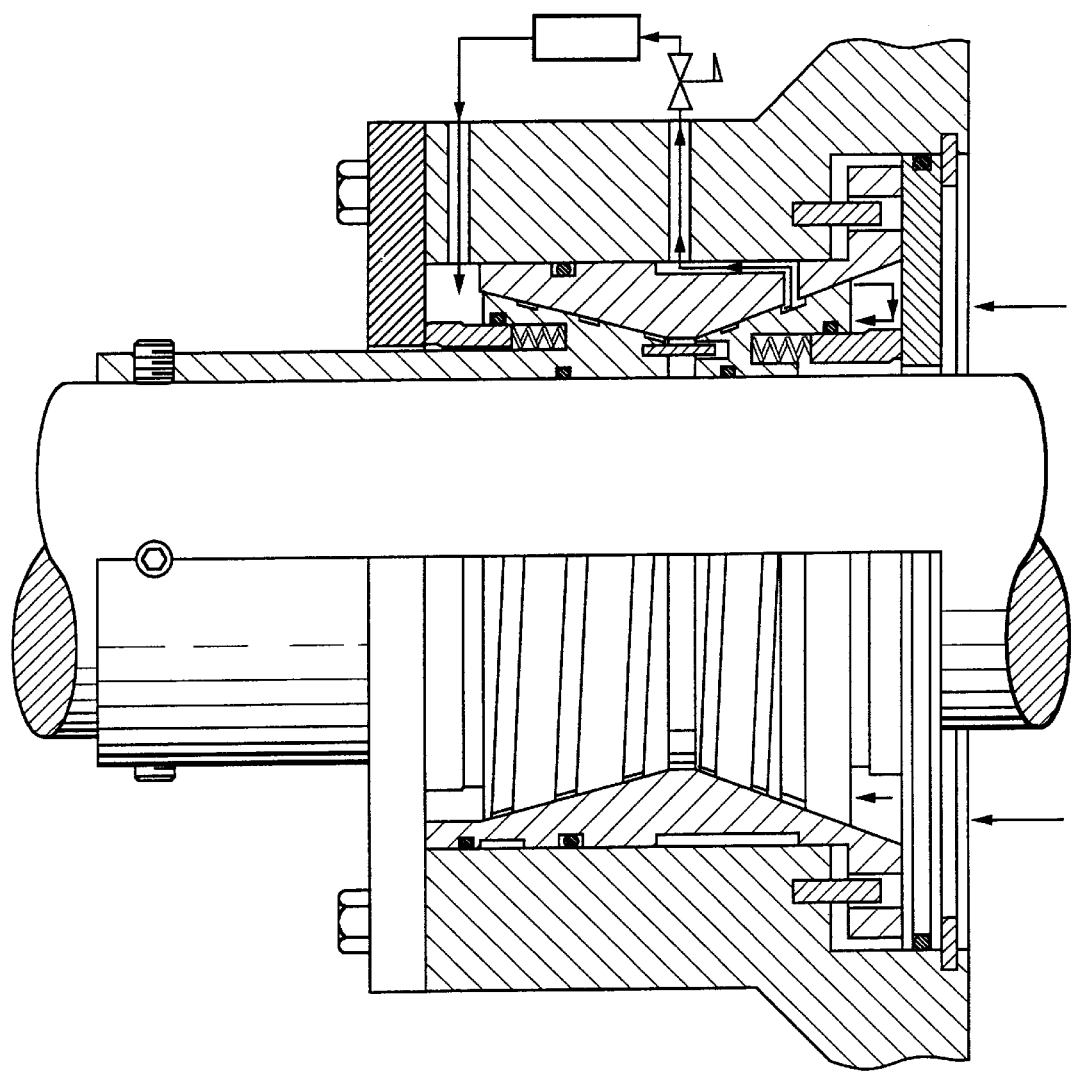
Figure 13:
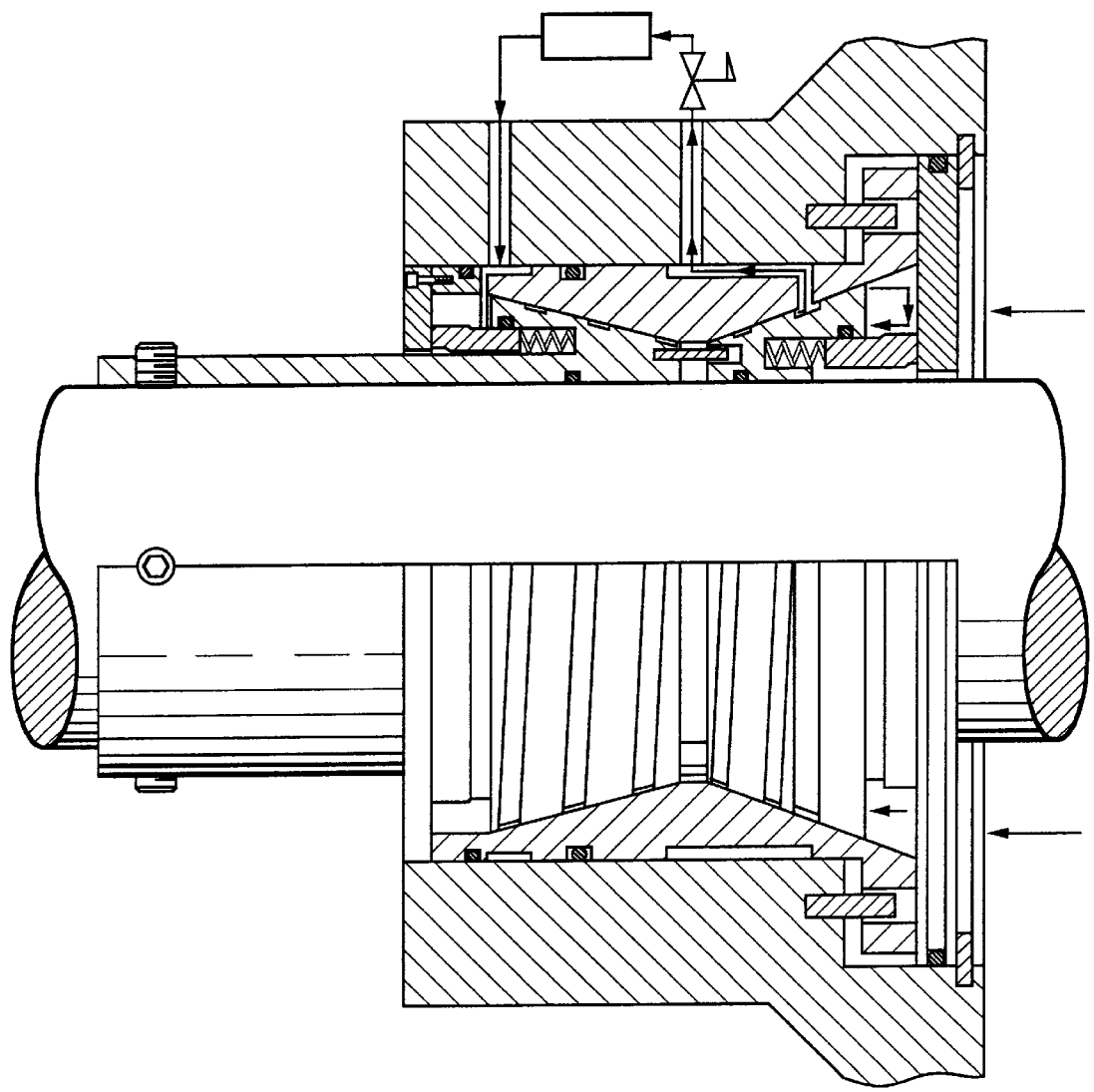
Figure 14:
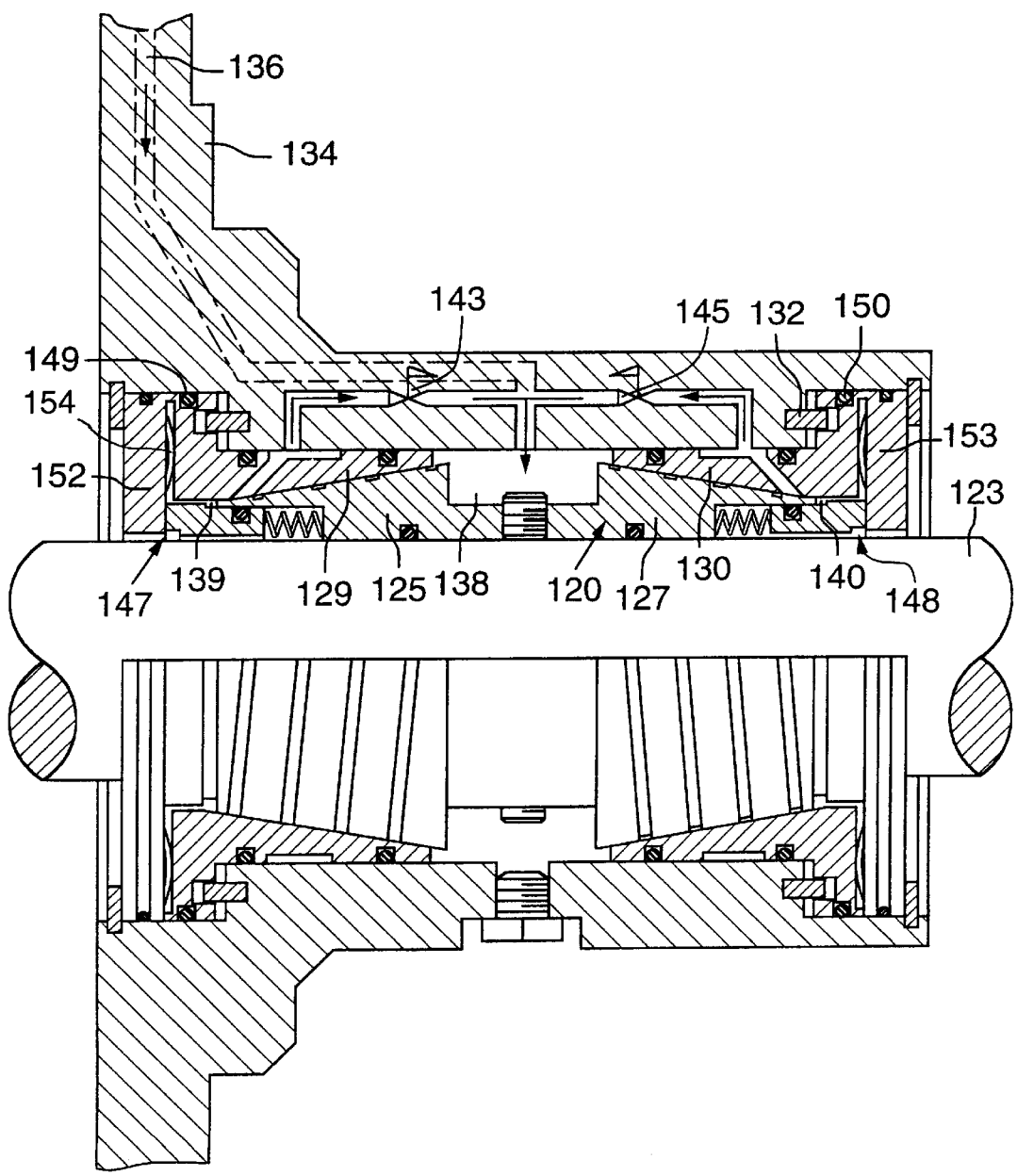
Figure 15:
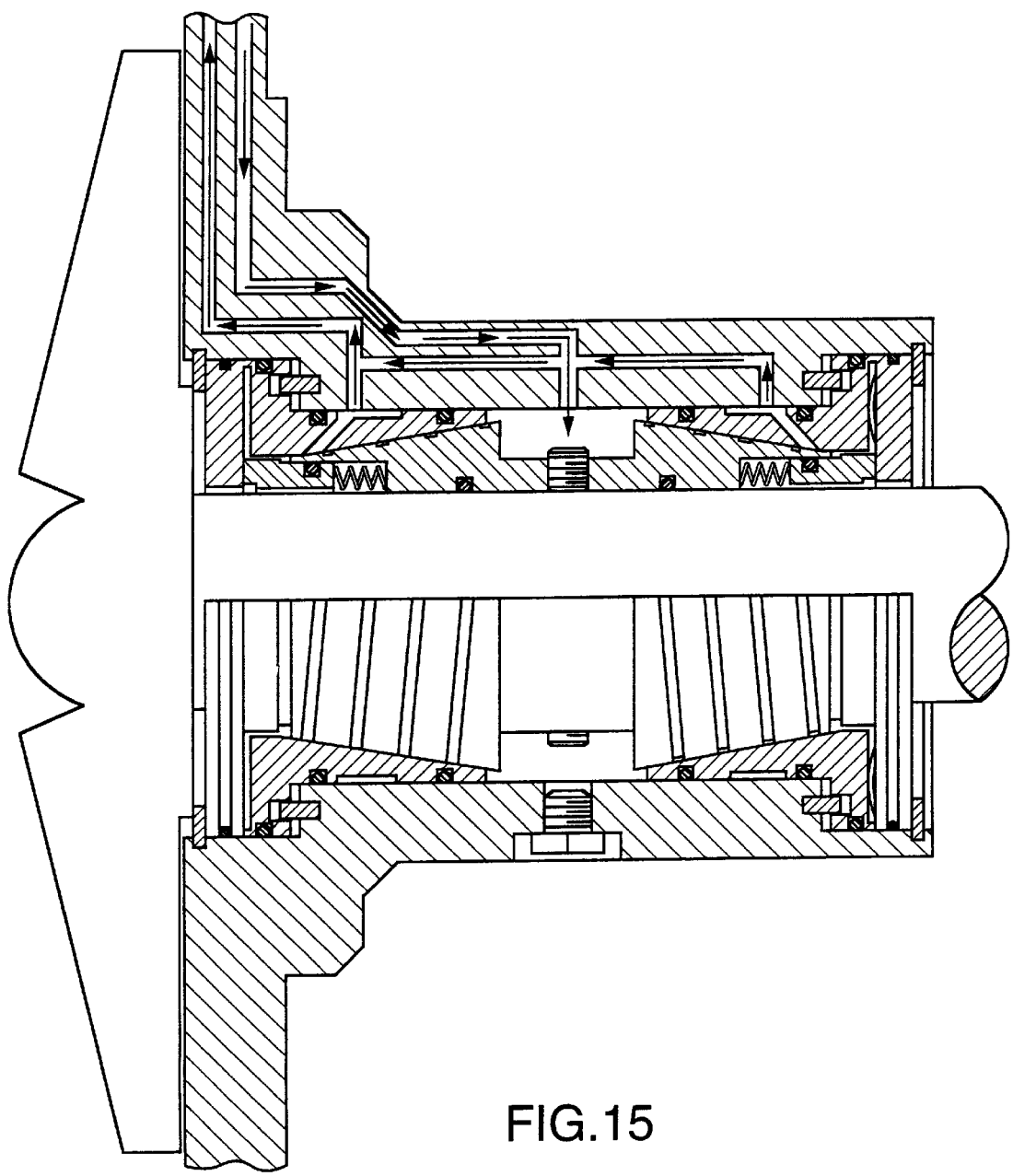
Figure 16:
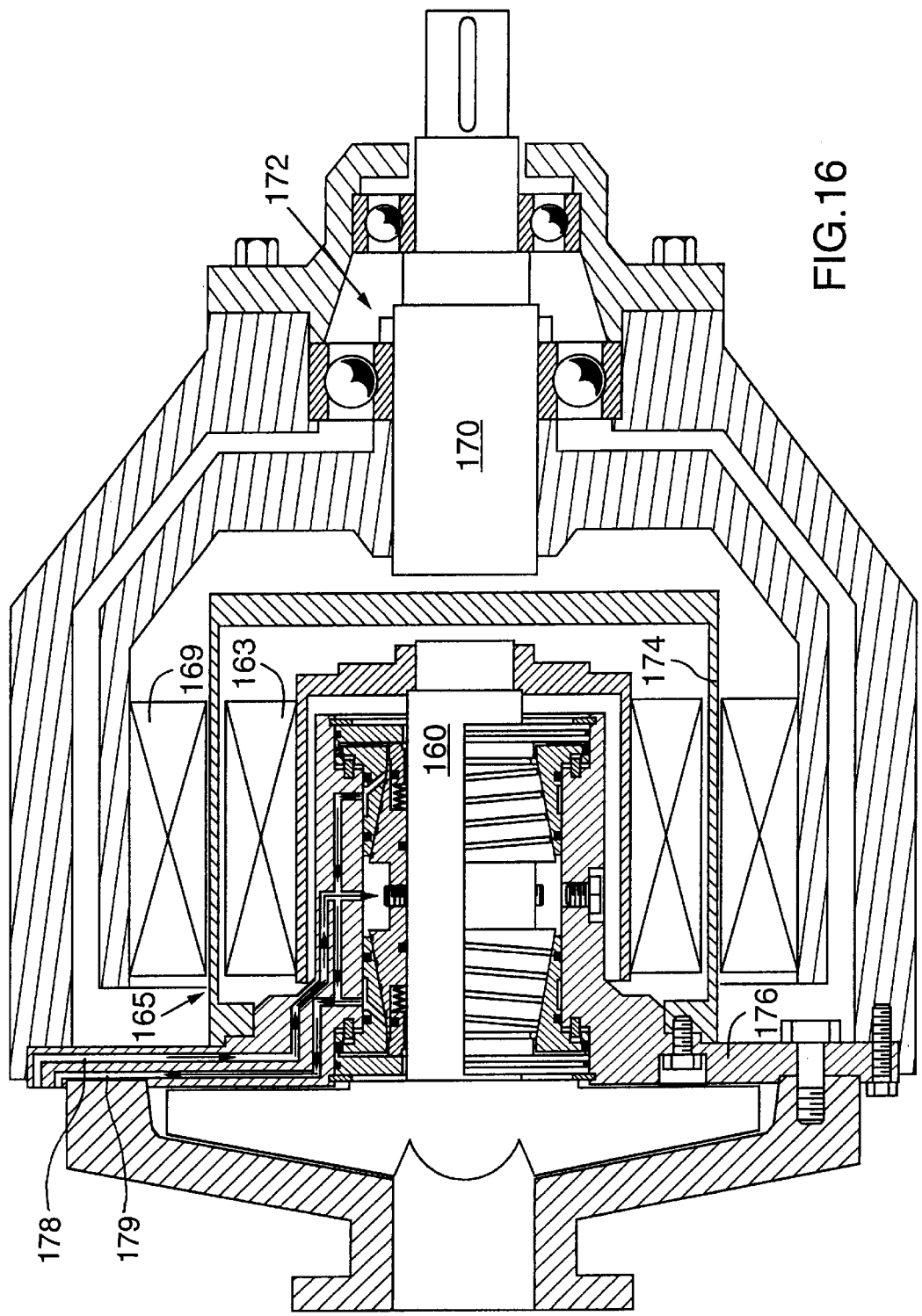
Figure 17:
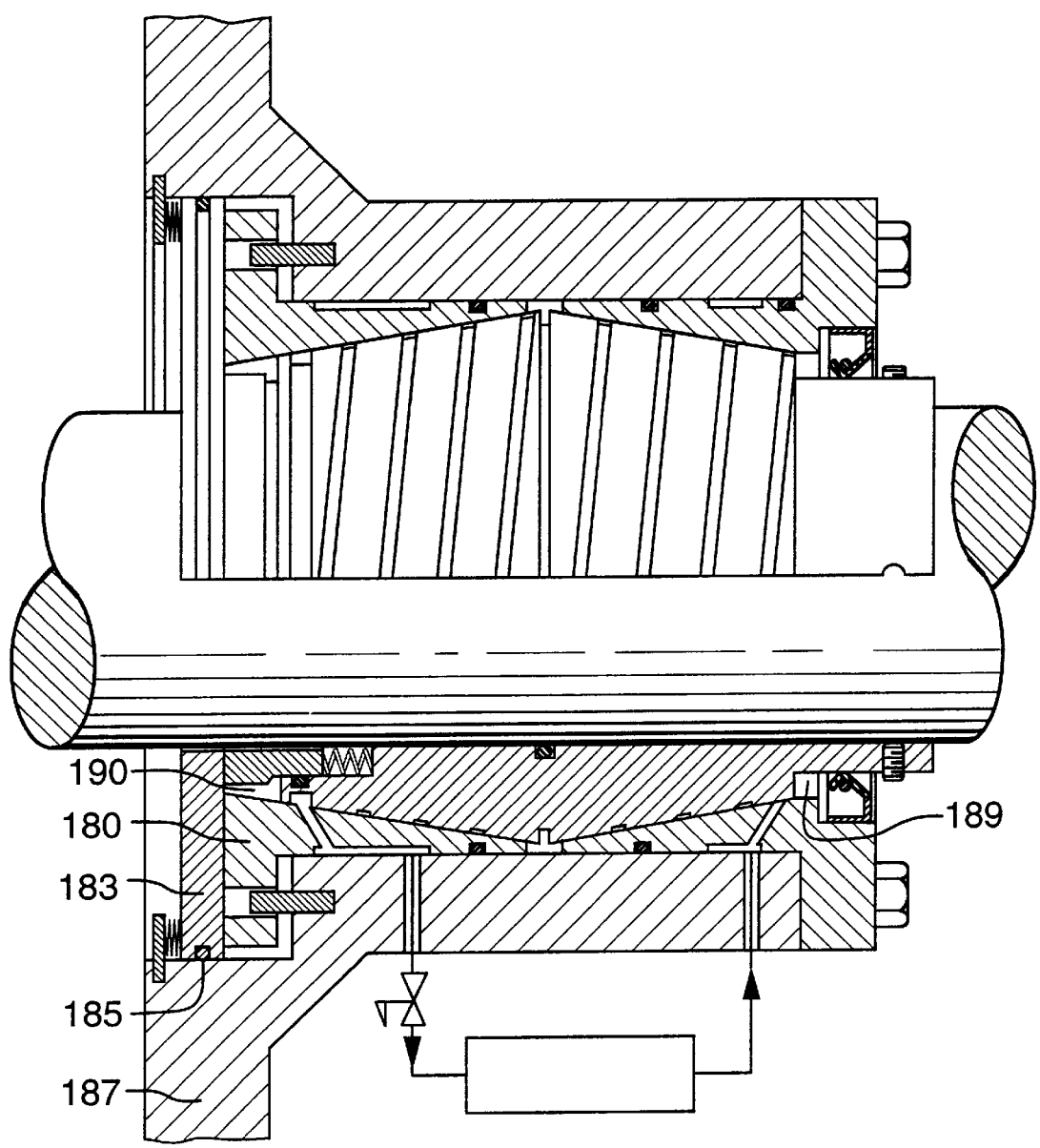
Figure 18:
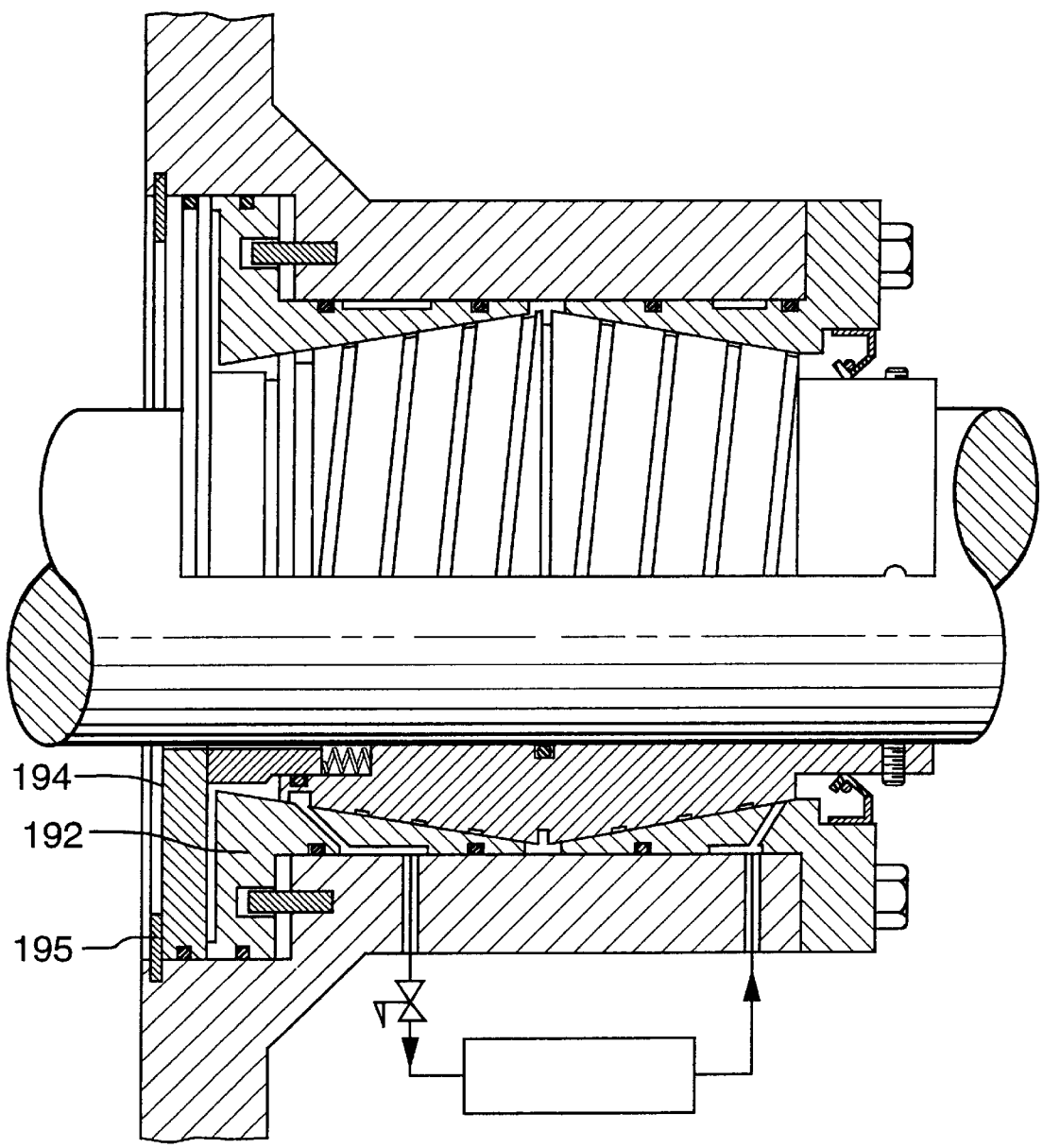
Figure 19:
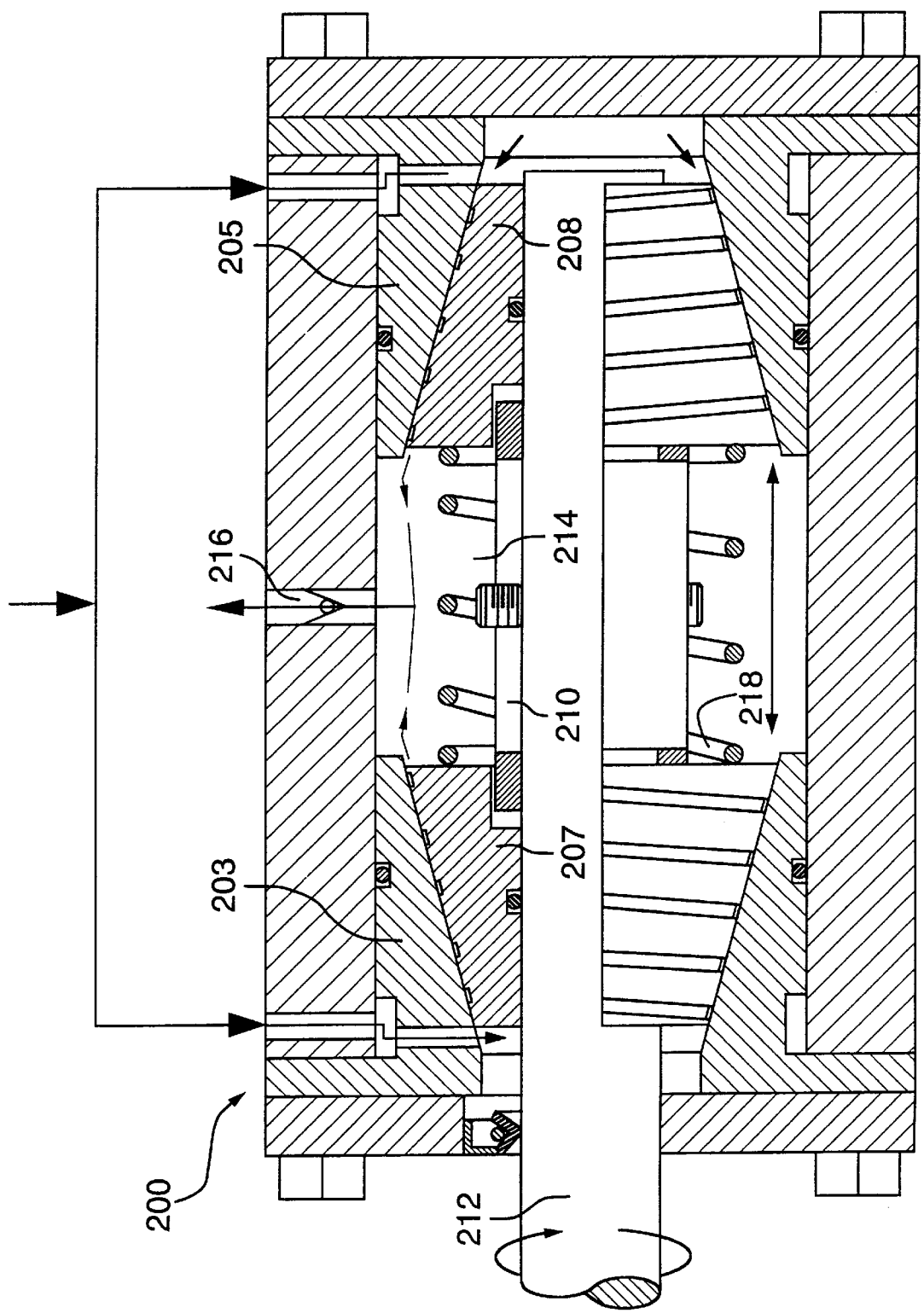
Figure 20:
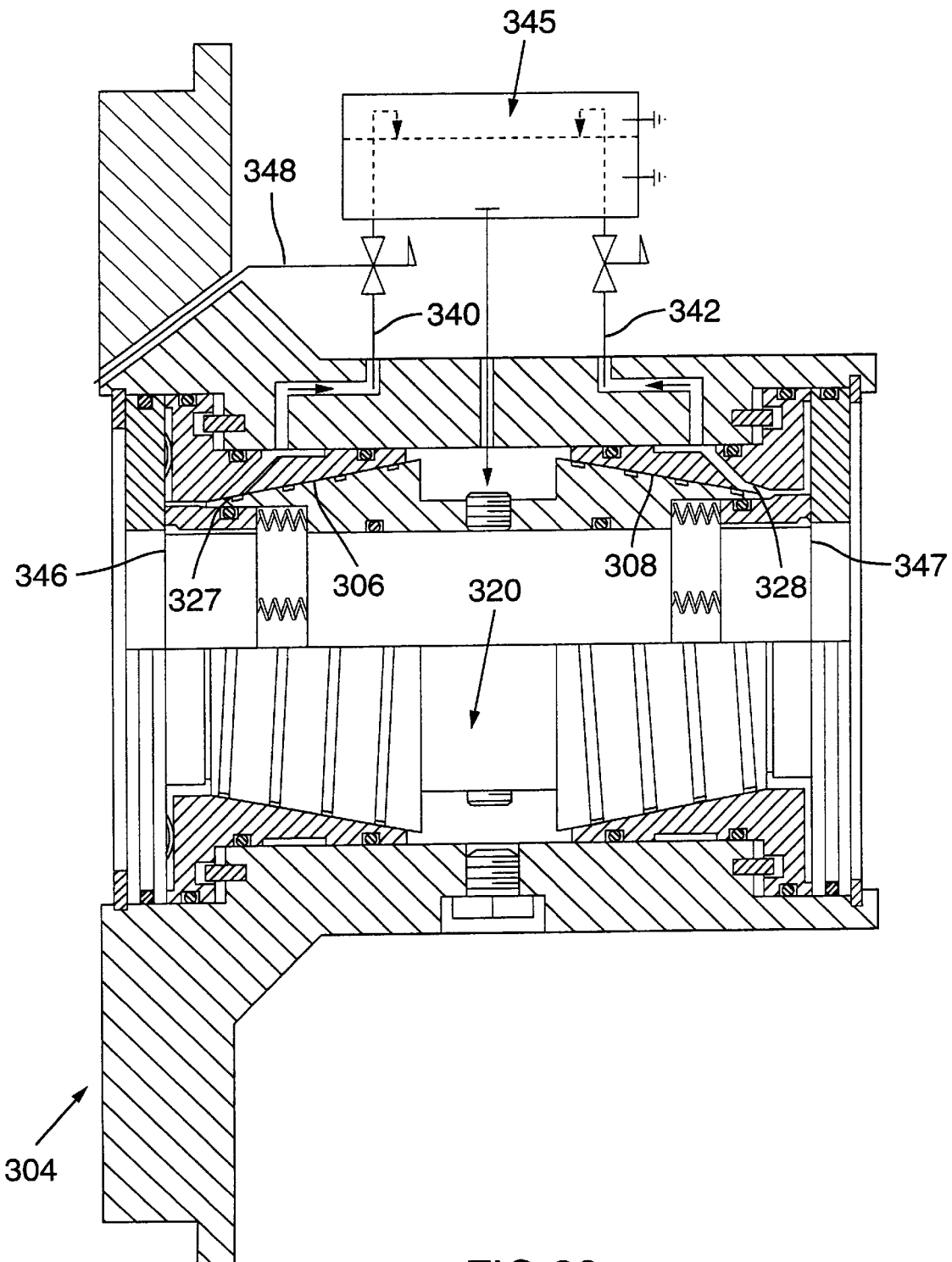
Figure 20A:
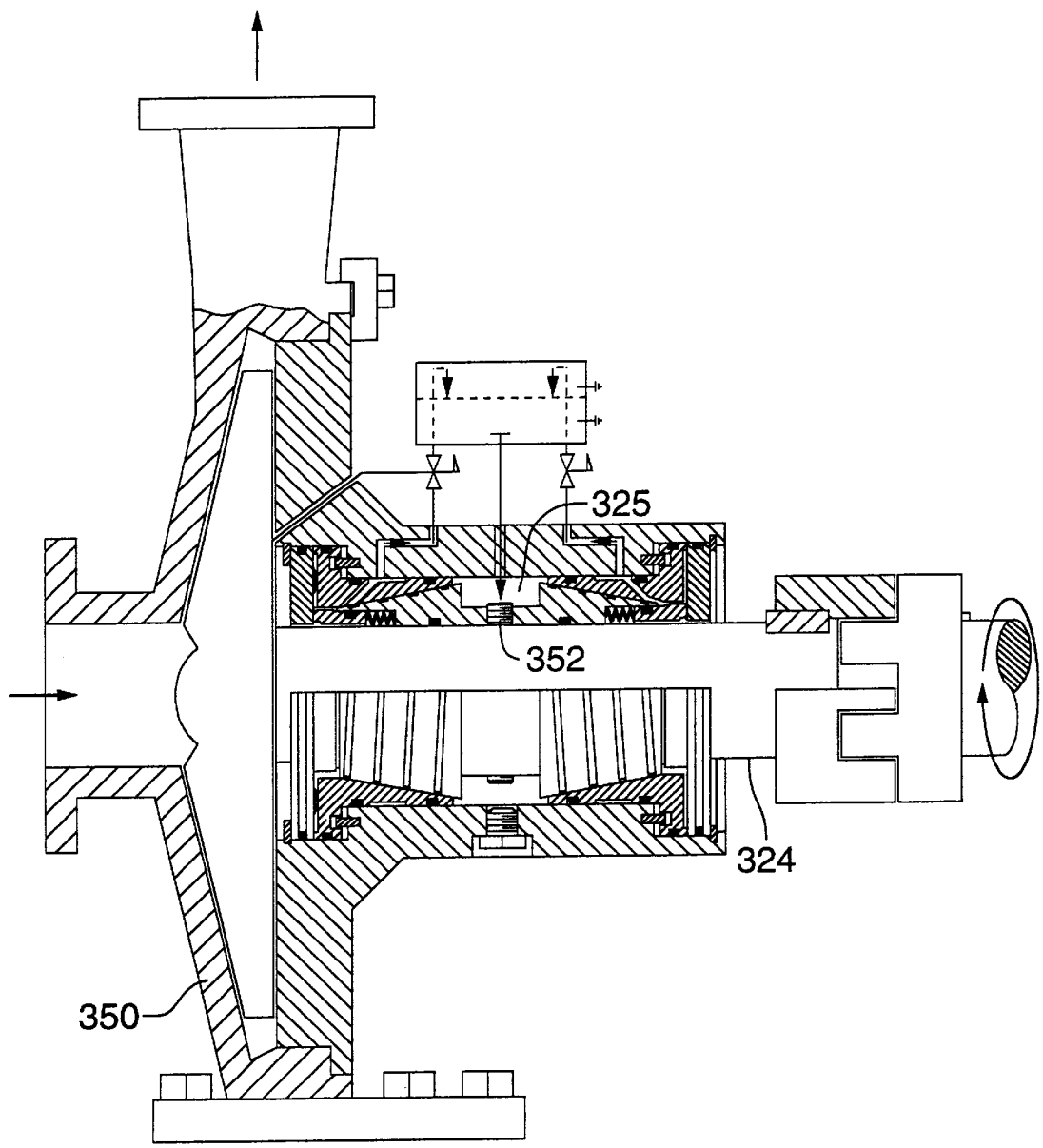
Figure 21:
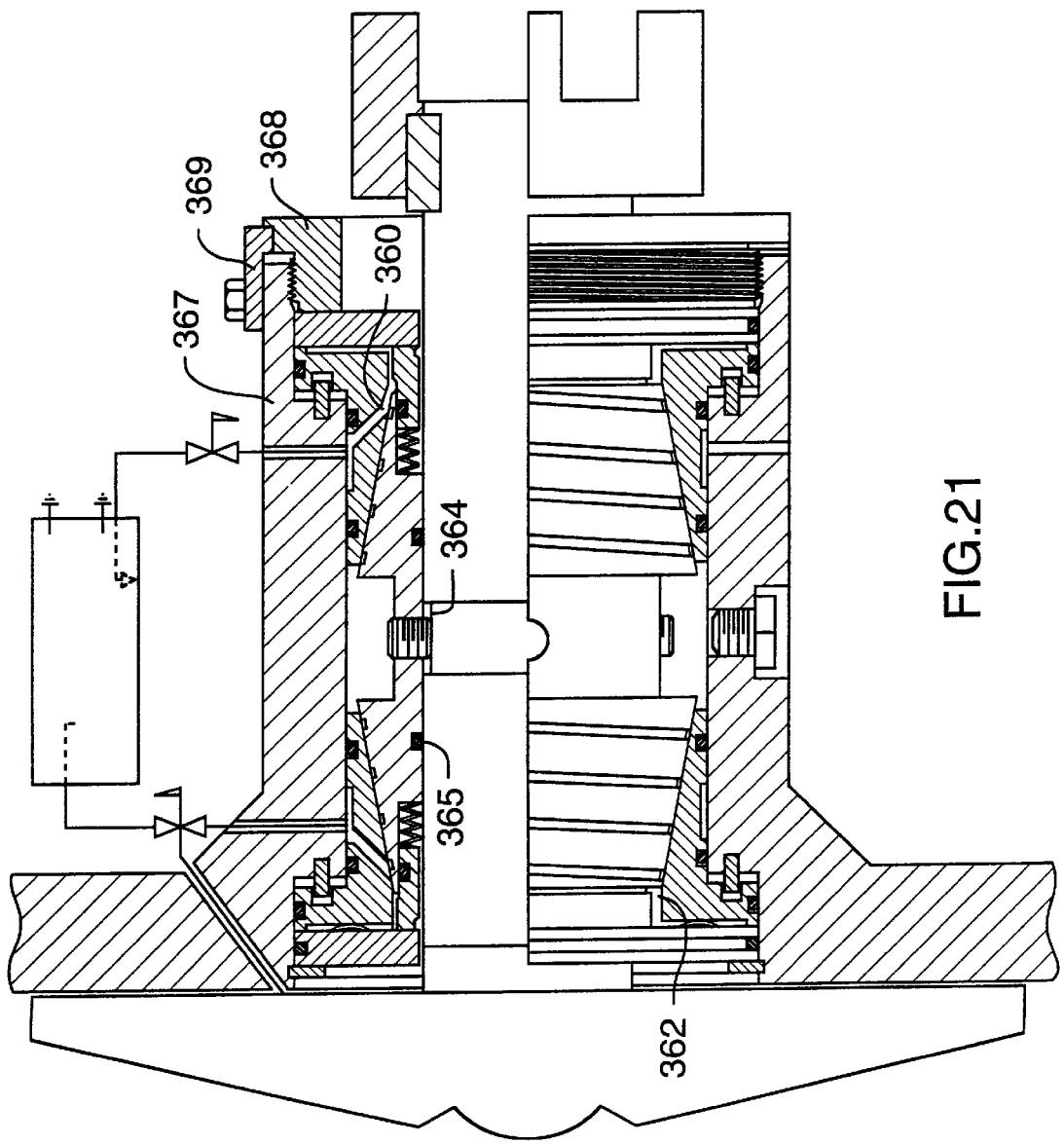
Figure 22:
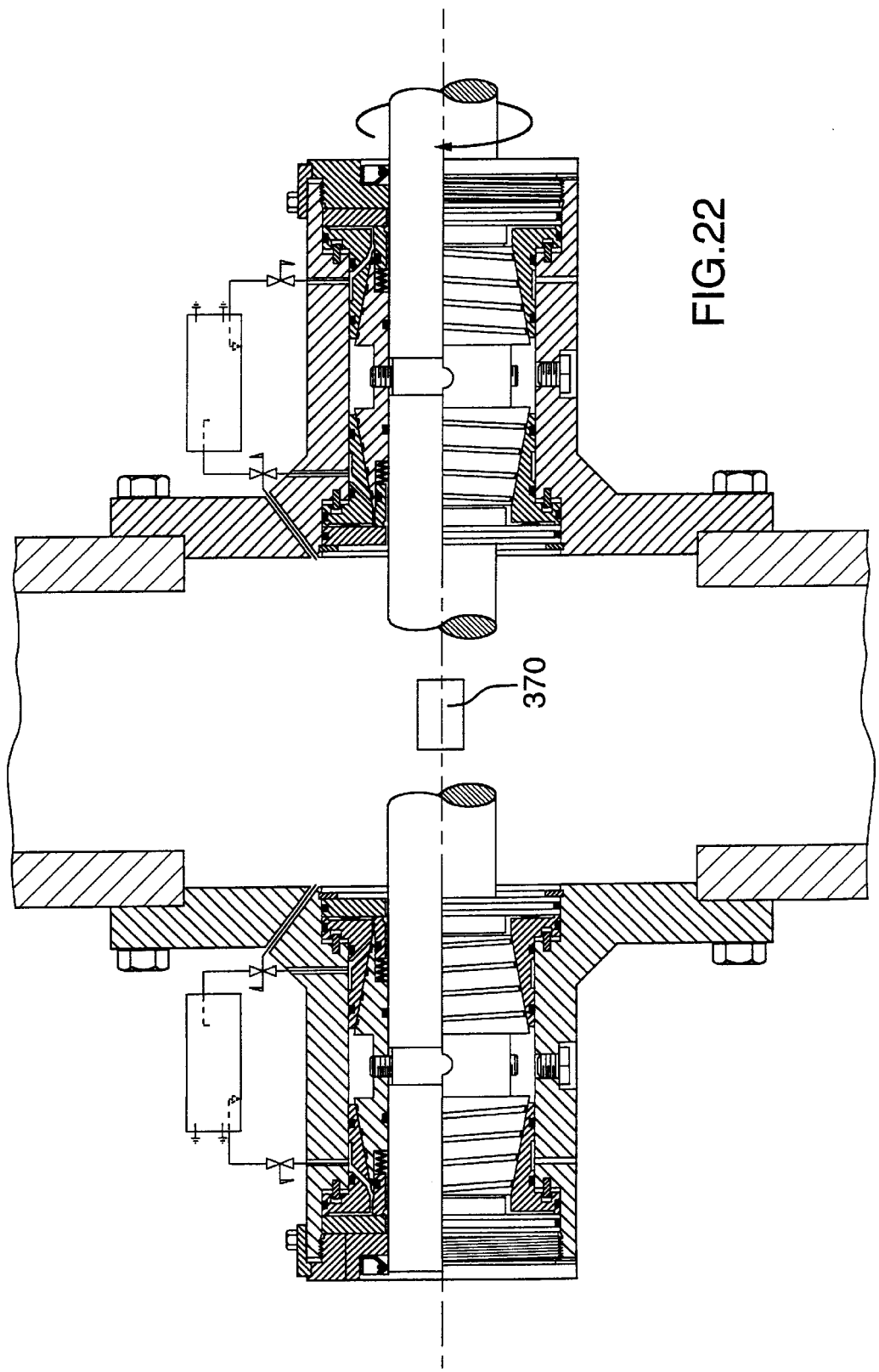
Figure 23:
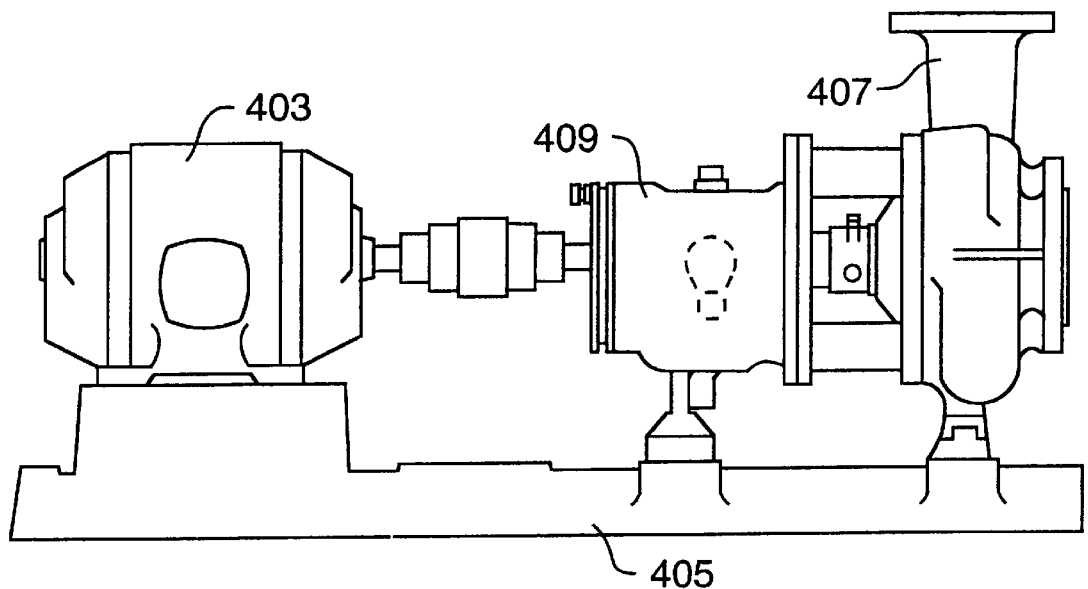
Figure 24:
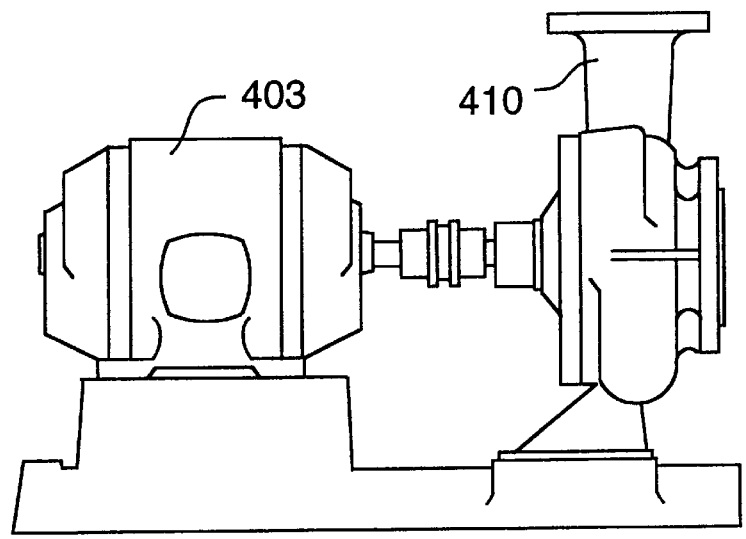
Figure 25:
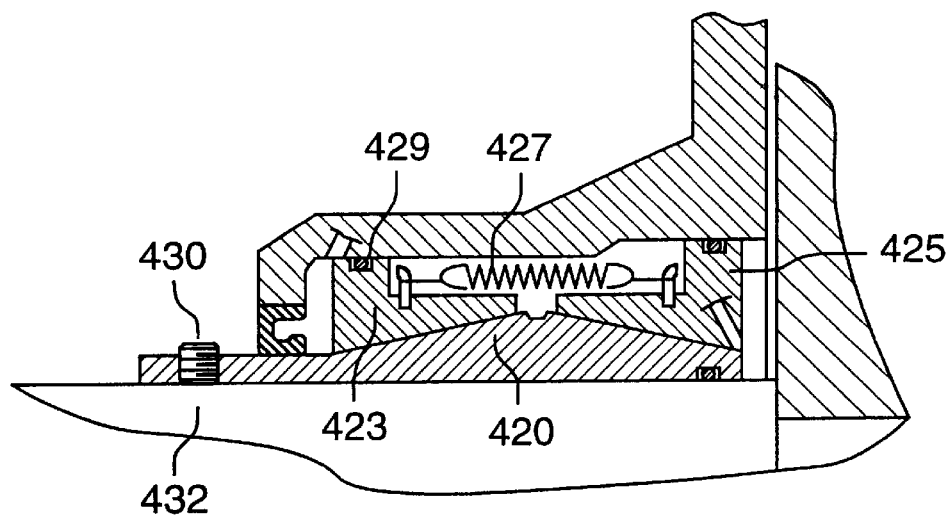
Figure 25A:
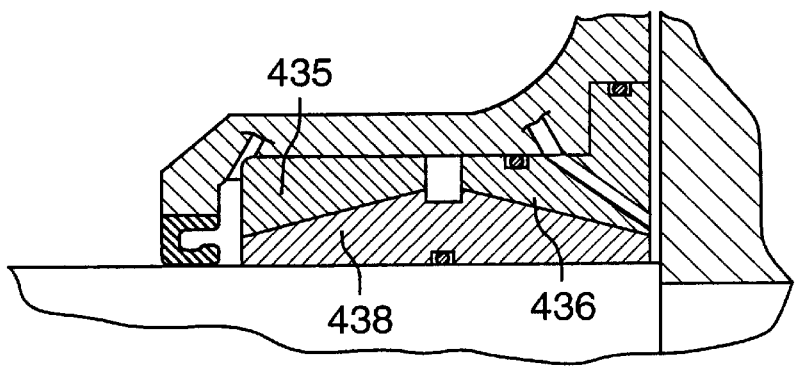
Figure 26:
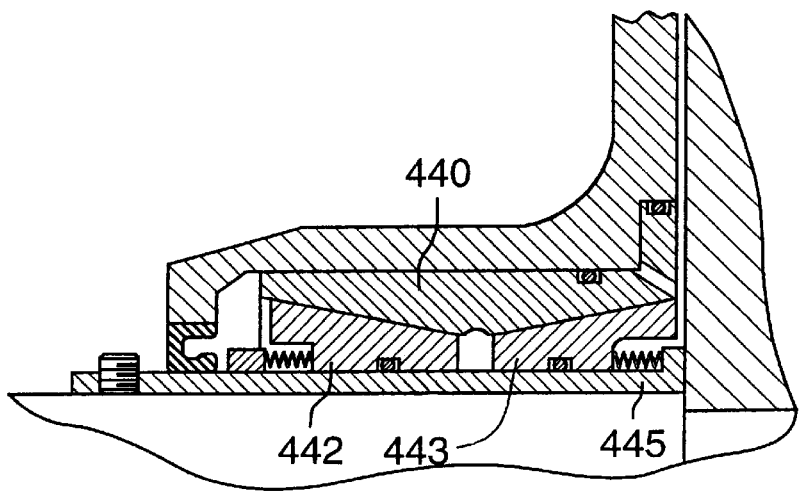
Figure 27:
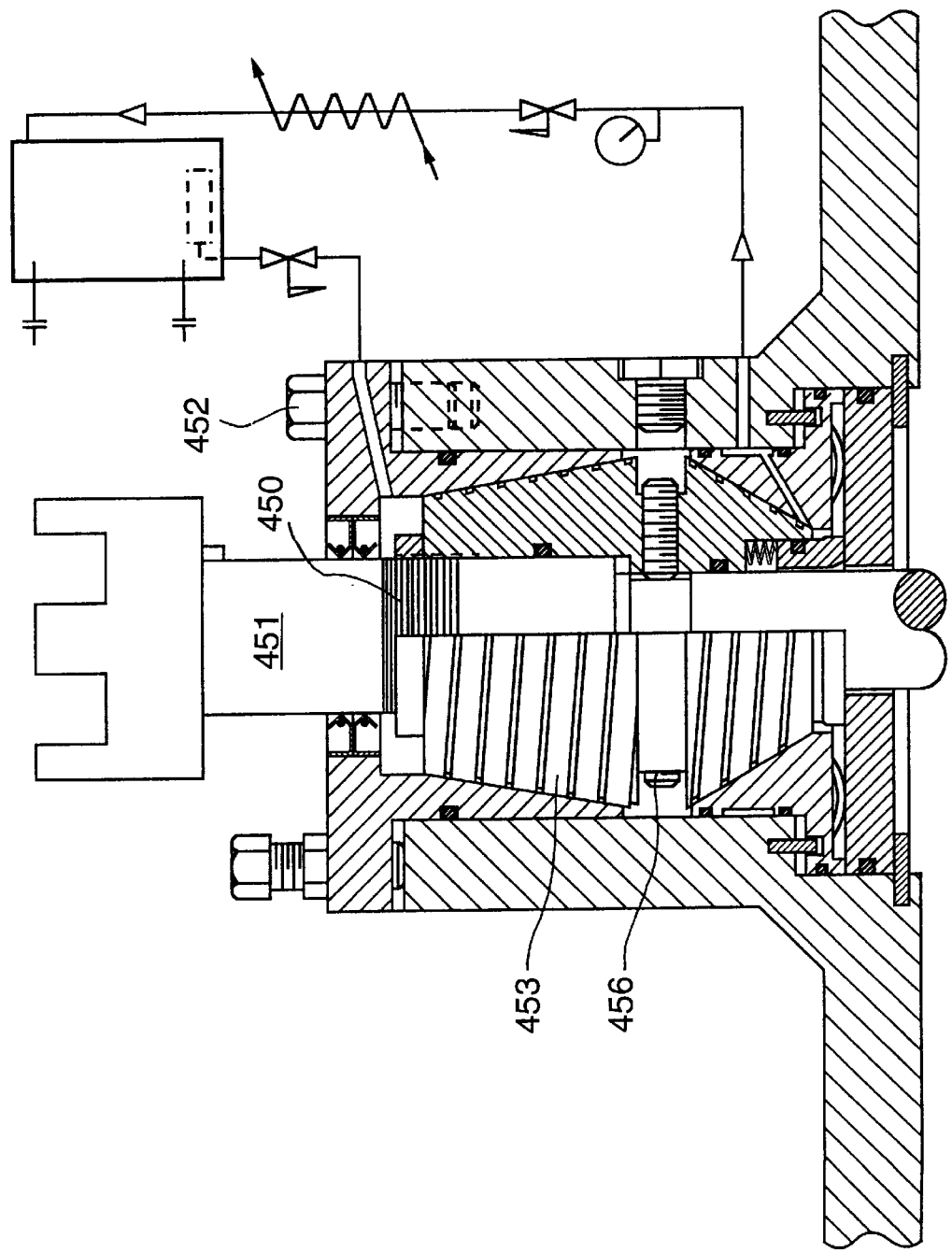
Figure 28:
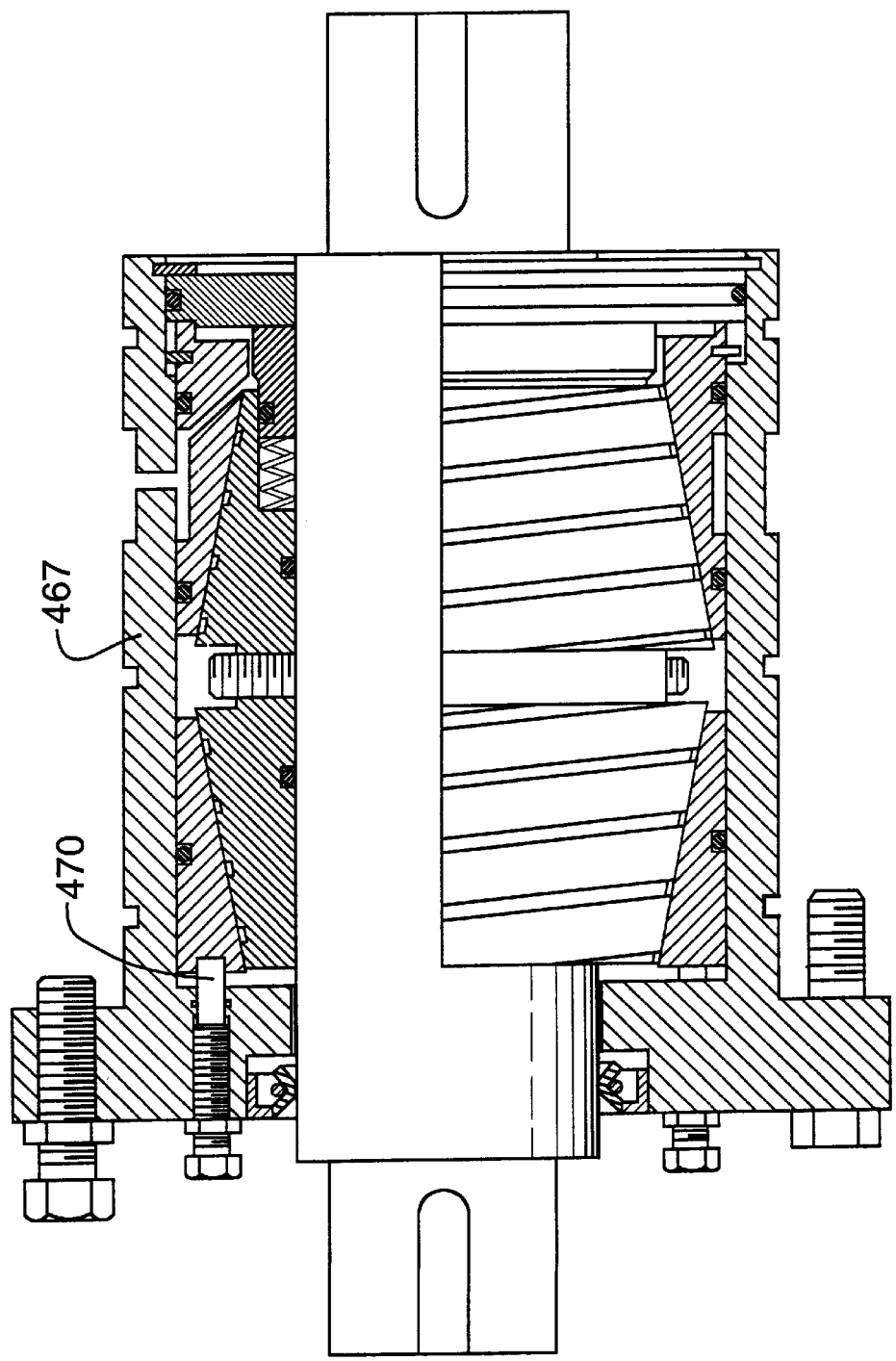
Figure 29:
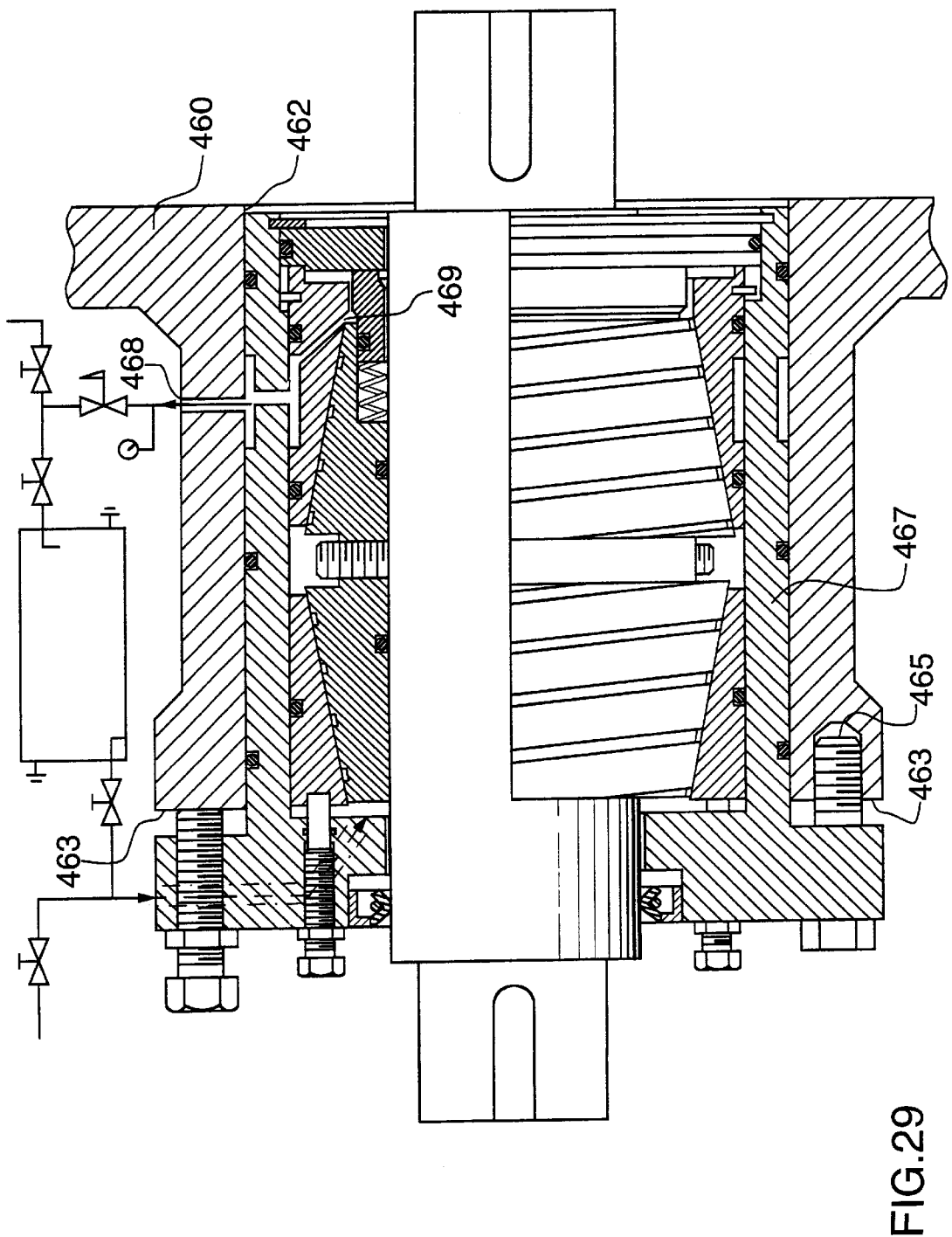
Figure 30:
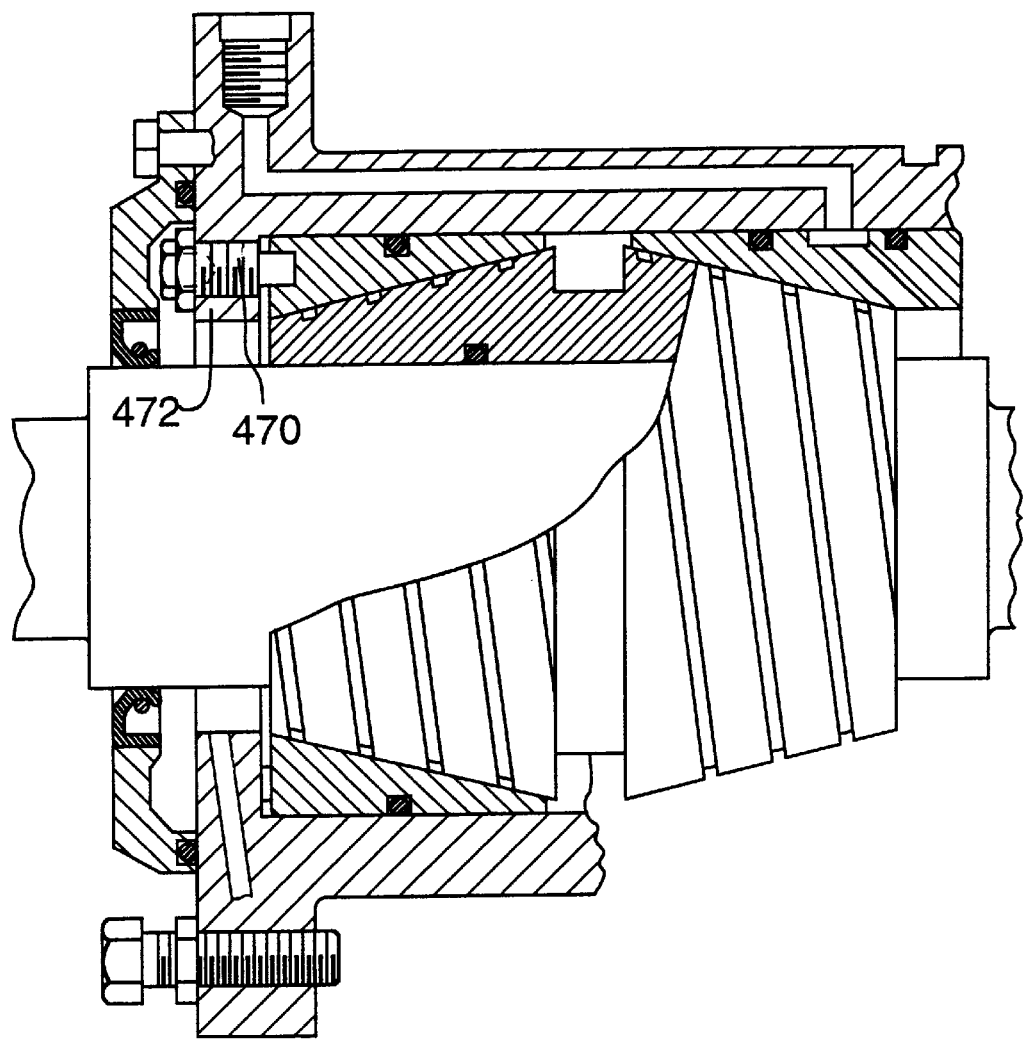
Figure 31:
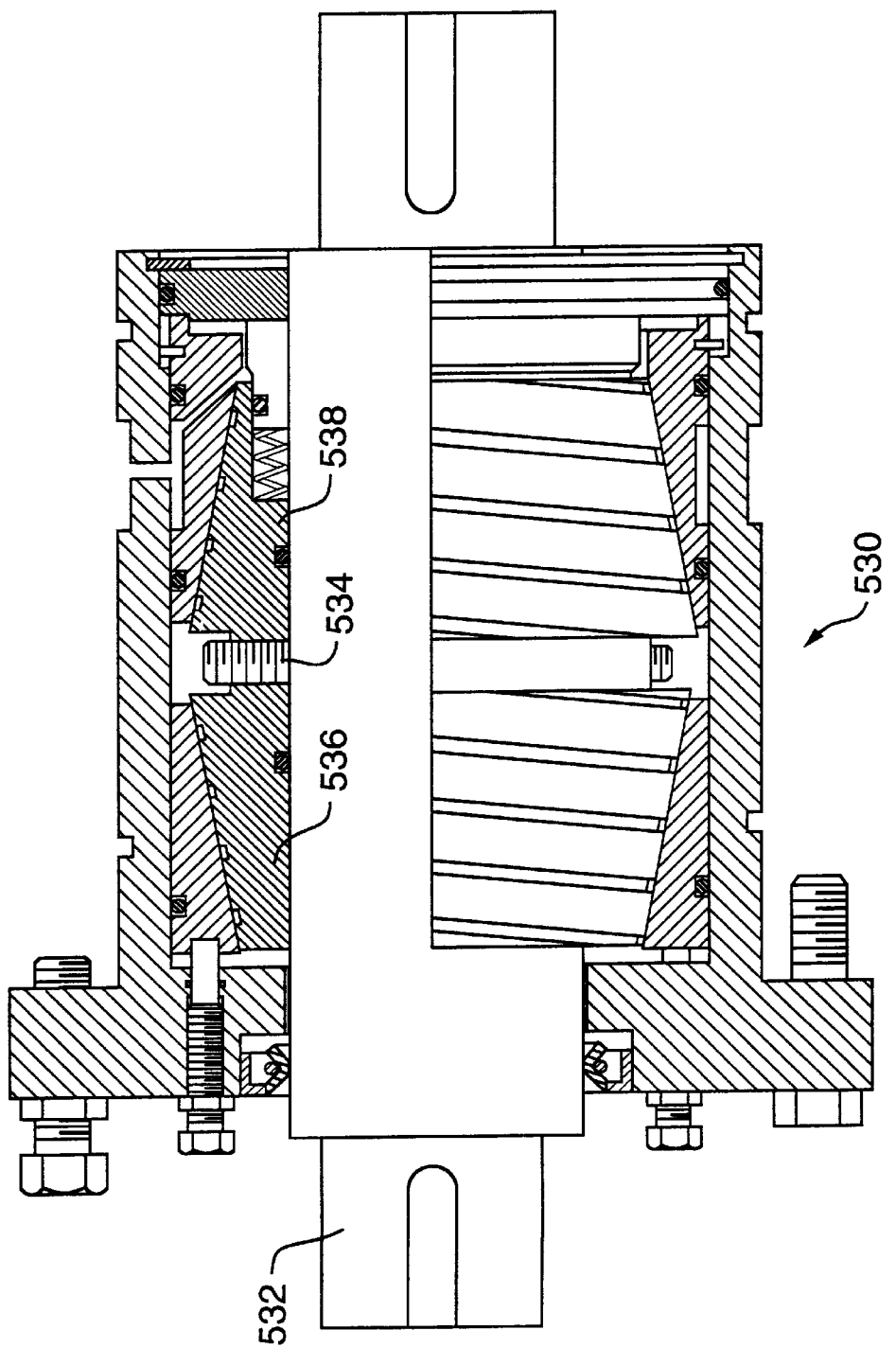
Figure 32:
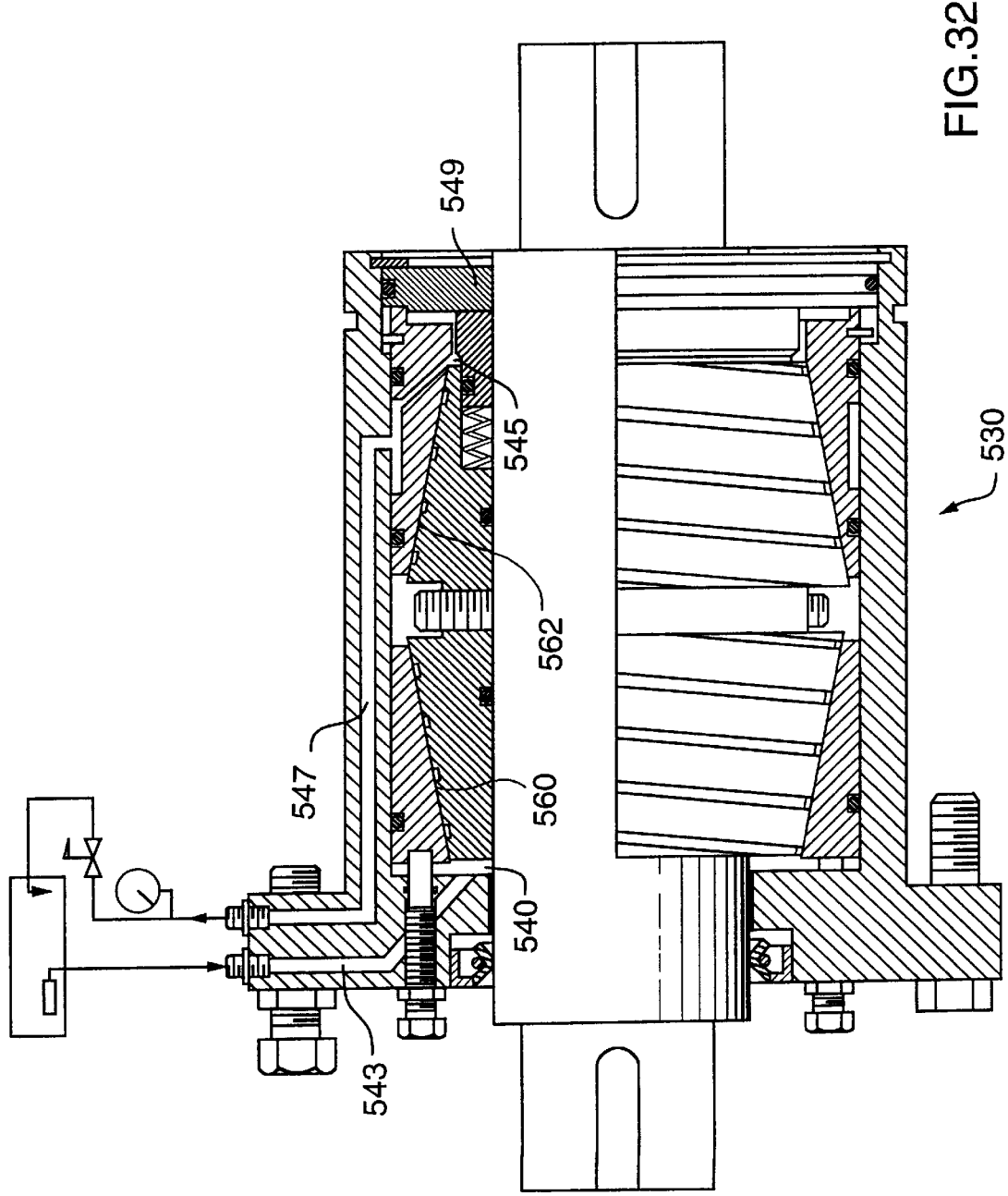
Figure 33:
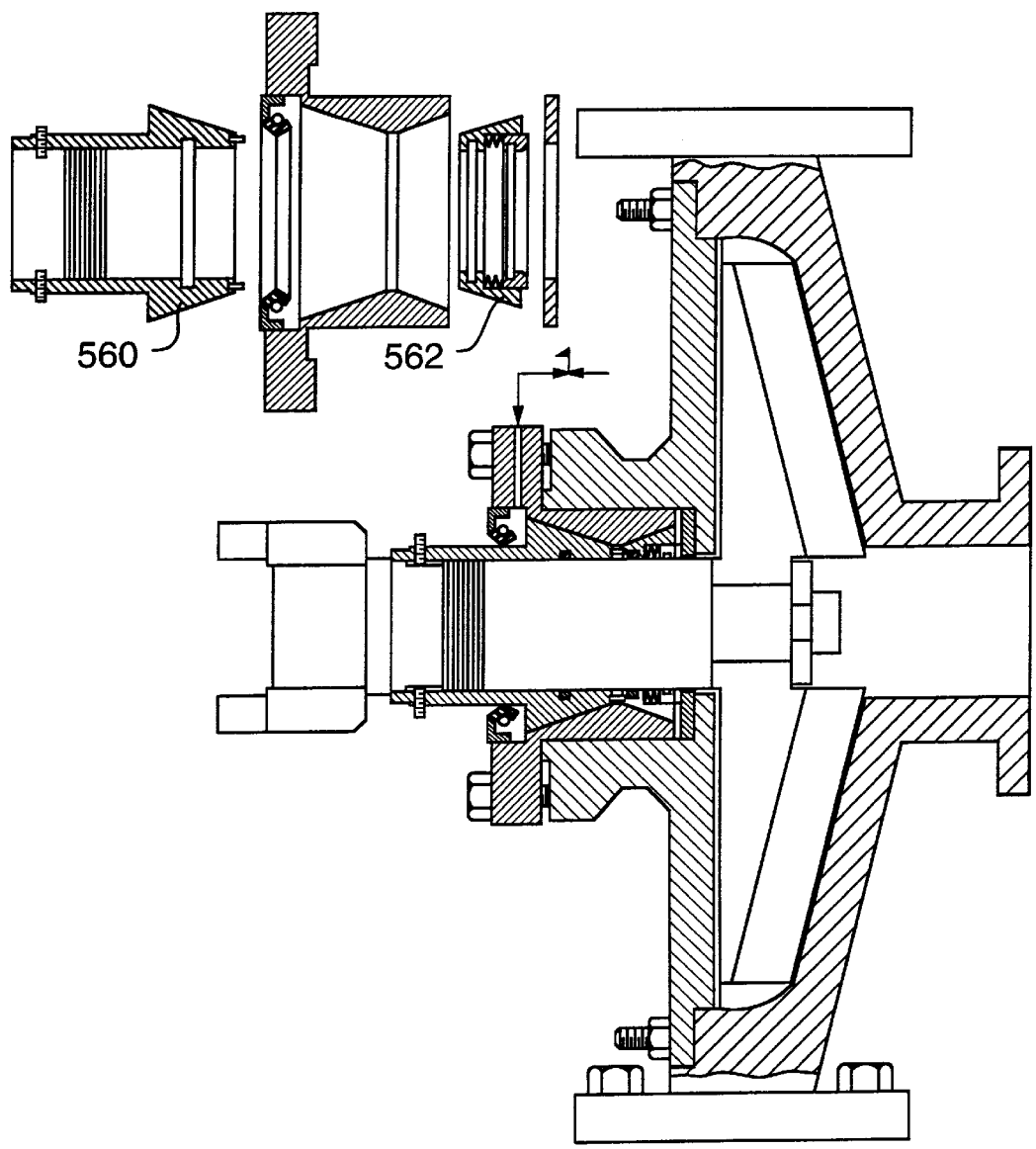
Figure 34:
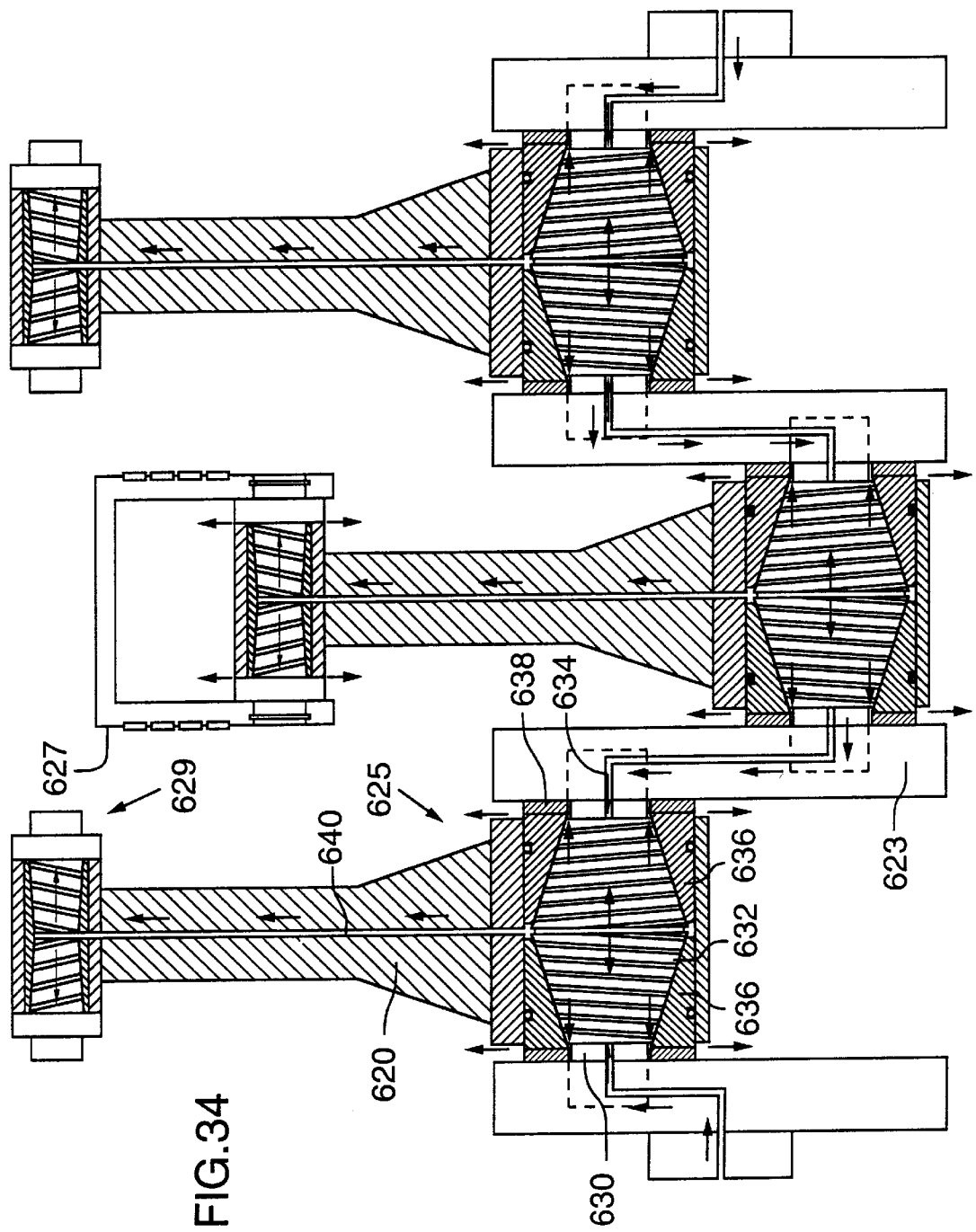
Figure 35:
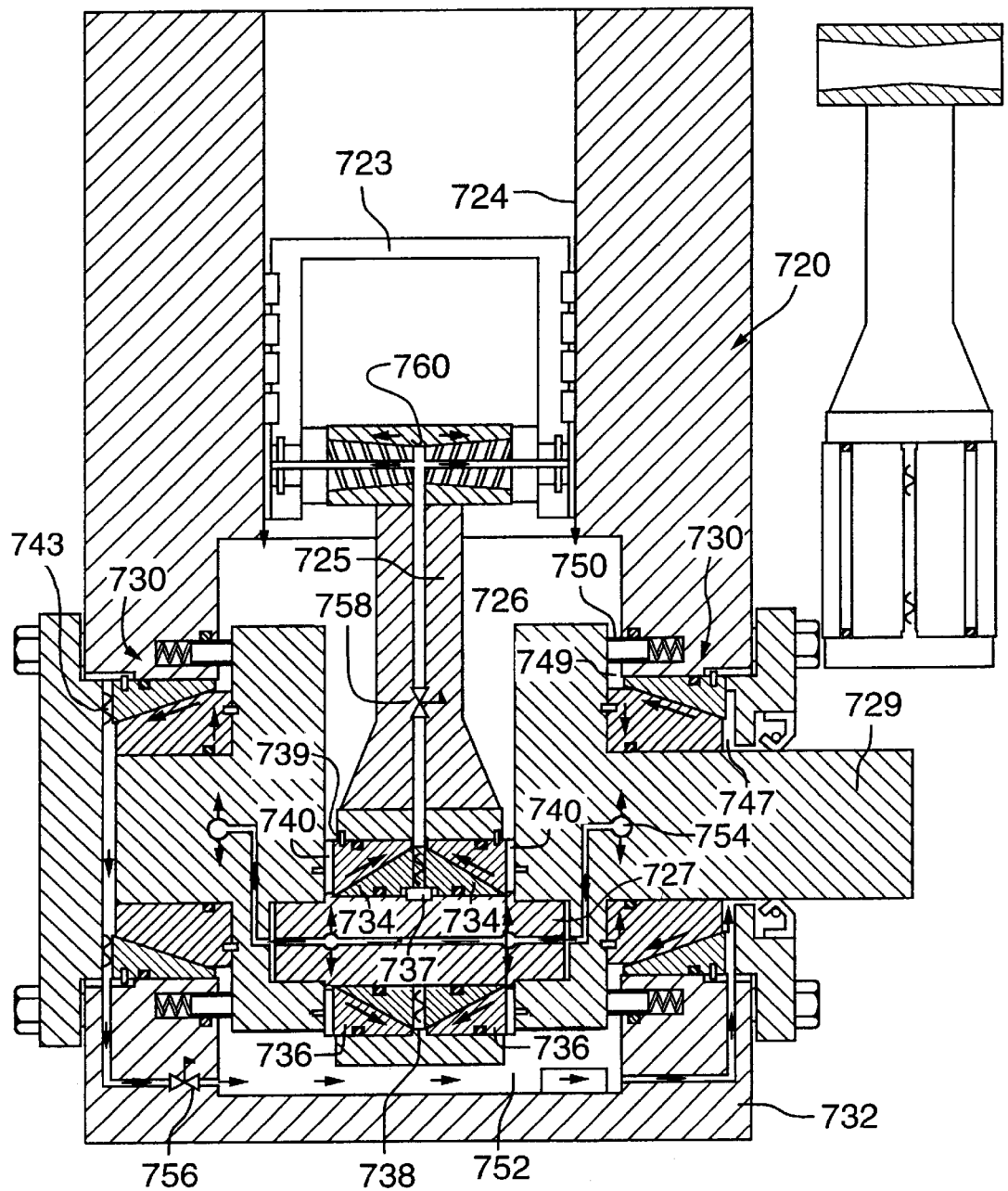
Figure 36:
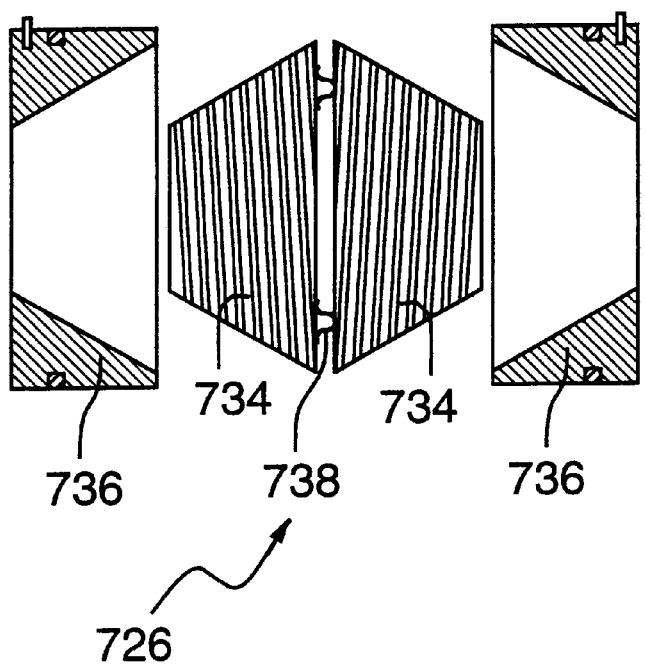
Figure 37:
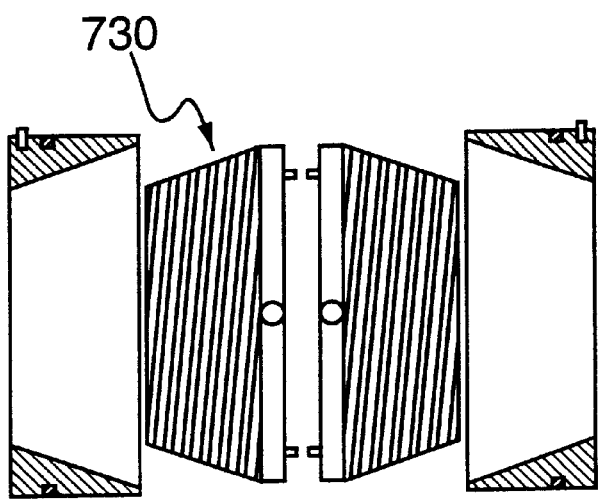
Figure 39A:
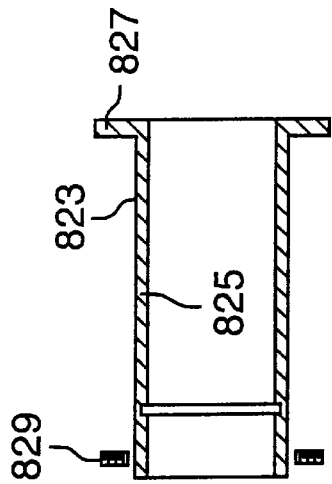
Figure 38C:
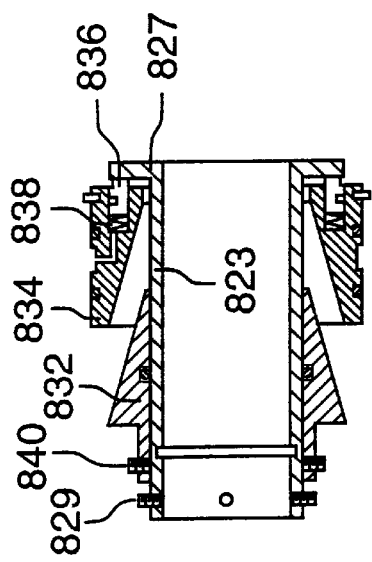
Figure 38A:
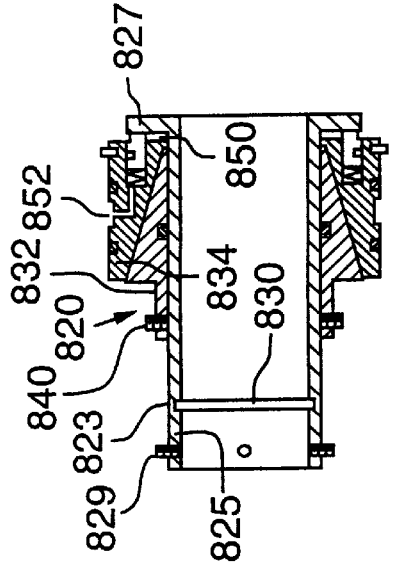
Figure 39C:
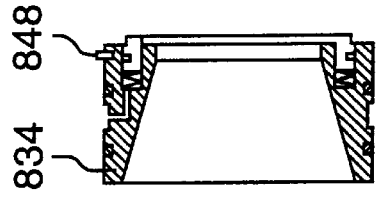
Figure 39B:
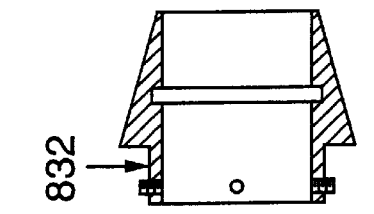
Figure 38B:
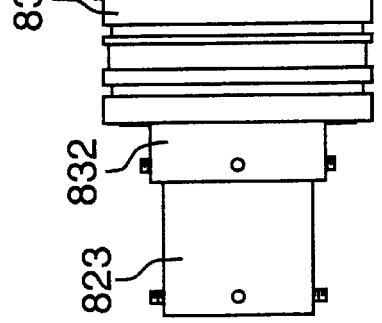
Figure 41:
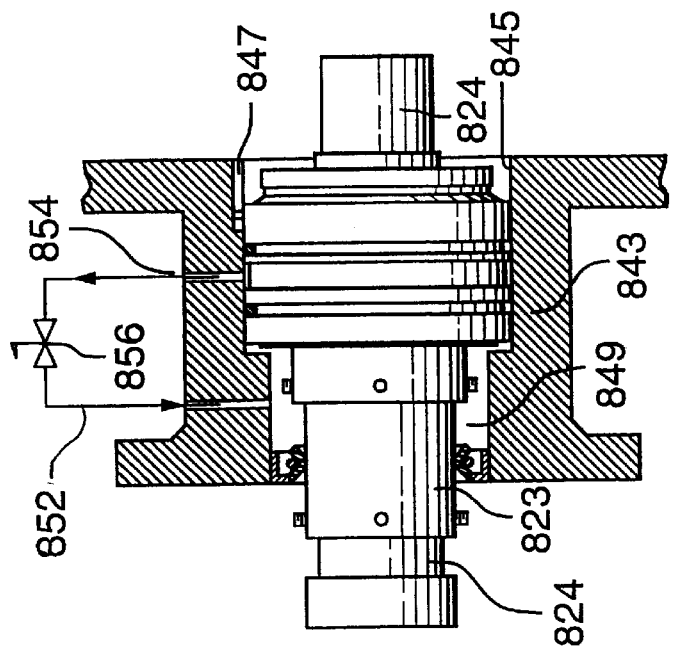
Figure 40A:
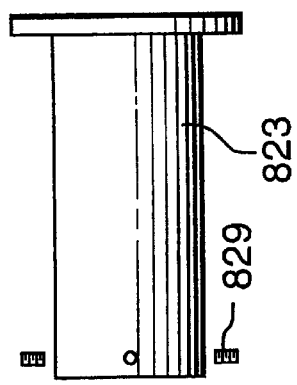
Figure 40C:
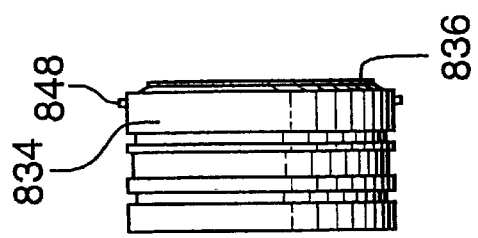
Figure 40B:
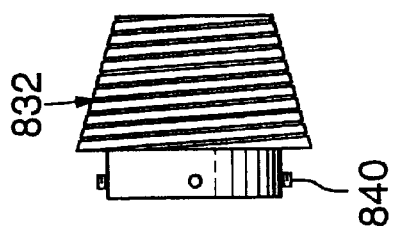
Figure 42:
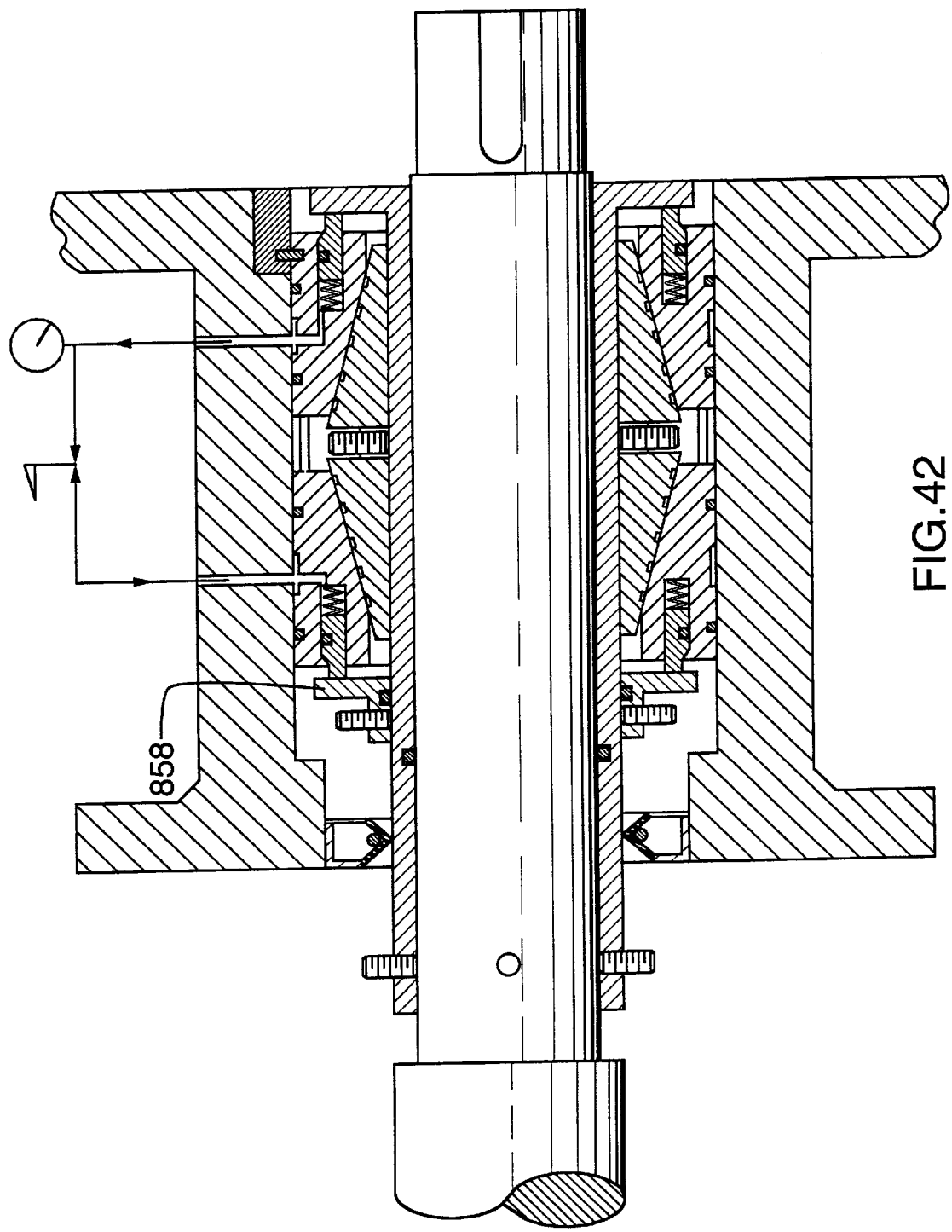
Figure 43A:
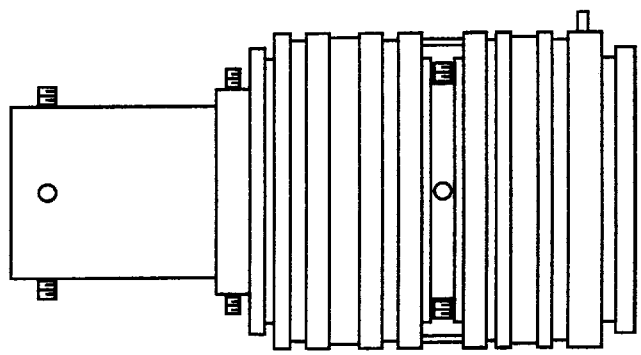
Figure 43B:
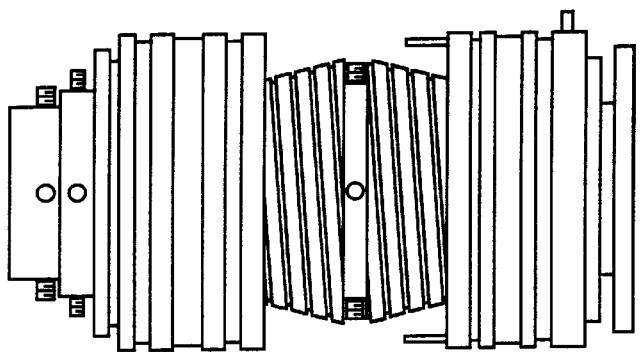
Figure 43C:
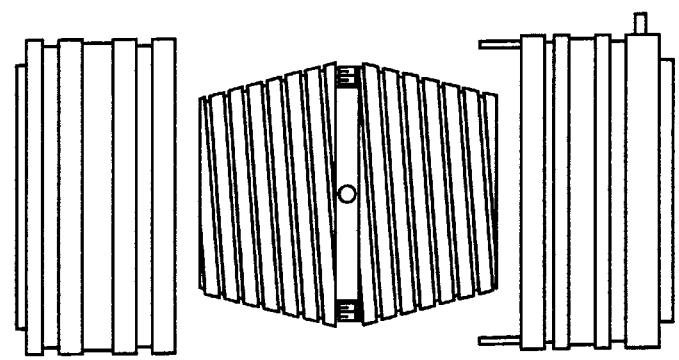
Figure 43D:
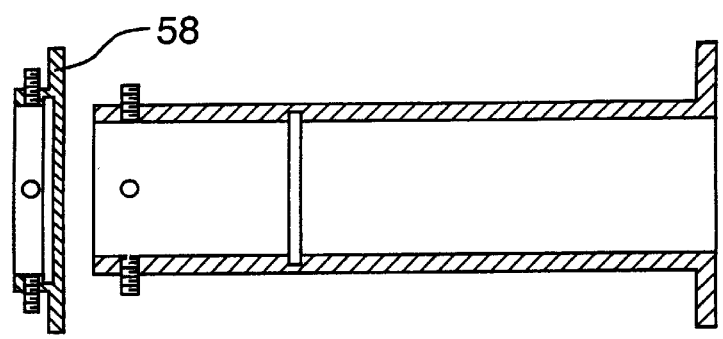
Figure 44:
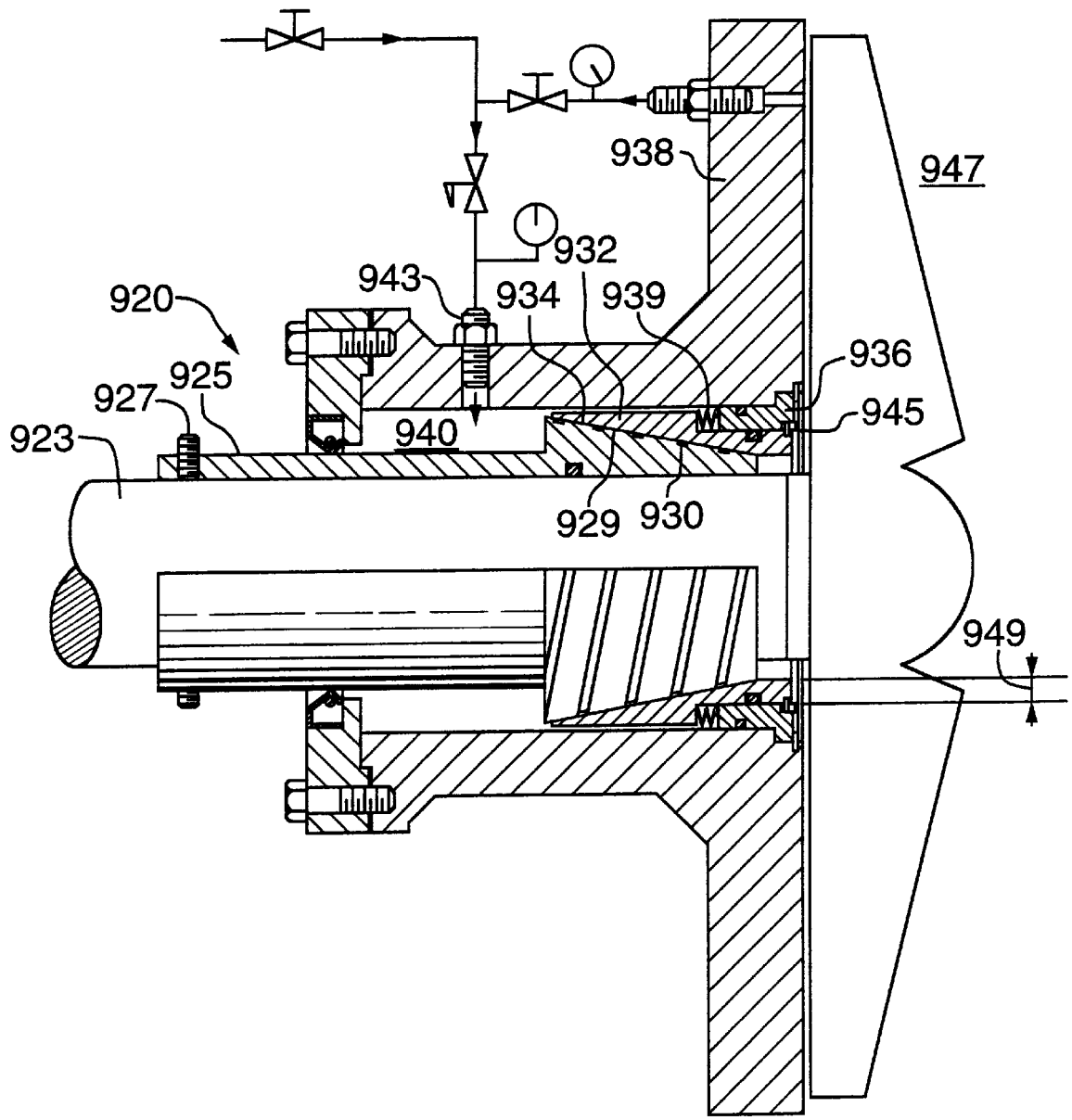
Figure 45:
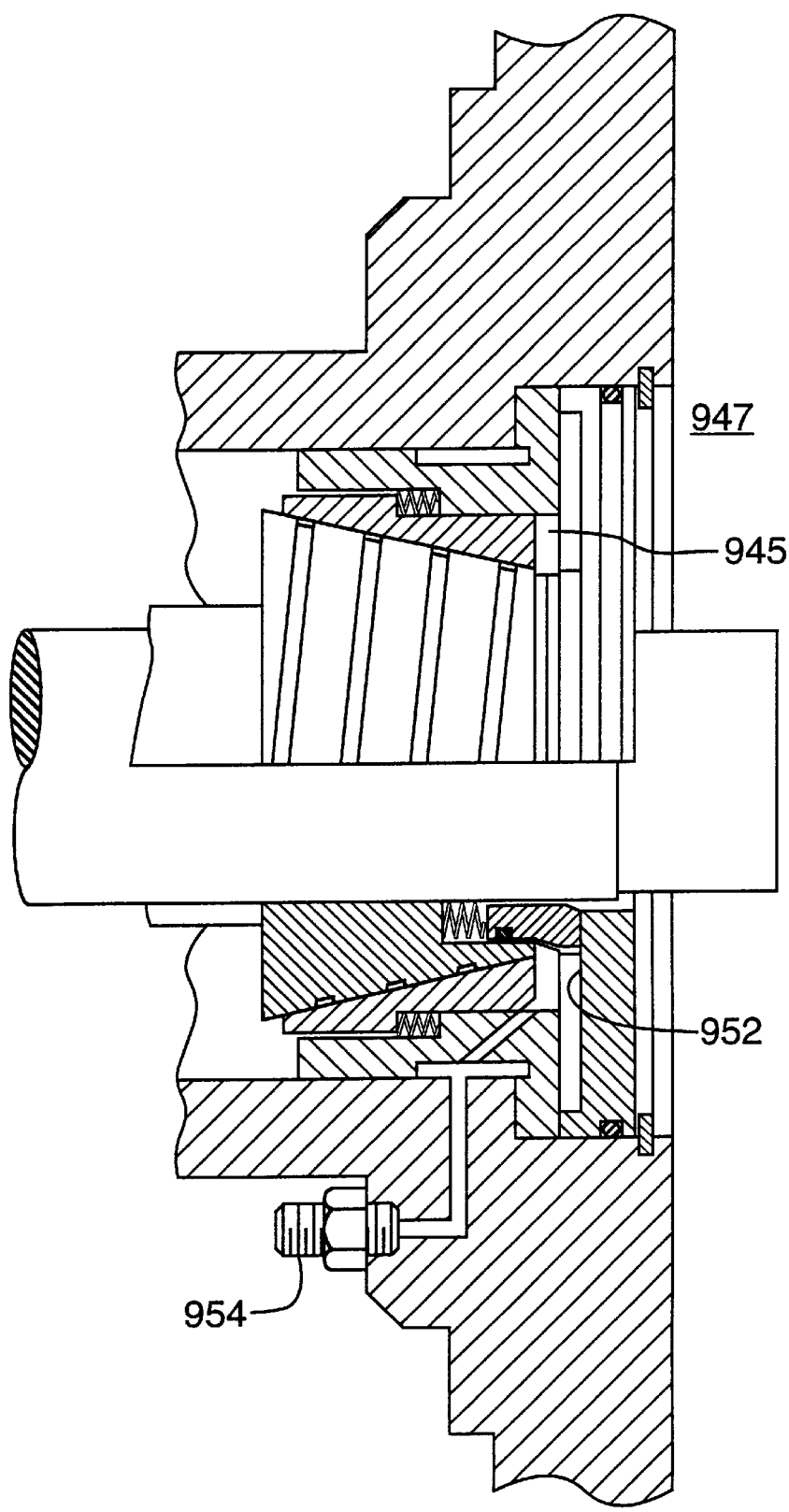
Figure 46:
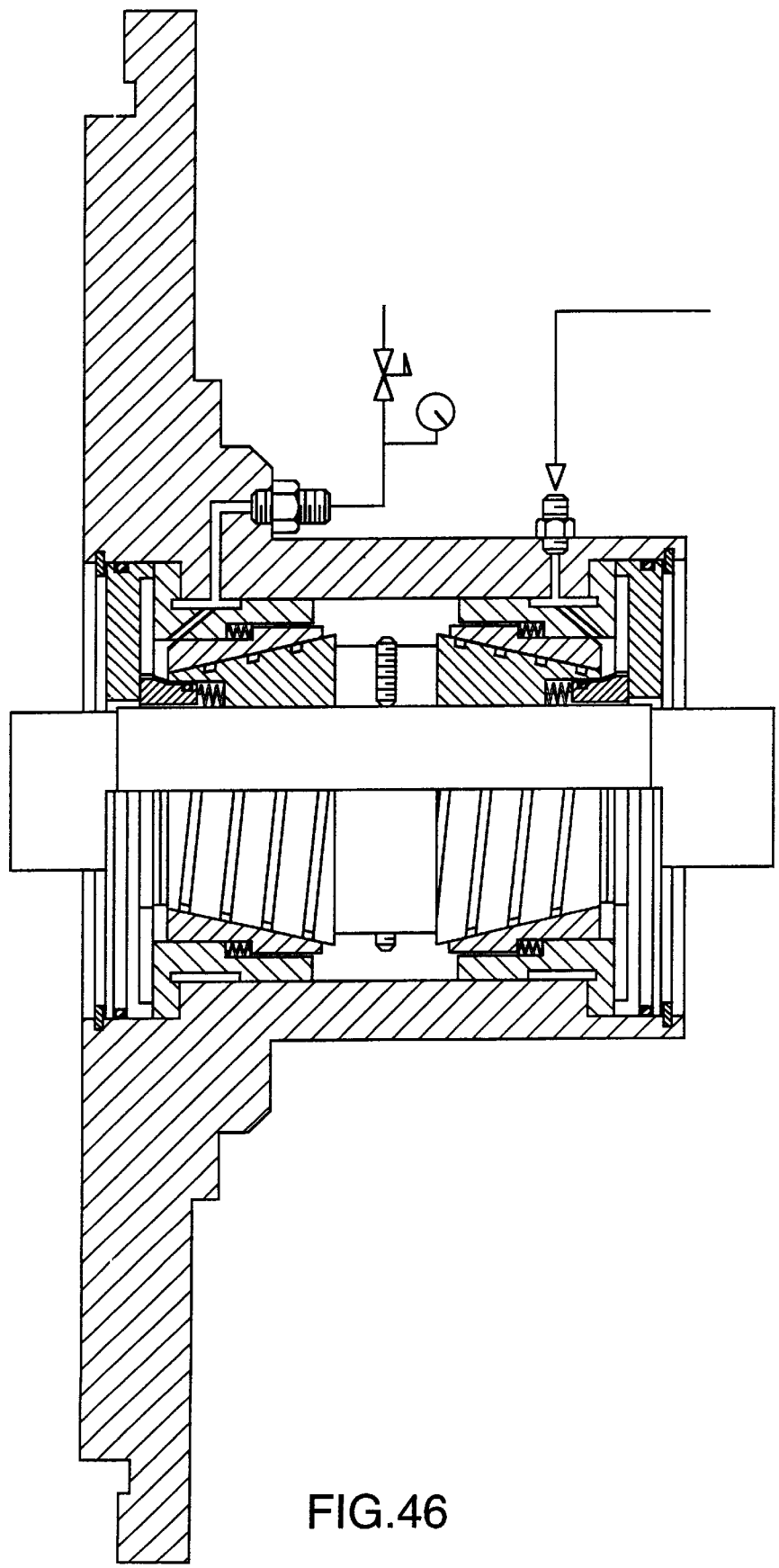
Figure 47:
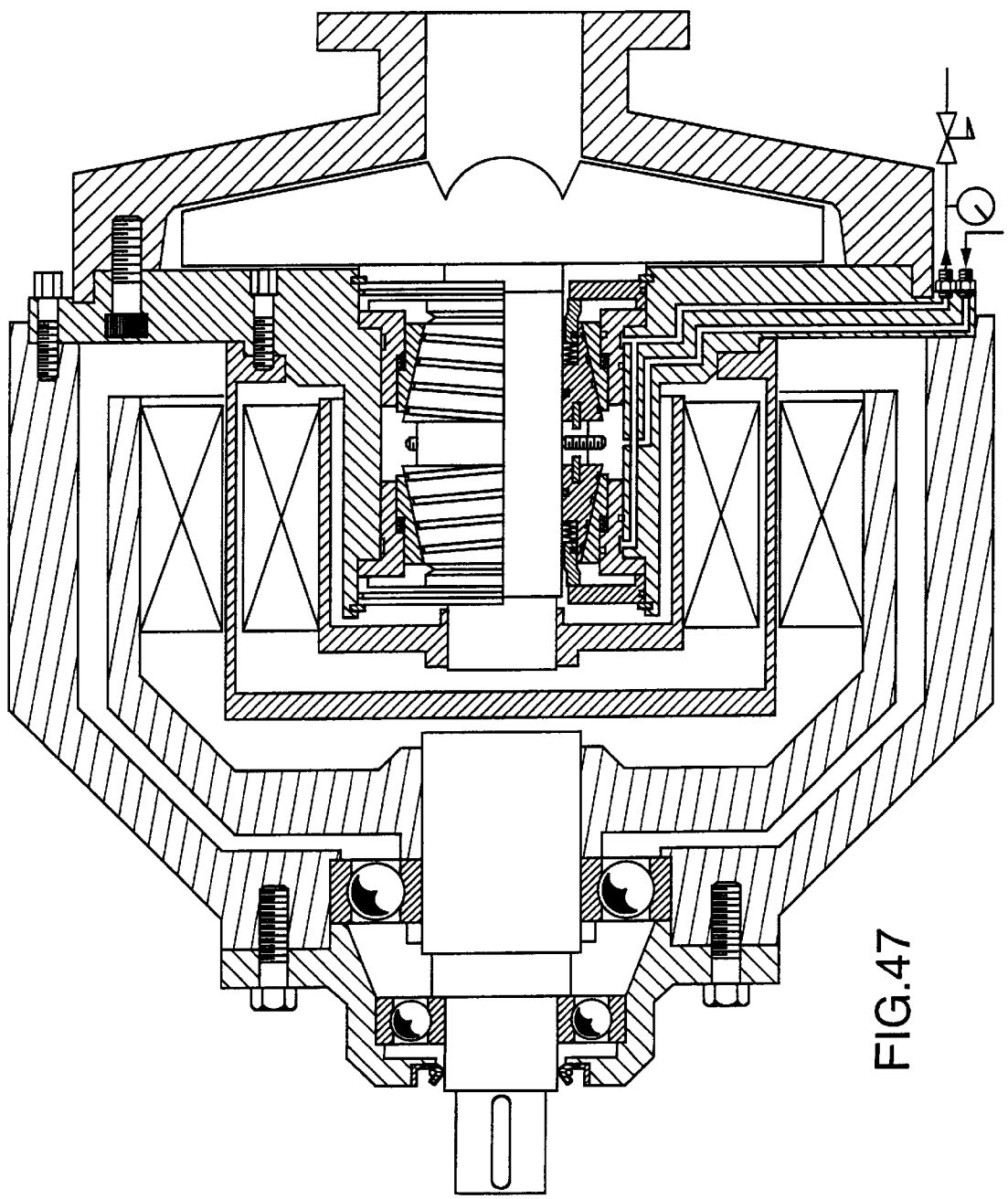
Figure 48:
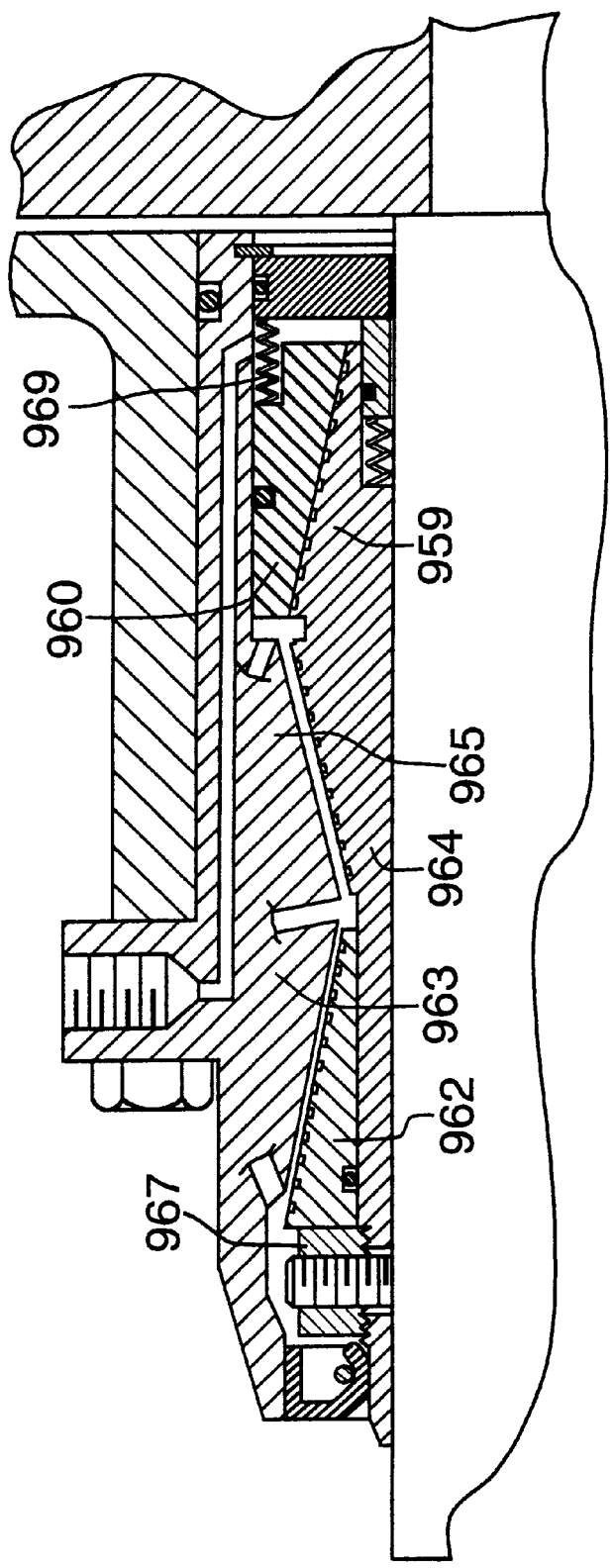

FIG. 12 corresponds to FIG. 11 but with an outboard plug wall;

FIG. 13 corresponds to FIG. 11 but with only the outboard mechanical seal;

FIG. 14 is a cross-sectioned side elevation of a pump having a motor to the right and an impeller to the left;

FIG. 15 is a corresponding section of another pump;

FIG. 16 is a corresponding section of another pump;

FIG. 17 is a corresponding section of another pump;

FIG. 18 is a corresponding section of another pump;

FIG. 19 is a corresponding section of another pump;

FIG. 20 is a cross-section of a sealing/bearing sub-assembly;

FIG. 20a is a cross-section showing the sub-assembly of FIG. 20 built into a pump;

FIG. 21 is a corresponding section of another pump;

FIG. 22 is a cross-section of a machine, using sub-assemblies as in FIG. 21;

FIG. 23 is a side elevation of a conventional motor/pump assembly;

FIG. 24 is a corresponding elevation of an assembly;

FIG. 25 is a cross-section of a sealing/bearing apparatus;

FIG. 25a is a cross-section of a sealing/bearing assembly;

FIG. 26 is a cross-section of a sealing/bearing assembly;

FIG. 27 is a vertical cross-section of another pump;

FIG. 28 is a cross-section of a cartridge for a pump;

FIG. 29 is a cross-section of a pump, in which is fitted the cartridge of FIG. 28;

FIG. 30 is a cross-section of a pump fitted with another cartridge;

FIG. 31 is a cross-section of a sealing/bearing assembly, which is suitable for insertion in a pump, as a cartridge or modular unit;

FIG. 32 is a corresponding cross-section of a modified similar seal/bearing assembly;

FIG. 33 is a cross-section of a seal/bearing assembly;

FIG. 34 is a cross-section of an automotive crankshaft, with bearings;

FIG. 35 is a cross-section of a portion of a single-cylinder reciprocating air compressor;

FIG. 36 is a cross-section of some of the components of a big-end bearing of the compressor of FIG. 1;

FIG. 37 is a cross-section of some of the components of a main-bearing of the compressor;

FIG. 38a is a cross-section of a seal-bearing cartridge;

FIG. 38b is a side elevation of the cartridge of FIG. 38a;

FIG. 38c is a cross-section of the cartridge of FIG. 38a, shown in an intermediate configuration;

FIGS. 39a, 39b, 39c are cross-sections of components of the cartridge of FIG. 38a;

FIGS. 40a, 40b, 40c are side-elevations of the components of FIG. 38a;

FIG. 41 is a side elevation of the FIG. 38a cartridge installed in a pump;

FIG. 42 is a cross-section of another seal-bearing cartridge, installed in a pump;

FIGS. 43a, 43b, 43c are side elevations showing the components of the cartridge of FIG. 42;

FIG. 43d is a cross-section of a component of the cartridge of FIG. 42;

FIG. 44 is a cross-section of an impeller-pump;

FIG. 45 is a cross-section of another pump;

FIG. 46 is a cross-section of another pump;

FIG. 47 is a cross-section of another pump;

FIG. 48 is a cross-section of another seal/bearing apparatus.

The apparatuses shown in the accompanying drawings and described below are examples which embody the invention. It should be noted that the scope of the invention is defined by the accompanying claims, and not necessarily by specific features of exemplary embodiments.

FIG. 1 herein shows a double taper arrangement, which has a thrust capability.

In FIG. 1, the housing 20 of the pump is fixed rigidly to a machine frame. A drive shaft 23 is coupled to a rotary power source (e.g an electric motor). The pump has an impeller which is not shown, but is located at the right end of the shaft in FIG. 1). The impeller is fixed rigidly to the shaft 23.

A sleeve 25 is attached to the shaft 23 by means of grub screws 27, by means of which the sleeve stays locked to the shaft during rotation, and when undergoing such rotary and thrust loading as may be encountered during operation.

The sleeve 25 is fixed also to a bushing 28, via a spacer 29 again in such a manner that the sleeve and the bushing remain locked together, and to the shaft, during operation.

The sleeve and the bushing are tapered, and grooves 30 are cut in the tapers, as shown. The grooves are arranged so that, when the shaft rotates, the grooves drive the barrier liquid entering the inlet chamber 32 towards and into the outlet chamber 34, in the manner as described in RAMSAY. Pressure in the outlet chamber 34, due to the pumping action of the grooves, rises to a level set by the pressure regulator 36. The barrier liquid then recirculates back into the inlet chamber 32.

A mechanical seal 38 keeps the barrier liquid from entering the pumping chamber (to the right in FIG. 1) containing the process fluid. A bellows 40 provides bias for the mechanical seal.

The tapered sleeve 25 and the tapered bushing 28 reside inside a double-tapered cylinder 43. During manufacturing assembly, the sleeve and bushing were screwed together onto the threaded spacer 29. The spacer is dimensioned such that when the sleeve and the bushing are locked together, to the spacer, there is just enough free-play or slack to permit the shaft to rotate freely, without binding between the tapers. Typically, about 0.001 inch (0.25 mm) of axial clearance would be appropriate.

The barrier liquid should be of sufficient viscosity that the 0.001 inch gap would still allow the grooves to generate enough pressure. Any oily liquid would be acceptable, and would be selected to be compatible with the process fluid. Water will not generate a hydrodynamic film as thick as that, however, and so water probably would not, therefore, be suitable as the barrier liquid in the FIG. 1 case, with the double taper thrust bearing.

If the free-play were made so tight that a hydrodynamic film could build up in water, there would be a danger that the sleeves might bind, and seize. Preferably, a free-play of 0.001 inch (measured axially) is about the minimum that can be permitted, if binding is to be avoided.

It may be noted that in FIG. 1 the sleeve, bushing, and cylinder can all be assembled together, lapped together, adjusted, and set up for operation, during manufacturing assembly. The product as sold comprises the assembly cartridge, which is then simply bolted into the pump housing by means of the screws 45. The lip-type seal 47 may be assembled into the housing beforehand. It will be understood that of course the impeller is not present on the shaft at the time of assembly of the components into the housing. The shaft should be coupled to the electric motor by means of a coupling which does not transmit thrust loads from the motor: either that, or the motor itself may be of a structure that has no thrust capability itself, whereby the thrust capability of the double tapers serves to support the thrust loads inside the motor as well.

Figure 2:
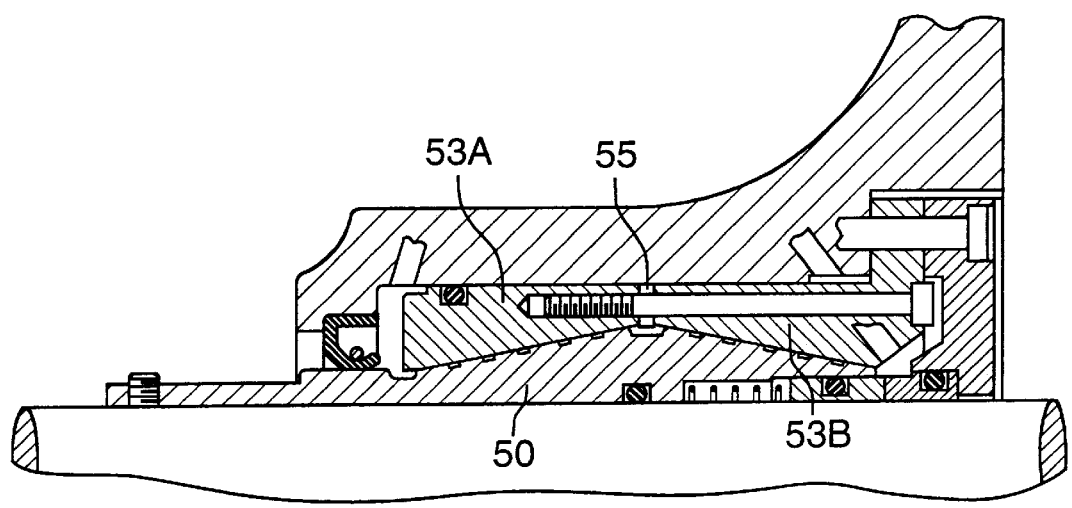
FIG. 2 is a corresponding section of another pump.

FIG. 2 shows a variation on the theme of providing opposed tapered surfaces, to serve as a double thrust bearing, i.e to avoid the need for any other provision for taking thrust loads on the shaft.

In FIG. 2, the two shaft tapers are machined on the one piece, i.e on the sleeve 50. The tapered cylinder is now in two components, 53A,53B, bolted together as shown. A spacer 55 ensures the two components are separated by the correct distance to give the desired free play. During manufacture, a spacer of the correct thickness is selected, to ensure the desired 1 thou or so of free play.

Figure 3:
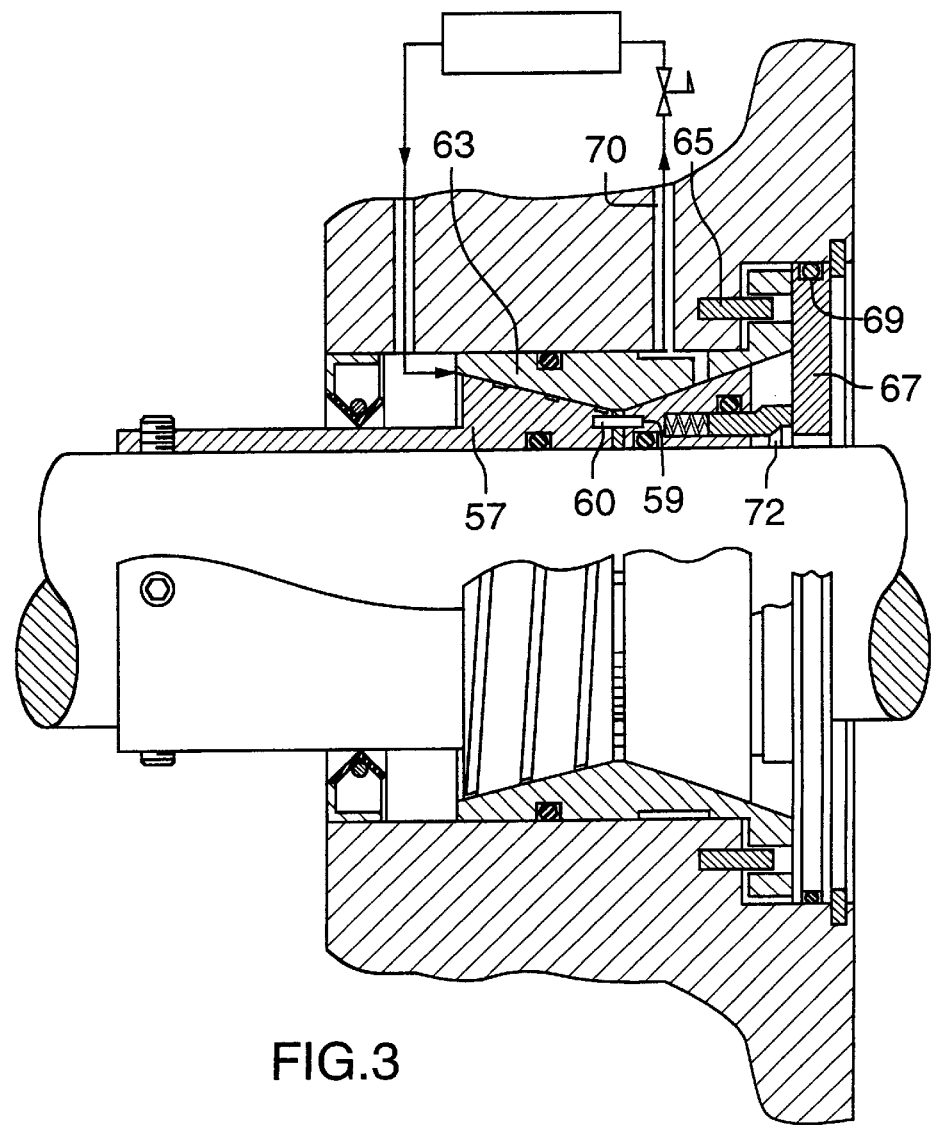
FIG. 3 is a corresponding section of another pump.

FIG. 3 shows another manner of arranging the double tapers. Here, the intention is not to provide thrust bearing support in both directions, but rather to improve the security of the seal.

In FIG. 3, the sleeve 57 is locked to the shaft, but the bushing 59 is free to float axially along the shaft. The bushing is constrained to rotate with the sleeve, and with the shaft, by means of the drive-pins 60. The double-tapered cylinder 63 also is free to float axially, and is constrained against rotation by means of the pins 65. The end-plate 67 is retained by a circlip 69. For installation, the sleeve 57 is pressed to the right, as far into the housing as it can go, and then the grub screws are tightened.

The tapered surface of the sleeve 57 is grooved, but the tapered surface of the bushing 59 is plain. When the pump is running normally, the grooves build up a high pressure in the barrier liquid at the right end of the sleeve 57. This pressure drives the bushing to the right, opening a gap between the mating tapered surfaces of the bushing and the cylinder. The barrier liquid also forms a hydrodynamic film between the tapered surfaces. The pressurised barrier liquid escapes via the passage 70, in which its pressure is regulated.

If the mechanical seal 72 should fail, barrier liquid starts to leak into the process fluid. Detectors can be incorporated, to detect whether the quantity of barrier liquid is becoming less, to signal that the mechanical seal is leaking.

However, if the shaft should stop rotating, no pressure is then being generated in the barrier liquid. The process fluid, however, may retain some head pressure when the shaft stops. If both tapers were grooved, as in FIGS. 1 and 2, then, if the mechanical seal has failed, then, when the shaft stops, there is a leakage path, up the grooves, whereby process fluid can leak into the barrier area, and perhaps to the outside. If the process fluid is very toxic, this cannot be tolerated.

The ungrooved surfaces of the bushing provide a seal even when the shaft has stopped rotating, and even when the mechanical seal has failed.

Figure 4:
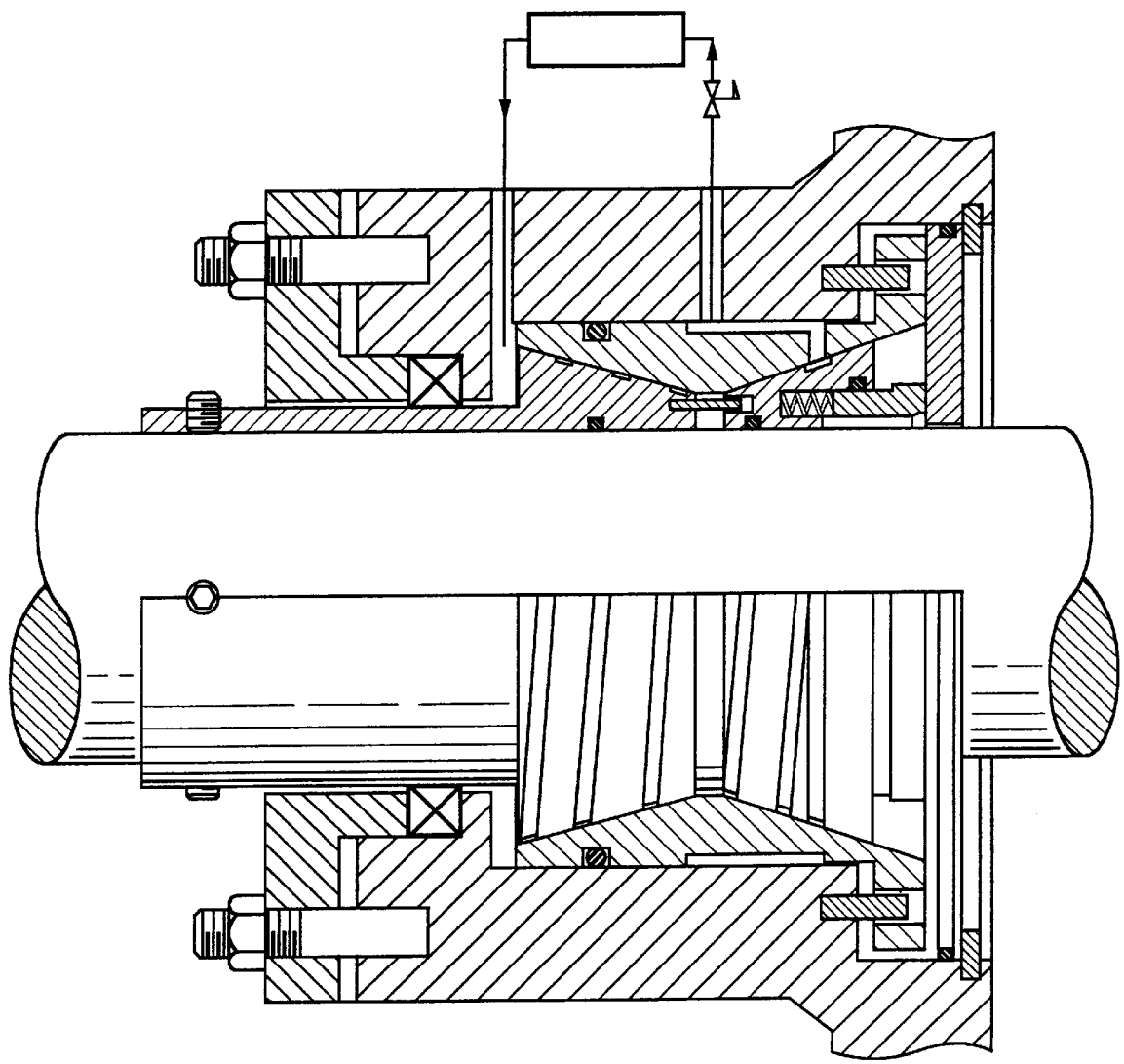
FIG. 4 is a corresponding section of another pump.
Figure 5:
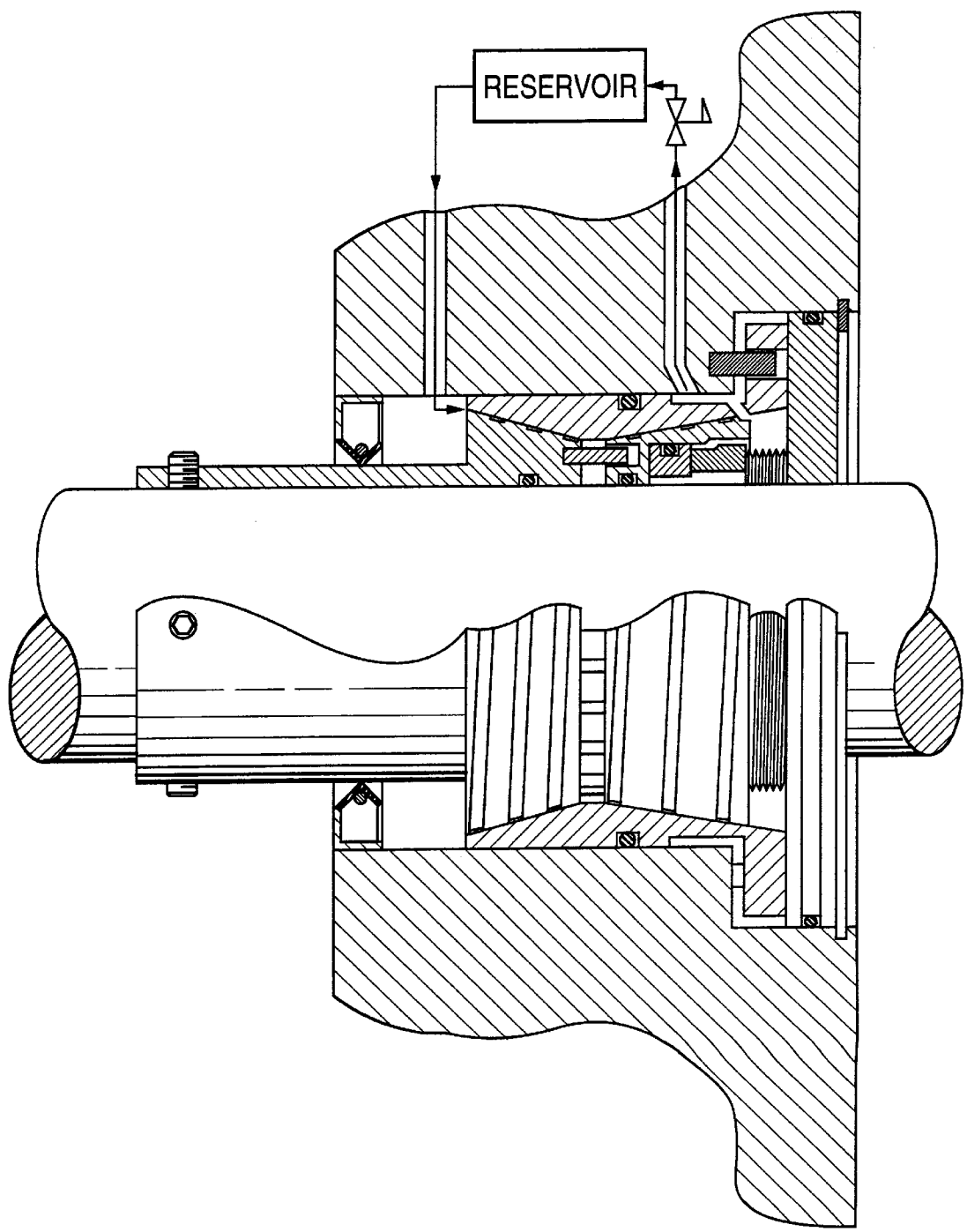
FIG. 5 is a corresponding section of another pump.
Figure 6:
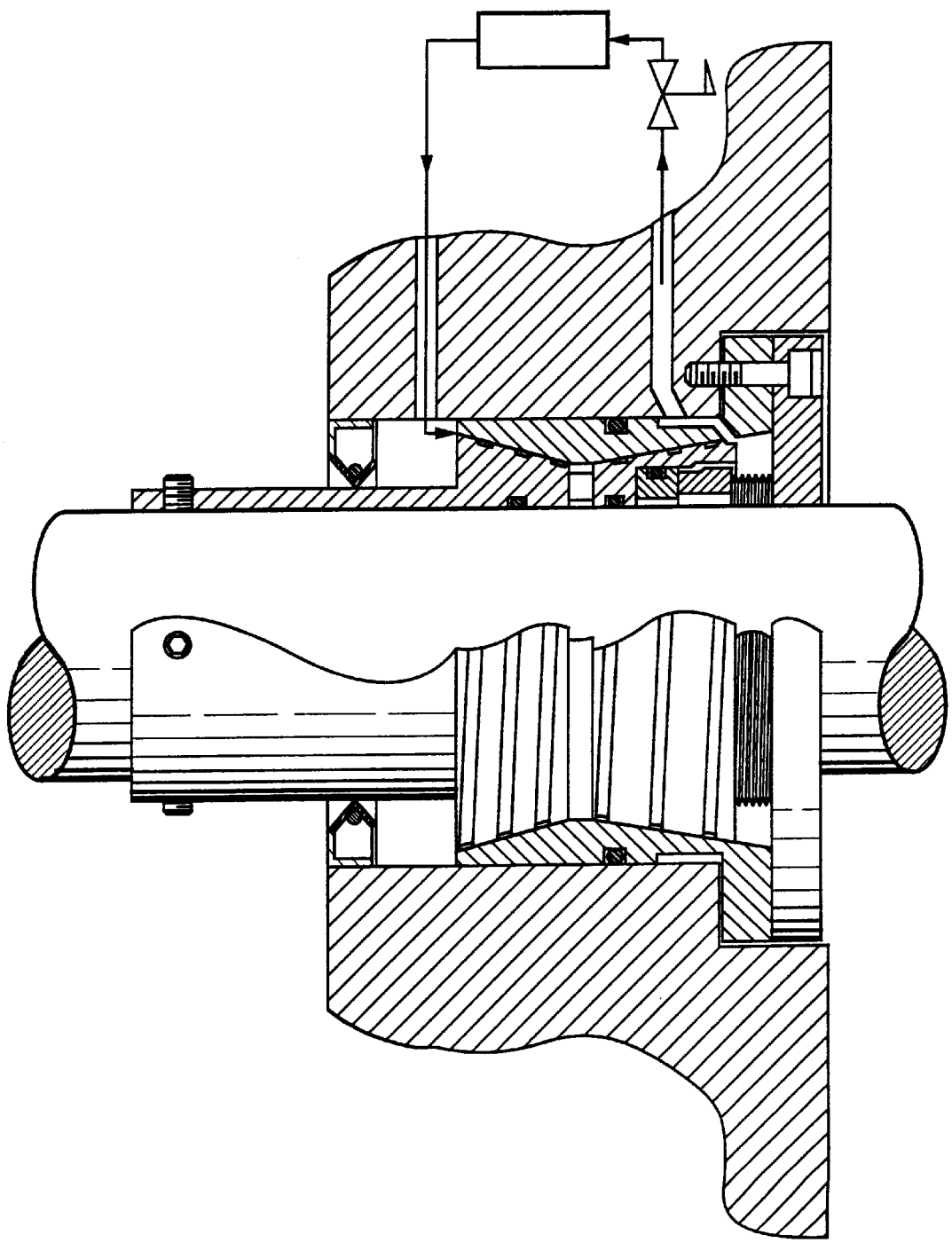
FIG. 6 is a corresponding section of another pump.
Figure 7:
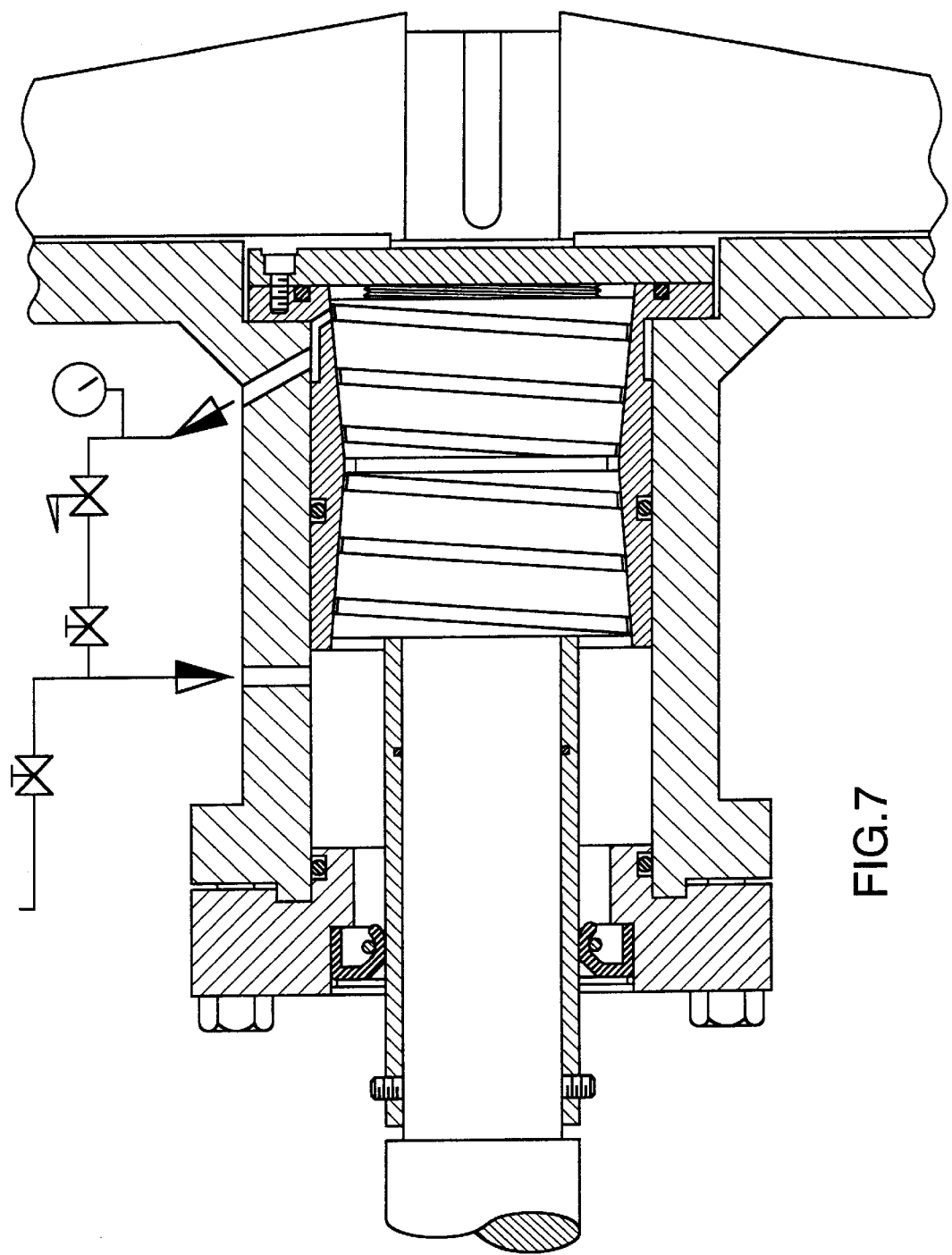
FIG. 7 is a corresponding section of another pump.
Figure 8:
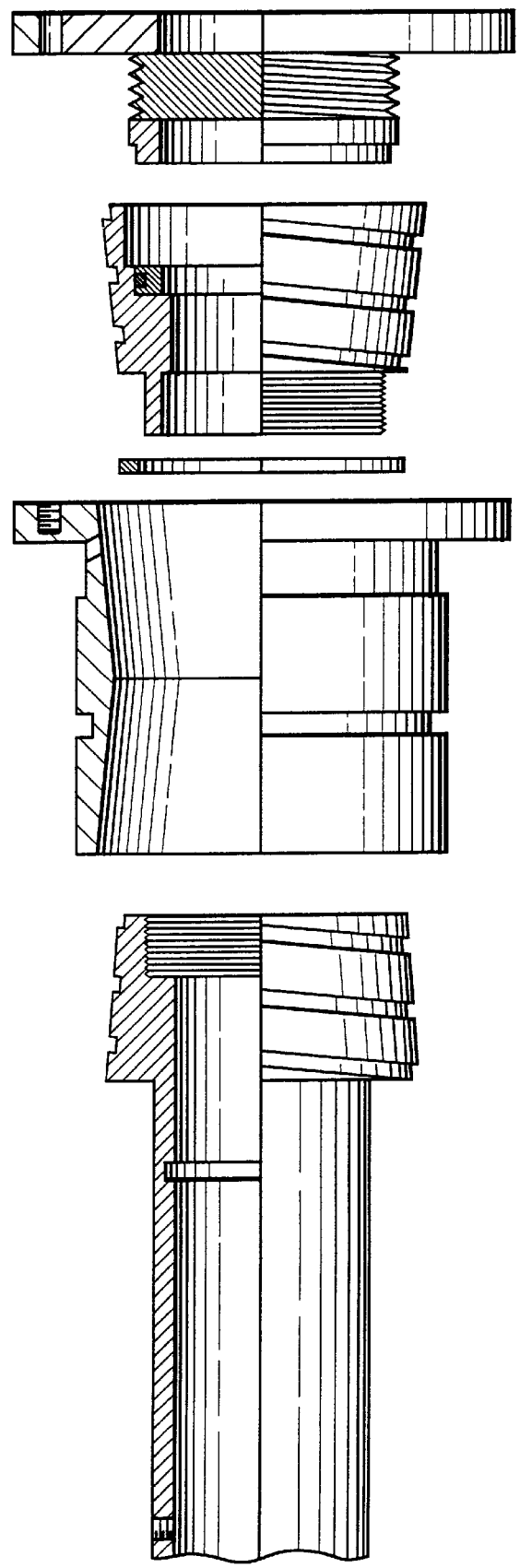
FIG. 8 is an exploded view of some of the components of the pump of FIG. 7.
Figure 9:
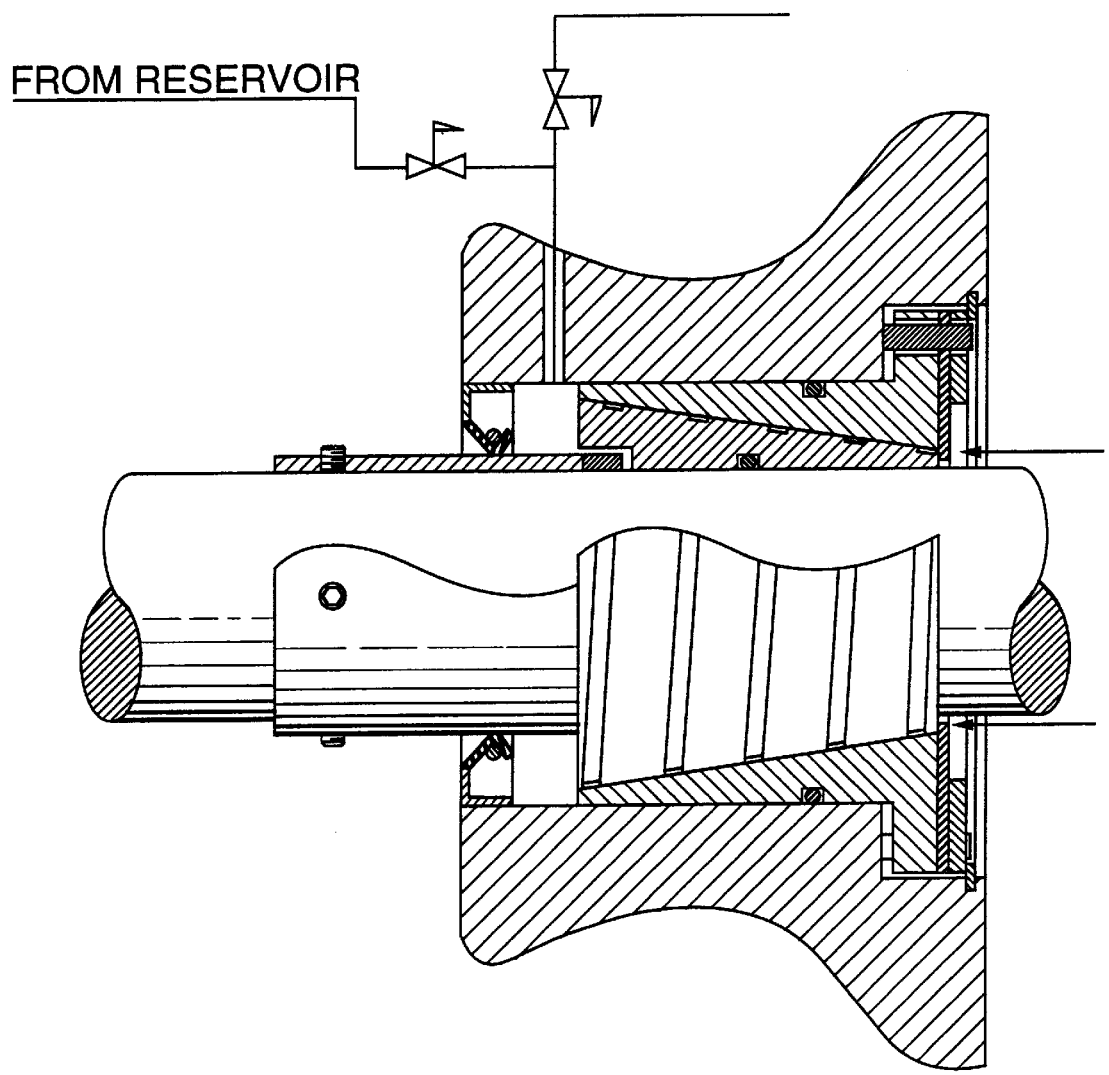
FIG. 9 is a cross-section of another pump.
Figure 10:
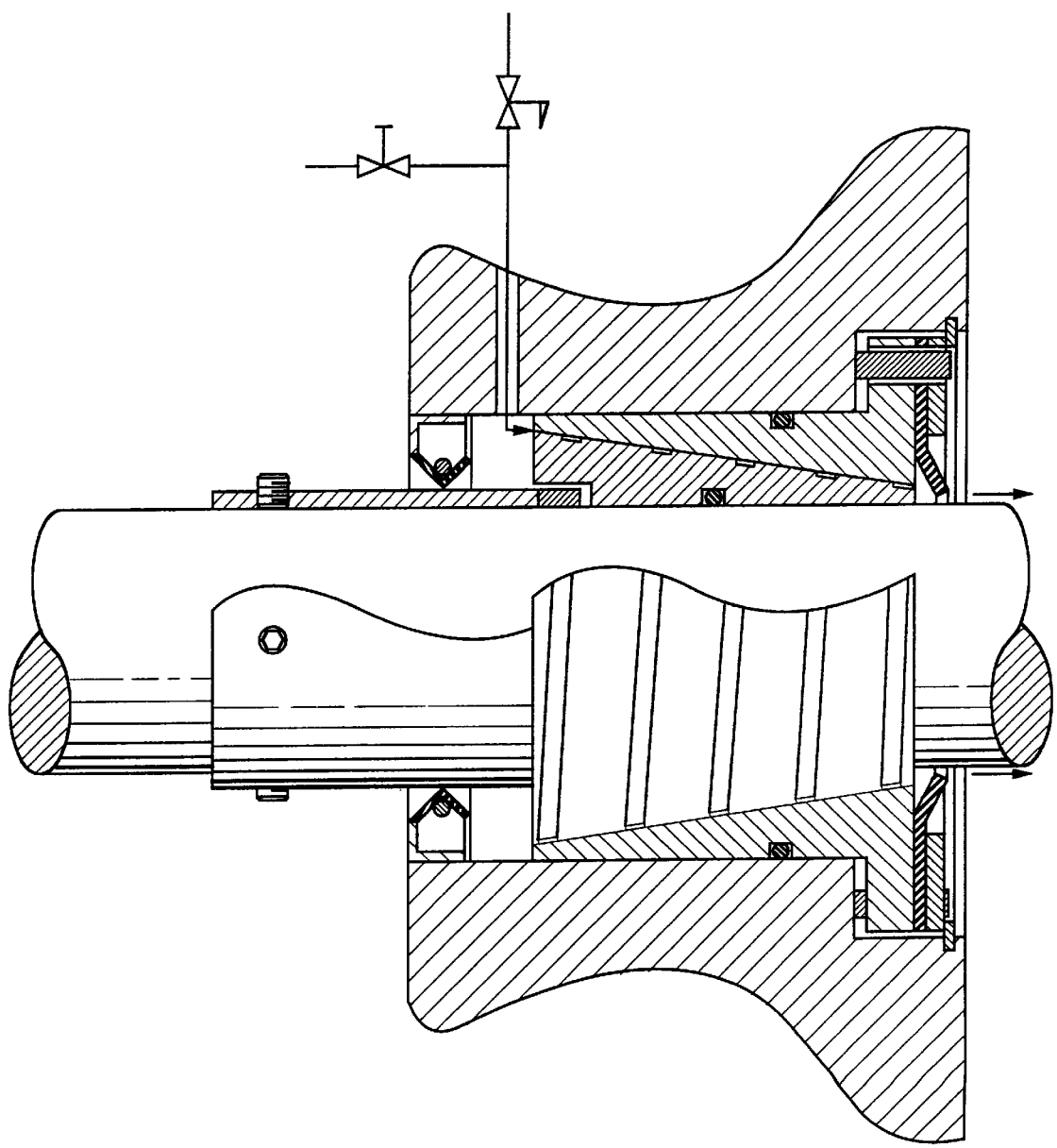
FIG. 10 is a cross-section of the pump of FIG. 9, shown in a different operating condition.

FIG. 4 shows a version similar to FIG. 3, in which the bushing is grooved partway, and plain the rest.

The plain portion serves as a seal when the rotation stops.

Also in FIG. 4, the lip seal of FIG. 3 is replaced by a packing ring.

FIGS. 5 to 13 show other variations in the arrangement of lip seals, mechanical seals, and/or packing rings with the tapered sleeve invention device.

FIG. 14 shows a pump, in which the impeller is to the left, and the drive motor to the right. In FIG. 14, a rotor component 120, which is locked to, and rotates with, the shaft 123, is provided with opposing grooved tapered sleeve portions 125, 127.

Two complementary stator tapered sleeves 129, 130 are provided, which are prevented from rotation by being keyed, as at 132, to the pump housing 134. The stator sleeves 129, 130 are both free to float axially along the shaft during operation.

During rotation of the shaft, barrier-liquid at low pressure is fed from a reservoir 136 into the low pressure chamber 138, and is then pumped to the right and left, by the action of the grooves, towards the two high pressure chambers 139, 140.

It will be noted that the grooves on the rotor sleeves are of opposite hand, whereby the barrier-liquid is pumped in the two opposite directions even though both sleeve sections 125, 127 are rotating in the same sense. Of course, the direction or sense of rotation of the shaft 123 must be arranged, in relation to the hand of the grooves, so that pumping takes place in the desired direction.

From the two high-pressure chambers 139, 140, the barrier-liquid is held at the desired pressures by means of pressure regulators 143, 145, and is then discharged and recirculated back to the low pressure chamber 138.

The pressures in the two high-pressure chambers 139, 140 need not be the same, and in practice usually will not be the same. The pressure in the left chamber 139 will be set a little higher than the pressure of the process fluid in the impeller chamber to the left, so that the mechanical seal 147 "sees" only a small pressure differential; similarly, the pressure in the right chamber 140 will be set a little higher than atmospheric pressure, which obtains to the right of the mechanical seal 148.

Each stator sleeve carries a respective seal 149, 150. The left- or outwards-facing area of each sleeve exposed to the barrier-liquid pressure is considerably greater than the inwards-facing area of the same sleeve exposed to that pressure, whereby the sleeves are urged towards each other by the barrier liquid pressure.

The housing 134 carries sealed plugs 152, 153 to isolate the assembly of sleeves, and to hold it in position. Wavy springs 154 urge the sleeves axially, and into (light) contact with each other. Pressure developed in the high-pressure chambers acts respectively on the two stator sleeves 129, 130. As mentioned, both stator sleeves can float axially, and the sleeves are therefore pressed inwards, i.e towards each other, by the action of the pressure generated in the barrier-liquid chambers 139, 140. The sleeves are thereby urged more tightly into the taper, whereby the clearance between the rotor and the stator is reduced, the clearance being just sufficient for the maintenance of a hydrodynamic film therebetween.

When the barrier-liquid has some lubricity and viscosity, the hydrodynamic film will settle at perhaps 1 or 2 thou thick, for example. When the barrier-liquid is water, which it often has to be in case the barrier-liquid should leak into the process fluid, the thickness of the hydrodynamic film is minute, e.g less than a tenth of a thou. The tapered sleeves must be carefully lapped to each other during manufacture, preferably as matched pairs, in order to enable such clearances to be maintained.

The engagement of the rotor sleeves with the stator sleeves serves as a journal bearing. The bearing has virtually no slack clearance, in that the bearing sets itself to the correct or needed thickness of hydrodynamic film. As a result, the bearing is massively able to eliminate vibration of the shaft during operation of the pump.

The bearing also provides support for the shaft under axial or thrust forces. During operation, the left sleeve 125 is held separated from the left plug 152 by the pressure in the left high-pressure chamber 139; similarly, the right sleeve 127 is held separated from the right plug 153 by the pressure in the right high-pressure chamber 140. When a heavy net thrust force acts on the shaft, for example in the direction towards the left in FIG. 14, the whole assembly of shaft, rotor sleeves, and stator sleeves, moves to the left until the left stator sleeve 129 abuts against the left plug 152. Similarly, a heavy force acting in the direction to the right would cause the whole assembly to move to the right until the right stator sleeve 130 abuts the right plug 153.

However, the pressure in left high-pressure chamber 139 will generally be greater than the pressure in the right high-pressure chamber 140, as previously mentioned. Therefore, the whole assembly will be biassed towards the right, and the assembly will normally reside with the right sleeve 130 in abutment with the right plug 153. Depending on the exposed areas of the two sleeves (their exposed areas need not be same) and on the different pressures in the two high-pressure chambers, the biassing force can be large enough that the right sleeve remains in abutment with the right plug even though the thrust forces on the shaft might be acting towards the left.

Of course, too strong a leftwards thrust on the shaft would cause the assembly of sleeves, and the shaft, to move to the left, but, so long as the leftwards thrust forces are reasonably tight, even in a case where the thrust force might alternate in direction, the assembly of sleeves remains axially completely stationary, i.e with effectively zero slack clearance in the axial direction.

Thus, the arrangement of FIG. 14 provides a highly effective and reliable seal between the pumped process fluid to the left and the atmosphere to the right. FIG. 14 provides also a bearing for the pump shaft in which the journal bearing is stable and free of slack clearance under reversals of journal loading, and in which the thrust bearing is also stable and free of slack clearance even under reversals of thrust loading.

If, for some reason, a failure should occur, whereby the pressure of the barrier-liquid should fall off, some slack clearance might then develop in the bearing, but that failure-clearance can be kept to a minimum by allowing only a small free play (e.g 0.003 to 0.005 inch (0.8 to 1.2 mm) measured axially) between the two plugs 152, 153.

The FIG. 14 arrangement is self contained, the barrier-liquid being isolated from the process fluid by means of the mechanical seal 147, and from the atmosphere by the seal 148. If the right seal 148 should leak, that fact can be determined by inspection. If the left seal 147 should leak, that fact can be determined by checking the level of liquid in the reservoir 136, in that the barrier-liquid will leak into the process if the seal 147 should fail.

The pressure of the barrier-liquid in the left high-pressure chamber 139 is set by the pressure regulators 143. The pressure of the process fluid may be measured, and the regulator 143 may be of the kind that can be set so as to automatically keep the pressure in the chamber 139 always a few psi higher than the process pressure. Then, the security of containment of the process fluid is very high, which is advantageous in the case where the process fluid is toxic.

Alternatively, when the process fluid is a food-stuff, for example, the key factor is that the barrier-liquid should not leak into the process fluid, rather than vice versa. In that case, the regulator 143 can be set to keep the barrier-liquid always a few psi lower than the process, whereby, if the seal 147 should start to leak, the volume of the barrier-liquid would then increase—a fact which can be easily detected.

Thus, simply by detecting changes in pressure and volume, which can easily be done automatically, the integrity of the arrangement of FIG. 14 as a seal is virtually completely assured. Of course, that is not to say that a failure could never occur, but it is suggested that the seal reliability is very high, as that term is understood in the context of the current state of pump seal expertise.

It is noted that the mechanical seals 147, 148 themselves may be protected from excess pressure differentials by automatically regulating the chamber pressure to be different from the process pressure by only a small magnitude. Furthermore, it is noted that the mechanical seals are also protected from mechanical vibration by the almost-immovable bearing capability of the FIG. 14 arrangement.

It may be noted that in FIG. 14 the bearing is situated very close to the impeller, and to the mechanical seals; this may be contrasted with the layout of a conventional pump, wherein the bearings are situated outside the shaft seals, i.e at a location that would be several inches to the right in the view corresponding to FIG. 14. In a conventional pump, the impeller lies at the end of a long, vibration-prone overhang of the shaft. This inherent aspect of conventional pumps is the cause, so often, of premature failures of mechanical seals in conventional pumps.

FIG. 15 shows the impeller mounted on the left-end of the shaft. FIG. 15 also shows a connection between the high-pressure chambers, whereby both chambers are at the same pressure. As mentioned, such equalisation would not necessarily be preferred.

FIG. 16 shows the seal/bearing arrangement similar to that of FIG. 14 incorporated into a mag-drive pump, i.e a pump of the type in which the pump impeller is driven via a magnetic drive coupling. Mag-drive pumps are used in cases where the process fluid being pumped is so toxic that dynamic (i.e rubbing) seals—which cannot be relied upon not to leak—cannot be tolerated. In such a mag-drive pump, the impeller and its associated shaft and bearings are enclosed inside a hermetically enclosed housing. The housing is sealed using only static (i.e non-rubbing) seals, the drive being transmitted through the walls of the housing by means of the magnetic drive coupling.

Although mag-drive pumps do adequately address the problem of seals that cannot be allowed to leak, and are mandatory in some applications or that reason, the abiding problem with a conventional mag-drive pump is that the bearings of the impeller shaft are immersed in the process fluid. Generally, process fluids of the kind that are so toxic that they cannot be allowed to leak even in small traces, often make poor lubricants. As a result, the applicability of mag-drive pumps has been restricted to those few applications where the (toxic) process liquid has enough lubricity to support conventional bearings. The bearing problem is especially difficult in that the impeller shaft is completely isolated mechanically from the motor drive shaft, and the impeller shaft bearings must therefore in themselves be capable of supporting all the thrust and journal loads that may be experienced by the impeller shaft.

As shown in FIG. 16, these problems are much reduced when the seal/bearing arrangement described in relation to FIG. 14 is applied to a mag-drive pump.

The impeller shaft 160 is keyed to the inner portion 163 of the magnetic coupling 165. The outer portion 169 of the coupling is keyed to the drive shaft 170, which is intended to be driven by the usual electric motor (not shown) and which is supported in its own bearings 172. A shell 174 is unitary with the pump housing 176, and prevents the leakage of any liquid whatsoever through the coupling to the surroundings.

In FIG. 16, the tapered sleeves are provided as previously described. The barrier-liquid is conveyed into and out of the chambers within the seal/bearing via passageways 178, 179. The pressures and volumes of the barrier-liquid, and of the process fluid, if required, can be measured and regulated, and all adjustments made, from outside.

By this FIG. 16 arrangement, the impeller of a mag-drive pump runs in bearings that are very firmly supported. Also, the bearings remain uncontaminated by process fluid. The FIG. 16 arrangement still maintains the mag-drive characteristic of the cannot-possibly-leak integrity of containment.

In FIG. 16, the magnets of the inner portion 163 of the coupling run in air, which may be contrasted with a conventional mag-drive pump in which the inner magnets run in the process liquid. Mechanically, this is an advantage, because the liquid inevitably must impose some drag due to liquid shear—in fact, considerably more drag than running the same components in air. Also, transmitting the magnetic flux through air is more efficient than doing the same through a liquid.

In FIG. 17, only the left stator sleeve 180 is axially floating. That sleeve abuts against a plug 183, which is sealed by an O-ring 185 to the housing 187. The plug 183 is axially floating also, and is forced rightwards by the pressure of the process fluid. The plug in turn urges the left sleeve 180 rightwards, thereby loading the taper, and enabling the development of the hydrodynamic film, as previously described.

In FIG. 17, the low pressure chamber 189 lies at the right end of the (fixed) right stator sleeve, and the high pressure chamber 190 lies at the left end of the (floating) left stator sleeve 180. The grooves in both stator sleeves are arranged to pump the barrier-liquid leftwards.

In FIG. 18, the floating left sleeve 192 is sealed to the housing, and the barrier-liquid pressure acts to press the floating left sleeve rightwards. If the barrier-liquid pressure is set greater than the process pressure, the plug 194 abuts leftwards against the circlip 195.

FIG. 19 shows an assembly 200 which is itself a pump. The pumped liquid output of the pump is at high pressure, although this type of pump is only capable of delivering a small volumetric flow rate. The purpose of the pump is to deliver high pressure at a low or static flow rate, the main benefit of the pump being that no high pressure seals are required.

In FIG. 19, both the left and right stator sleeves 203, 205 are fixed and both the rotor sleeves 207, 208 can float axially. The rotor sleeves are driven by a drive tube 210, which is keyed to the shaft 212.

The liquid to be pumped is drawn in at the axial extremities. The liquid is pumped, by the grooves, towards the centre, into the high-pressure chamber 214, and out through the discharge pipe 216.

The pressure in the chamber 214 serves to load both the two tapers. A spring 218 serves to bias the floating sleeves into their tapers, and holds the floating sleeves in place even if the pressure in the chamber 214 drops off.

The shaft 212 serves only to transmit torque to the pump rotor sleeves. The tapered sleeves provide journal bearing capacity, but not thrust bearing capacity, and separate arrangements should be made to locate the shaft axially.

FIGS. 20 and 20A show a sub-assembly 304, comprising a one-piece sleeve 320 and two separate outer sleeves 306, 308. The one-piece sleeve 320 has two tapered surfaces in which are machined respective spiral grooves. The grooves are of opposite hand, as shown. The direction of the grooves, and the direction of rotation of the shaft 324 are such that barrier liquid entering the inlet chamber 325, between the two tapered surfaces, is pumped axially by the action of the grooves to left and right, towards and into the outlet chambers 327, 328.

From there, the liquid is collected and conveyed via conduits 340, 342 to a barrier liquid control station 345. At the station, the pressures in the two outlet chambers are monitored and regulated (according to preset parameters). Normally, it will be an aim of the designer that the pressure across the two mechanical seals 346, 347 in the sub-assembly be kept small; however, since the pressure beyond the left seal 346 (the process pressure) is generally greater than the pressure beyond the right seal 347 (atmospheric pressure) the pressures in the two outlet chambers 327, 328 will need to be set differently.

The sub-assembly 304, as shown in FIG. 20, can be manufactured and sold as an integrated unit, including the control station 345. The station includes a barrier liquid leakage detector (for detecting an increase or a decrease in the volume of the barrier liquid). and various pressure sensors and regulators, including a sensor for sensing the process pressure via passage 348. The station 345 may be set to regulate the pressure in the outlet chamber 327 as a set value, or as a proportion of the process pressure, or otherwise as may be deemed desirable.

It may be noted that the subassembly as shown in FIG. 20 is very much self-contained, and ready to use. To make the unit operational, a pump housing 350 (FIG. 20A) is machined with a suitable bolt-face, and a shaft 324 is provided of a suitable diameter. The unit is simply slipped over the shaft, the housing bolted up, and the securing grub screws 352 tightened (access being had through a plugged hole in the housing). Very little is needed by way of careful attention or skilled craftsmanship for the mechanical set-up (which, by contrast, often is demanded with other types of seal/bearing systems).

FIG. 21 shows a similar unit, ready for installation, except that in FIG. 21 the two tapered sections are grooved in the same sense. Now, the barrier liquid is fed into the inlet chamber 360 at the right and is pumped towards the high pressure outlet chamber 362 to the left.

In FIG. 21, the shaft is cut away or relieved, at 364, in order that any slight burrs caused by the action of the grub screws will not tear the O-ring seals 365 in the sleeve.

Also in FIG. 21, there is provided a means for adjusting the slack clearance of the bearing. A fine thread is cut in the end of the housing 367, and a threaded plug 368 is engaged therein, and tightened to the desired clearance. The plug is locked in place by means of a lock 369.

FIG. 22 shows two of the sealing/bearing units installed on the same shaft, with a nominal rotary machine 370 mounted therebetween. It may be arranged that thrust forces on the shaft are shared between the two bearings, whereby both are locked to the shaft. Alternatively. it will often be the case that thrust is supported only by the one bearing, in which case the sleeve of the other bearing is free to float axially along the shaft.

Rotary machines that will benefit from the as-described type of sealing/bearing system include the following, in addition to the impeller pumps referred to above.

Positive-displacement pumps

Double-suction pumps

Multi-stage pumps

Reciprocating gas compressors

Screw compressors

Centrifugal compressors

Alternators and Generators

Blowers

Rotors, both vertical and horizontal

Rollers

Thin film evaporators

Marine stern glands

Self lubricating shaft support bearings

Mixers and agitators

In addition to the above driven machines, the system may be used with such driver machines as:

Diesel engines

Gasoline engines

Turbines: gas, steam, water.

The system may be used generally with pulleys and pulley shafts, where the high journal capacity is an advantage. On the other hand, the general sturdiness and shock resistance of the system make the system suitable for unsteady loading applications too. Applications which find special advantage are those, like impeller pumps, where a shaft carries a considerable weight or mass on a large overhang, especially where the overhang is caused by the need to accommodate, in line, the separate seal and bearing which have been required hitherto. The system permits the overhang to be reduced. This can often be reflected as a reduction in the shaft diameter. Making the shaft smaller is usually very advantageous from the cost standpoint, because all the other components mounted on the shaft can be smaller.

FIG. 23 shows an impeller pump and a drive motor in an assembly of conventional layout. The motor 403 rests on a fixed frame 405, as does the impeller housing 407, and the bearing housing 409. In smaller installations, the bearings may be housed in an extension of the impeller housing 407, but the separate housing 409 to provide support for the bearings often is needed in large pump installations.

FIG. 24 shows the comparable installation using the invention. The motor 403 is the same length, and the impeller housing is the same length, but now there is no need to provide room for the shaft bearings. The journal and thrust bearing requirements of the shaft are taken by the seal/bearing assembly located in the impeller housing 410, as described. FIG. 24 requires a shorter shaft, and a shorter frame, and is cheaper and lighter.

The following is a summary of some of the advantages that are aimed for in one or more of the exemplary embodiments of the invention.

As compared with a pump which has a conventional stuffing-box seal, or mechanical seals, and conventional bearings, shaft overhang is eliminated as a problem. A pump impeller is a heavy item; in the conventional pump, the bearings have to be separated from the heavy impeller by at least the axial length of the stuffing box or mechanical seal, plus room for access thereto. Thus the bearings may be several inches away from the impeller. This overhang causes vibrations, especially under cavitation, etc. and these vibrations can damage the seal. As the bearings wear, slack develops, which exacerbates the vibration problem.

In the invention, the seal/bearing unit may be closely adjacent to the heavy impeller. The tendency for vibration is much reduced. So small is the vibration problem that the shaft may be of considerably reduced diameter, and shaft diameter is a critical aspect of economy in designs of rotary machinery. No other bearings, besides the seal/bearing assembly as described, need be provided. The shaft overall length between the motor and the impeller may be reduced, which again eases the vibration problem.

The unit may be self-compensating for wear of the tapered surfaces, both as to thrust and journal bearing support, whereby the vibration problem remains negligible throughout a long service life.

The invention also permits a great reduction in the risk of the process fluid leaking to atmosphere. When the process liquid is toxic, it has been conventional to provide inboard and outboard seals, and to provide a pressurised barrier liquid, between the two seals; if the pressure of the barrier liquid is kept higher than the process pressure, any leakage of the inboard seal causes barrier liquid to leak into the process, not vice versa. But the problem then is the high pressure outboard seal to atmosphere. By contrast, the unit as described may produce a higher pressure than the process, and yet the outboard end of the unit need be at no more than atmospheric pressure. The pressure is generated progressively along the length of the groove. The conventional pressurised barrier also, of course, required an external source of pressure.

In the units as described, the barrier liquid, upon being pumped by and through the groove, flows over the tapered surfaces and through the groove at a steady flow rate. The flow is volumetrically large enough to allow a good circulation of the barrier liquid, to allow heat to be taken out of the liquid, and also dirt and debris etc. The flow is unidirectional, and substantially without back-flow, which means that all the liquid is circulated, and not just a by-pass proportion. The flow is large enough that changes in the flow rate, liquid levels, temperatures, pressures, etc. can be detected quickly and easily, for monitoring and control purposes.

One of the common causes of failure in pump installations is corrosion following an ingress of moisture into the pump shaft bearings. In the designs as described, the bearing is combined with the seal, and the bearing is constantly swept by the barrier liquid; whereby the opportunity for external moisture to enter the bearing, and cause corrosion, is largely non-existent.

FIG. 27 shows a version of the taper-sleeve seal/bearing assembly, which is particularly applicable to installations where the shaft is vertical. Now, the weight of the impeller, the shaft, and the other rotating components, are all experienced as a thrust force on the shaft. The double-taper design is, as mentioned, easily able to accommodate the thrust forces. To make sure the shaft cannot move vertically, once it has been adjusted, a screw-thread 450 is provided on the shaft 451, and a lock nut 452 ensures that the double-taper sleeve 453 cannot move relative to the shaft 451. Especially in the case where the shaft hangs vertically, the grub screws 456 might not be seen as adequate to hold the shaft against thrust forces.

FIG. 25 shows a version of the taper-sleeve seal/bearing assembly, in which many of the components are provided as a subassembly or cartridge. That is to say, the components shown in FIG. 25 are finish-manufactured and preassembled, under factory conditions, and then shipped, as a cartridge, for installation as a repair in an already-existing pump. Alternatively, the cartridge type of construction is often very convenient also in the manufacture of new pumps.

In FIG. 25, the two rotor-sleeves, with spiral grooves, are machined onto the rotor component 420. The two stator-sleeves 423, 425 are separate, but are held together axially over the rotor by means of springs 427. The cartridge comprising the rotor component, the two stator sleeves, and the springs, can be simply pushed into the annular space between shaft and housing, as shown. O-rings 429 seal the stators to the housing.

Grub screw 430 locks the rotor component to the shaft 432. The stator sleeves are not locked axially to the housing—the apparatus shown in FIG. 25 is for use when the shaft has other means (thrust bearings) for supporting the shaft against axial movement.

FIG. 25A shows the corresponding apparatus where the stator-sleeves 435, 436 are fixed into the housing, and the rotor-component 438 can slide axially along the shaft. As mentioned, these units (FIGS. 25, 25A) are not arranged to support thrust forces by themselves.

The shaft 432 includes a separate thrust bearing. This is not shown in FIG. 25, but may be of conventional design. Usually, at least in the case of impeller pumps, the thrust bearing function is combined with a journal bearing structure. FIG. 23 shows a typical arrangement of the bearings on the shaft. The apparatus shown in FIGS. 25 or 25A serves as a very secure journal bearing, and it might be considered that this journal bearing might "fight with" the journal bearing inside the housing 409, unless the two bearings are absolutely co-axial land remain absolutely co-axial throughout the service life.) In fact, sometimes "fighting" cannot be ruled out, which is why the FIG. 24 arrangement is preferred (apart from the saving, in FIG. 24, of space and expense).

But sometimes the FIG. 23 arrangement is pre-existing and has to stay; but in such cases the overhang is generally so great that whipping of the overhanging shaft is a major problem: any tendency of the bearings to "fight" is more than overcome by the fact that the impeller end of the shaft is now prevented from whipping, and from run-out, due to impeller imbalance, etc—prevented, that is to say, more or less perfectly and completely, in most cases.

Thus, the addition of an extra journal bearing from the sleeves apparatus is far more likely to be beneficial than otherwise.

On the other hand, generally another thrust bearing on the shaft would not be acceptable, which is why the assemblies of FIGS. 25 and 25A, despite having good journal capabilities, are deliberately isolated from thrust forces.

In FIG. 26, the thrust situation is a little different. Here, the stator 440 is fixed into the housing. The two rotor-sleeves 442, 443 are each capable of sliding on the rotor-sleeve 445, but both are biassed by springs that react against abutments on the sleeve. Therefore, the assembly of FIG. 26 is self-centering axially. Sometimes, this is the best form of axial or thrust force-application for the installation.

As depicted in other drawings, when there are no other thrust bearings on the shaft, sometimes the best mode of controlling axial displacement and thrust forces is in the spring-one-way-solid-other-way mode, as illustrated in FIG. 3 for example. The designer may wish to cater for the fact that a cavitation in the process fluid could cause an unpredictable force on the impeller the force being directed to the right in FIG. 3), and arrange to resist that sudden, violent, force solidly. On the other hand, the forces pushing the impeller shaft to the left due to normal running are much more predictable, and less violent, and can be resisted by spring biassing.

FIG. 26 is suitable when the thrust forces are light, and not subject to sudden violent variations.

FIG. 27 shows a further contemplated embodiment of the invention wherein, for balance purposes, the right cone geometry defined by the interface between the first pair of rotor and stator sleeves is different than the right cone geometry defined by the interface between the second pair of rotor and stator sleeves.

As shown in FIG. 29, the pump housing 460 which will receive the cartridge simply needs to be machined with a straight-through bore 462. A wide variety of pump housings are found suitable for the installation of the cartridge, when all that need be done to the housing is the machining of a straight-through bore. Apart from the bore itself, the end 463 of the housing has to be faced and provided with bolt holes 465, but that is simple enough: nothing else is required—not even O-ring grooves, those being provided in the outer diameter of the cylinder 467 of the cartridge.

Often, a pump housing such as 460 is provided already with a port 468 for the connection of a hydraulic line, and this port can be utilised, if present, for conveying the barrier liquid from the high pressure chamber 469, as shown in FIG. 29. The corresponding port for conveying the liquid to the low pressure chamber is built into the cylinder 467. In cases where the port is not present in the housing, the ports for conveying the barrier liquid in and out of the chambers may both be provided in the cylinder, for example in an arrangement as shown in FIG. 30.

In FIGS. 28–30, the outer sleeves are located against rotation by means of pegs 470 which are locked into a flange 472 of the cylinder 467. In addition to their function as ant-rotation means, the pegs 470 may be factory-adjusted for depth, in order to lock in the desired amount of axial slack or free-play into the sleeves.

FIG. 31 shows a seal/bearing cartridge 530, which is intended for fitment, as a pre-assembled contained unit, into the stator housing of a pump or other machine. The cartridge 530 includes a drive shaft 532, which is attached, via a coupling (not shown), to an electric motor at its left end, and to the rotary impeller of the pump at its right end.

The shaft 532 is formed with an integral collar 534. Alternatively, the collar may be separate, and may be clipped into a groove cut in the shaft, and secured therein against axial and rotational movement relative to the shaft.

Two tapered sleeves 536, 538 are keyed to the collar 534, so as to rotate with the shaft 532. The shaft and sleeves are assembled into a stator housing, as shown, which is bolted into the housing of the pump, or other machine.

The assembly as shown serves as a highly effective and secure seal; although no engineered seal can be regarded as absolutely safe against leaks, the seal is a zero-emission seal as that term is understood in pump terminology. This is advantageous when the process fluid being pumped is toxic.

In addition, the assembly as shown has a robust capability as both a journal and a thrust bearing. The electric motor should be connected via a coupling of the type that relieves the shaft 532 of any forces due to the motor and its mountings, apart from the drive torque from the motor. The assembly practically eliminates run-out and the effects of misalignment, and the short overhang of the impeller, at the right end, means that the effects of any vibrations due to imbalance are negligible.

As shown in FIG. 32, barrier liquid may be fed, during operation, into the entry chamber 540 at the left end of the cartridge, via conduit 543, substantially at ambient pressure. The barrier liquid emerges, under pressure, into the exit chamber 545, and is returned via conduit 547.

The pressure in conduit 547, and hence the pressure in the exit chamber 545 is regulated to a pressure that is just a few psi higher than the pressure in the process fluid being pumped: if the process pressure rises, so does the pressure in the exit-chamber 545. This ensures that the pressure-differential across the mechanical seal 549 remains at a low magnitude.

The tapered surfaces 560, 562 of the sleeves are formed each with a respective spiral groove.

Barrier liquid (e.g water) is drawn into the left end of the taper, and is driven by the spiral groove to the right, through both tapers. Upon reaching the right end, the pressurised barrier liquid is collected, and returned for recirculation.

The unit as shown in self-contained as to seals and bearings. The shaft is coupled at its left end to a torque drive, and no bearings are required on the shaft, to the left. The tapered sleeves provide all the thrust and journal bearing capacities that may be needed.

The unit is very compact, especially in the axial direction, compared with conventional impeller pumps, and yet has a highly reliable shaft seal, and a high capacity shaft bearing.

The apparatuses shown in the accompanying drawings and described below are examples which embody the invention. It should be noted that the scope of the invention is defined by the accompanying claims, and not necessarily by specific features of exemplary embodiments.

The apparatus shown in FIG. 34 represents where a connecting rod 620 is connected to a crankshaft 623 via a big-end bearing 625, and to a piston 627 via a little-end bearing 629.

Lubricant liquid is fed via internal passageways in the crankshaft from a reservoir (not shown) outside the crankshaft to the centres of the crank pins 630. The lubricant emerges through holes in the crank pins.

Fitted around the crank pin is a double-tapered sleeve 632. The lubricant from the crank pin passes out through corresponding holes 634 in the sleeve 632. The tapered surfaces of the sleeve are provided each with a spiral groove. When the sleeve rotates, the groove drives the lubricant along itself, creating pressure in the lubricant. The grooves are arranged so that during forward rotation of the engine the lubricant is pumped from the centre to the edges of the big-end bearing.

The sleeve 632 is in two parts, which clamp together around the crank-pin 630. The complementary female sleeves 636, (which are plain on their tapered surfaces) are also in two halves, clamped around the male sleeve 632. The big end of the con-rod also is in two halves, whereby the whole bearing is held together around the crank-pin.

The lubricant emerges from the ends of the tapered sleeves, and passes through thrust washers 638, and then out.

A passageway 640 leads up the connecting rod 620 to the little end. The tapered sleeves there are not in two halves, but are otherwise similar to the big end sleeves.

It will be understood that the pressure of the lubricant within the bearing is generated actually in and by the spiral grooves. Therefore, there is no need for the lubricant to be supplied under a high pressure. Some slight pressure can be applied to ensure the bearing does not run dry, but basically, the bearing runs on a hydrodynamic film between the tapered surfaces, and that film is maintained under a high lubricant pressure, but no external source is required to supply a hydrostatic pressure.

Similarly, the lubricant in the passageway 640 is at zero, or only nominal, pressure. The lubricant is drawn into the little end bearing by the action of the spiral groove drawing liquid into itself.

One benefit of the fact that the pressure is generated actually within the bearing is that the demands are much reduced for the lubricant to be oily and to have high viscosity. In many cases, the lubricant may be water.

In FIG. 35, a single-cylinder air compressor 720 includes a piston 723 reciprocating in a cylinder 724. A connecting rod 725 has a big-end bearing connection 726 with the crank-pin 727 of a crankshaft 729. The crankshaft has main bearing connections 730 with a housing 732.

It may be noted that although the rotating components of a compressor must be properly located in place against axial movement, the axial (i.e thrust) forces on the components are usually not high. The arrangement of mating tapered sleeves, with a spiral groove formed in the rotor sleeve, preferably should only be required to support a limited thrust-support capability, but this is usually all that is needed in the reciprocating machine situation.

The big-end bearing 726 (see also FIG. 36) includes a pair of male sleeves 734, keyed to the crank-pin 727 at 737, and a pair of female sleeves 736, keyed to the connecting rod 725 at 739. Springs 738 urge the male sleeves 734 apart, and thereby urge the female sleeves 736 against the thrust washers 740.

The male sleeves 734 of the big-end bearing 726 are each tapered as to their outer surfaces, and are each formed with a respective spiral groove on the said outer surfaces. The complementary inside surfaces of the female sleeves are plain. The male and female sleeves are lapped to each other during manufacture. During operation of the compressor, the male sleeves rotate with the crank-pin, and the female sleeves rotate with the connecting rod.

The main bearings 730 (see also FIG. 37) also have corresponding male and female sleeves, keyed to the shaft and housing, as shown. Springs 743 keep the main bearing components biassed into contact with each other.

In operation of the compressor, lubricant liquid enters the inlet chamber 747. From there, the lubricant is pumped by the action of the spiral groove into the chamber 749. Mechanical seals 750 maintain the pressurised lubricant in the chamber 749. So long as the seals 750 substantially hold the pressure, it does not matter if the seals leak somewhat, since the leaking lubricant simply drains back to the sump 752.

The pressurised lubricant then passes inwards into the drilling 754 in the crankshaft, and thence to the crank-pin 727. From there, the lubricant passes in similar fashion to the left main bearing, where it is pressurised further, the pressure being set by means of pressure regulator 756, and is then returned to the sump 752.

The lubricant also passes to the big-end sleeves, as shown. In passing through the big-end sleeves, the pressure of the lubricant is again raised therein. From the big-end bearing, the lubricant passes through the pressure regulator 758 and thence to the little-end bearing 760. The little-end bearing may again be of the tapered sleeve type, or may be plain: the duty on the little end is much less than on the main or the big-end bearings.

A conventional compressor has plain bearings, which have to be lubricated with high-viscosity oil. Also, conventionally, the oil has to be fed to the bearings under high pressure, which requires an oil pump. In a typical reciprocating machine, with conventional running clearances of 0.1 mm or so in the (plain) bearings, the oil had to be supplied to the bearing at a hydrostatic pressure of 50 psi or more. At the running clearances in the compressor as described, the fit between the two sleeves is much smaller. Although the magnitude of the pressure generated hydrodynamically by the spiral groove depends, to some extent, on the viscosity of the lubricant liquid, it usually turns out that the hydrodynamic pressure generated by the groove in the tapered sleeve is high enough that even low viscosity lubricants can be used. In many cases, the lubricant can be water, or at least water mixed with a trace of oil.

The benefits of using water as the lubricant include the relatively easy disposability of dirty lubricant, and the safety enhancement due to the absence of droplets of oil in the compressed air, which can cause explosions.

As described, the sleeves have to be urge together, male to female, into intimate contact. If a clearance gap should open up between the lapped surfaces, pressure would be lost. Therefore, the designer should see to it that the surface remain pressed tightly together at all times. The designer might arrange for the pressure generated by the groove to act on one of the sleeves, urging it into deeper contact with the other sleeve. Or, the designer might arrange for a spring to urge the male and female sleeves into deeper contact. Or, the designer might arrange for the generated pressure to hold the sleeves together during normal running, and for a light spring to press them together during start-up.

When the sleeves are supporting thrust bearing loads, the nature of the thrust bearing load should be borne in mind. If the thrust force is acting in a direction to drive the sleeves apart, the means holding the sleeves together, whether that be the generated pressure or the spring (or both), must be greater than the thrust force tending to burst the sleeves apart. Once the sleeves break apart, the spiral groove cannot generate pressure: the designer should see to it, if the generated pressure is the means being used to hold the sleeves together, that the thrust force (including any momentary peak) is always below a threshold that is low enough that the sleeves stay together. Preferably, the means used to bias the sleeves together are springs, the biassing force from which should be great enough to ensure the sleeves stay together under normal thrust conditions. With springs, even if the sleeves should momentarily separate during peaks of thrust loading, whereby pressure generation is lost, the sleeves immediately come together again, and pressure generation recommences. The heavier the spring force, the more thrust force the sleeves can support without breaking apart: however, the heavy springs mean that in times when the thrust force is small, or acts the other way, the more force is experienced by the sleeves, and some rubbing wear may then take place, especially during start-up.

However, the hydrodynamic film that, during running, becomes established between the male and female mating surfaces is very robust, and so quite heavy excesses of thrust force driving the sleeves together can be accommodated before the film breaks down.

The seal-bearing cartridge assembly 820 shown in FIGS. 38a, 38b includes a mounting sleeve 823. The mounting sleeve 823 (shown by itself in FIGS. 39a, 39b) is formed with a cylindrical tube portion 825, and an end-flange 827. The mounting sleeve 823 is intended for mounting (see FIG. 41) the cartridge 820 on the drive-shaft 824 of a rotary pump. The sleeve 823 is secured in place on the shaft, against axial and rotary movement relative to the drive-shaft, by means of grub-screws 829. A groove 830 receives an O-ring, for sealing the sleeve 823 to the drive-shaft.

The cartridge 820 includes a male tapered-sleeve 832 (FIGS. 39b, 40b), and a complementary female tapered sleeve 834 (FIGS. 39c, 40c). The male sleeve 832 is provided, on its outward-facing conical surface, with a helical, spiral groove (see FIG. 40b). The purpose of the groove is as explained in Ramsay. The mating conical surfaces of the tapered sleeves are formed as a matched pair, lapped to each other, so as to be in intimate contact over substantially the whole axial length of the tapered surfaces.

The components are assembled together as shown in FIG. 38c. The female tapered sleeve 834 is placed on the mounting sleeve 823. A mechanical seal is provided in the female sleeve. This takes the form of a sealing ring 836, made of carbon or other material suitable for rubbing-type mechanical seals. The surface of the end-flange 827 against which the ring 836 rubs during operation is manufactured to a high surface finish. The ring 836 is biased by a spring 838, and sealed with an O-ring, as shown, with respect to the female sleeve.

The male tapered sleeve 832 is secured to the mounting sleeve 823 by means of grub screws 840. The adjustment of the position of the male sleeve 832 is carried out in-factory, and in fact may be done under conditions of tight inspection and quality control. The male sleeve is pressed to the right until the conical surfaces of the two sleeves are making intimate contact, and the spring 838 is compressed to the correct design load. Then, the grub screws 840 are tightened.

The assembled cartridge 820, having been manufactured, assembled, and set, all with in-factory precision, is suitable to be packed, stored, transported, and sold. The purchaser is required only to ensure that the pump housing 843 (FIG. 41) is bored out to a suitable plain-cylindrical diameter 845, and that a key-way or the like 847 is provided, suitable for receiving the anti-rotation peg 848 provided in the female sleeve 834. After that, the purchaser needs only to slide the cartridge 820 along the drive-shaft 824, and lock the grub screws 829 to the shaft. There is no need for the purchaser to secure the female sleeve to the housing: the female sleeve can be left to float axially in the housing.

The purchaser does not need to make any adjustments or settings to the cartridge, prior to or during assembly, or at least none that would be critical to the operation of the seal-bearing unit. The factory-adjusted position of the male sleeve relative to the mounting sleeve, which is critical to the operation, is not lost or affected by the assembly of the cartridge into the pump. Only the grub screws 829 need be tightened, and that task requires only a modest degree of skill and attention.

As described in RAMSAY, the tapered-sleeves-with-spiral-groove arrangement provides a seal of excellent performance and reliability. Barrier liquid is supplied to the intake chamber 849 (FIG. 41) leading to the start of the spiral groove, as described. The bearing capacity in the journal or radial mode is very large, considering the envelope, and is inexpensive.

In the set-up as shown in FIG. 41, the cartridge cannot support thrust or axial forces. Other provisions must be made (for instance, by means of thrust bearings in the electric motor driving the pump) for supporting such thrust forces as may be present in the shaft.

It will be noted that since the cartridge is positioned very close to the impeller (not shown in FIG. 41, but affixed to the right end of the drive shaft) the impeller overhang is very small, which means that the rotating impeller has an excellent likelihood of running freely, without vibration.

Provision is made for barrier liquid to be collected in the outlet chamber 50 of the spiral groove. From there, the barrier liquid, under pressure, is conveyed away, via conduit 854, to pressure regulator 856 and then back to the intake chamber 849 via conduit 852.

FIG. 42 shows a cartridge having a double-sleeve configuration of the tapered sleeves. The cartridge has been installed in a pump, but again the cartridge is fully manufactured, assembled, and adjusted in-factory. In FIG. 42, the tapered sleeves are held in position relative to the mounting sleeve by means of an abutment piece 858.

FIGS. 43a, 43b, 43c are side elevations showing the components of the FIG. 42 cartridge. FIG. 43d shows the mounting sleeve.

FIG. 44 shows a rotary impeller-type pump 920. The shaft 923 is driven by a conventional electric motor, and the shaft is mounted in conversional bearings, which support the shaft against journal and thrust loads.

A rotor sleeve 925 is made fast to the shaft by means of grub screws 927. The sleeve has a tapered outer surface 929, in which is cut a spiral groove 930.

A stator sleeve 932 is formed with a tapered internal surface 934 (which is plain, i.e not grooved). The surfaces 929, 934 are provided as a matched pair, lapped together during manufacture. A mounting sleeve 936 is made fast with the pump housing 938, and the stator sleeve 932 is mounted for axial sliding in and relative to the mounting sleeve. A spring 939 urges the sliding stator sleeve 932 in the direction to press the surfaces 929, 934 together.

Barrier liquid (e.g. water) is supplied to an inlet chamber 940 via a port 943, and the spiral groove 930 is so arranged that when the motor turns the shaft 923, the entry mouth of the groove receives liquid from the chamber 940, and pumps or conveys the liquid along the groove to an outlet chamber 945. The chamber 945 is one with the main chamber 947 of the pump 920, i.e the chamber in which the process fluid is being impelled.

During operation, the force pressing the two surfaces 929, 934 together is derived, first, from the spring 939, and second, also from the pressure acting on the end face 949 of the sliding stator sleeve 932. This pressure is the pressure in the chamber 945. The chamber 945 contains the barrier liquid pumped through the spiral groove 930, but contains also the process fluid from the chamber 947.

Thus the pressure in the chamber 945 is dictated by the pressure in the process chamber 947. Some process systems run at consistently high pressure, almost up to the pressure capability of the pump, while other systems run at pressures barely above ambient.

In addition to the system-to-system differences in nominal pressure, the system operating pressure may vary, due to varying outside conditions downstream or upstream of the pump.

The spiral groove conveys or pumps barrier liquid into the chamber 945 so long as the pressure in the chamber 945 is less than a threshold or breakdown pressure. This breakdown pressure is a factor of the speed of rotation, the cross-section and length of the groove, the viscosity of the barrier liquid. etc., and it is a feature of the technology described in RAMSAY that this breakdown pressure can be very high—high, that is to say, in the context of impeller pumps, e.g considerably higher than any pressure that can possibly be achieved in the pump chamber by the action of the impeller.

Even so, however, when the process pressure is high, the force acting on the sliding sleeve, to urge the surfaces 929, 934 together, can become too high, in that the hydrodynamic film created between the surfaces can start to break down; not necessarily over the whole interface, but in local spots, whereby metal-to-metal rubbing contact starts to occur. This contact can serve to rub off the high spots of the mating surfaces, and thus can be beneficial, but generally the contact is to be avoided.

Also, in some systems, it can happen that operators might switch off the pump while there is still a high pressure in the process chamber. As the shaft stops rotating, the pressure derived from the spiral groove drops to zero, and if at that time the sliding stator sleeve 932 is being pushed into the rotor sleeve 925 with undiminished force, the hydrodynamic film is likely to break down. Then, metal to metal contact will occur—as the shaft slows down, but before the shaft stops—and a great deal of rubbing wear can take place during that time.

The hydrodynamic film created between the surfaces 929, 934 is quite robust, however, if the surfaces are kept pushed together with a not-too-excessive force. During normal running, the sliding stator sleeve 932 is pushed back, against the process pressure and against the spring 939, by the pressure generated by the action of the spiral groove, and the film thickness is established at an equilibrium level. A consequence of the sleeve 932 being slidable is that the interface can find its own equilibrium clearance.

If the sleeve is not pushed hard enough, however, the pressure generated in the spiral groove might push the surfaces apart so strongly that a hydrodynamic film cannot bridge the clearance. In that case, the interface between the surfaces 929, 934 would start to allow the process fluid to leak through, even though the process pressure was quite small.

Thus, it is desirable that when the process pressure is high, the force acting to press the surfaces 929, 934 together should also be high. Causing the sliding sleeve to be exposed to the process pressure, in the manner as shown, is a convenient way of achieving this aim, whereby the force on the sleeve is proportional to the process pressure.

In pumping systems where the pressure varies during operation, and a high pressure in the process chamber is encountered only rarely, the designer does not mind if the force on the sleeve goes quite high when the process pressure goes high. However, if the system is set to run with the process pressure at the high level continually, that amount of force applied continually to the sleeve can be too high, whereby excess wear would take place.

Thus, the designer should ensure the force pressing the interface together is neither too high nor too low, since difficulties can be encountered in both states.

Thus, the designer desires to be able to adjust the ratio of force to pressure, i.e the level of force acting on the sliding sleeve as a proportion of the process pressure. If the designer knows the process pressure is going to be continually high in a given system, he will wish to reduce the area of the sliding sleeve, i.e the area of the end face 949 of the sliding sleeve that is exposed to the process pressure.

Reducing the area of the end face 949 means, in practical terms, reducing the outer diameter of the end face. In many cases, it is desired to reduce the diameter of the end face to a dimension that is less than the overall diameter of the sliding sleeve 932. That is to say, in effect, that it is desired that the outer form of the sliding sleeve be stepped.

The provision of the mounting sleeve 936 means that the sliding sleeve 932 can indeed be stepped. The designer sets the diameter of the step such that the amount of force on the sleeve for a given process pressure is suited to the normal operating pressure in the process chamber. If the normal process pressure is high, he makes the diameter of the step such that the area of the end face 949 is low. If the normal process pressure is low, he increases the diameter of the step, to make the area of the end face greater.

The sub-assembly comprised of the mounting sleeve 936 and the sliding sleeve 932 (and its mating rotor sleeve 925) can be tailored to a particular operating pressure at which the pump is to be operated. The prospective user can specify his operating pressure, and then be supplied with a sleeve sub-assembly unit in which the step diameter is tailored to that pressure.

Without the separate mounting sleeve for the sliding sleeve, it would be difficult to tailor the sliding sleeve so that only a suitable fraction of the area of the end face was exposed to the process pressure.

FIG. 45 shows another pump system, in which a seal 952 is located between the chamber 945 and the process chamber 947. Now, the pressure in the chamber 945 is set by the setting of the pressure relief valve connected to port 954, and the pressure in the chamber 945 can be higher (or lower) than the process pressure. Thus, when the pump is switched off, even if the process pressure remains high, the setting of the relief valve can be allowed to drop at a rate that complements the rate of drop-off of the pressure generated by the spiral groove, whereby the sleeves interface never experiences a heavy contact force.

In this case, it can still be advantageous to tailor the exposed area of the sliding sleeve to the prevailing operating pressure. In order to ensure a long service life for the mechanical seal 952, the pressure relief valve may be set to automatically follow the pressure in the process chamber, whereby the differential pressure felt by the seal 952 remains low or even zero.

FIG. 46 shows a double-opposed taper-sleeve arrangement, in which each one of the two sliding taper-sleeves is provided with its own respective mounting sleeve. Again, the step diameter can be tailored to give a desired pressure-force relationship. The relationship need not be the same for each sleeve.

The structure shown in FIG. 46 can serve as a self-contained replacement component or sub-assembly for a pump. The pump impeller is attached to one end of the included shaft, and the other end being attached to the usual drive coupling and motor. No further bearings are needed for the shaft, because the double-opposed taper-sleeves arrangement provides self-contained journal and thrust bearing capability for the shaft.

FIG. 47 shows the structure of FIG. 46 built into a magnetic-drive pump. Mag-drive pumps are for use with process fluids which are so dangerous that no leakage can be tolerated. One of the problems of conventional mag-drive pumps is that the impeller shaft bearings are exposed to the process fluid. In FIG. 47, the impeller shaft bearings are isolated from the process fluid. If the process fluid does leak into the bearing area, in FIG. 47, perhaps the bearings will deteriorate, but the presence of the leak can be detected (by monitoring the barrier liquid) and at least the process fluid remains sealed against leakage into the environment.

It may be noted that in a mag-drive pump, the journal forces on the impeller shaft are very small, assuming the impeller to be properly balanced; and the thrust forces can be expected to be predominantly unidirectional. Thus, the demands on the impeller shaft bearings of a mag-drive pump are minimal.

FIG. 48 is a cross-section of another seal/bearing apparatus that embodies the invention.

When a radial or journal force is applied to the double-sleeve bearing-seal apparatus, the radial force gives rise, because of the taper angle, to an induced axial force. It can be envisaged that this induced axial force on the sleeves might cause them to tend to burst apart.

Therefore, the designer must see to it that the means provided for holding the sleeves in contact (that is to say, in hydrodynamic-film-separated contact) is strong enough to resist such separation. This can be rather awkward sometimes, particularly if the apparatus is subjected to sudden violent journal loads. If the sleeves are held in contact by springs, for example, the springs have to be very heavy, which can promote excess wear, during start-up or shut-down, for example. If the sleeves are held in contact by pressure in the exit-chamber, such pressure is not present of course during start-up and shut-down.

The sleeves may be held together by solid links; that is to say, the two rotor-sleeves may be solidly linked together as a rotor sub-assembly, and the two stator-sleeves may be solidly linked together as a stator sub-assembly. Now, the sleeves cannot burst apart, but the problem here is with the axial clearance built into the pairs of sleeves. If the thrust on the apparatus is loading to the right, the first pair of sleeves go in contact, and if the thrust reverses and pushes to the left, the contact must now be between the second pair of sleeves. So, if the clearance is too large, there will be a gap between the two conditions, whereby, in a neutral-thrust situation, neither film would be established, and the barrier-liquid would leak out; if the clearance is too small, both films may be compromised by being constrained to be too thin.

FIG. 48 indicates a solution to this potential difficulty. A third pair of sleeves, i.e a third rotor-sleeve 959 and a third stator-sleeve 960, are included, in addition to the first pair 962,963 and the second pair 964, 965. The two stator-sleeves 962, 964 of the first and second pairs are solidly linked together, as are the first and second rotor-sleeves 963, 965. The clearance between the rotors of the first and second pairs can be set by means of the screw adjustment ring 967. In FIG. 48, this clearance may be large, whereby, under thrust-neutral conditions, neither the first pair nor the second pair would be in proper hydrodynamic contact: the clearance condition as illustrated in FIG. 48. Now, the apparatus is still securely sealed, because the third pair 959, 960 are still loaded together by the spring 969. The third pair is isolated from thrust induced separation, and so the third pair remain under spring-induced contact at all times.

In this specification, reference has been made to rotary shafts having, and not having, bearings. These conditions are defined as follows.

The rotary shaft is in with-thrust-bearing configuration, when:
the apparatus includes a fixed frame;
the apparatus includes a thrust-bearing, having a thrust-bearing-interface;
the thrust-bearing-interface is for transmitting axial forces acting on the rotary shaft to the fixed frame, and for mechanically constraining axial movement of the rotary shaft relative to the frame in response to such forces;
the thrust-bearing-interface is defined by a shaft-surface which is operatively unitary with the rotary shaft, in combination with a corresponding frame-surface which is operatively unitary with the fixed frame;
at the thrust-bearing-interface, the said surfaces face each other in an axial sense, and are held apart from direct contact by anti-friction means and;
the said surfaces that define the thrust-bearing-interface are co-axial with, but are physically and structurally separate from, the inter-acting tapered surfaces of the sleeves.

From the foregoing, it will be observed that numerous variations and modifications may be effected without departing from the spirit and scope of the invention. It is to be understood that no limitation with respect to the specific apparatus illustrated herein is intended or should be inferred. It is intended to cover by the appended claims all such modifications as fall within the scope of the claims.

The rotary shaft is in a without-thrust-bearing configuration, when:
the apparatus includes a fixed frame and;
the rotary-shaft is, in substance, free from any thrust-bearing that is physically and structurally separate from the inter-acting tapered surfaces of the sleeves, being a thrust-bearing for transmitting axial forces acting on the rotary shaft to the fixed frame and for mechanically constraining axial movement of the rotary shaft relative to the frame in response to such axial forces.

What is claimed is:

1. A rotary interaction apparatus, comprising:
a first set of components including a stator and a rotor adapted for rotation about an axis, the first rotor and stator components having facing surfaces which together define a first interface between them, the interface being of a first tapered configuration;
a first entry chamber for receiving a supply of barrier-liquid;
one of the facing surfaces defining the first interface provided with a first spiral groove, having an entry-mouth in liquid-flow communication with the first entry-chamber, and having an exit-mouth in liquid-flow communication with a first exit chamber;
the first-spiral groove disposed as to define plain lands of substantial width between adjacent turns of the first-spiral-groove, the lands creating and supporting a hydrodynamic film of barrier-liquid between the facing surfaces of the first set of components;
a second set of components including a stator and a rotor adapted for rotation about said axis, the second rotor and stator components having facing surfaces which together define a second interface between them, the second interface being of a second tapered configuration;
a second entry chamber for receiving a supply of barrier-liquid;
a second exit-chamber, and a channel for conveying barrier-liquid present in the second exit-chamber out of the second exit-chamber;
one of the facing surfaces defining the second interface provided with a second spiral groove, having an entry-mouth in liquid-flow communication with the second entry chamber, and having an exit-mouth in liquid-flow communication with the second exit-chamber;
the second-spiral-groove disposed as to define plain lands of substantial width between adjacent turns of the second-spiral-groove, the lands creating and supporting a hydrodynamic film of barrier-liquid between the facing surfaces of the second set of components;
the first and second sets of components are arranged in the apparatus with the first and second tapered interfaces thereof in a co-axial, spaced apart position along said axis, the first-exit chamber is in liquid-flow communication with the second-entry chamber, to form a combined intermediate chamber; and
by their rotational sense, the two spiral grooves create a serial pumping action for conveying barrier-liquid in the first-entry chamber towards and into the intermediate chamber, and from the intermediate chamber towards and into the second-exit chamber.

2. The apparatus of claim 1, wherein the first and second tapered interfaces each have a respective narrow-end and a wide-end;
said ends of the interfaces arranged along the axis sequentially in the order: first interface wide-end, first interface narrow end, second interface narrow-end, second interface wide-end.

3. The apparatus of claim 1, wherein the first and second tapered interfaces each have a respective narrow-end and a wide-end;
said ends of the interfaces arranged along the axis sequentially in the order: first interface narrow-end, first interface wide-end, second interface wide-end, second interface narrow-end.

4. The apparatus of claim 1, wherein:
the apparatus includes a rotary machine;
the rotary machine includes a rotary-shaft, on which the first and second rotor components are carried;

the rotary machine includes a non-rotary housing, in which the first and second stator components are carried;

and the two sets of components are configured for sealing the rotary-shaft with respect to the housing.

5. The apparatus of claim 1, wherein:

the apparatus includes a rotary machine;

the rotary machine includes a rotary-shaft, on which the first and second rotor components are carried;

the rotary machine includes a non-rotary housing, in which the first and second stator components are carried;

and the two sets of components are configured as a bearing for guiding and constraining the rotary-shaft for rotation in the housing.

6. The apparatus of claim 5, wherein the machine is a pump for pumping process fluid, and the apparatus includes a fluid seal between the second exit chamber and a process chamber of the plump, the process chamber of the pump containing the process fluid.

7. The apparatus of claim 6, including a sensor for measuring the pressure of the process fluid, and control for regulating the pressure of the barrier-liquid in the exit chamber to a difference above the process fluid pressure.

8. The apparatus of claim 5, wherein the machine is a pump for pumping process fluids, and the second exit-chamber is open to a process chamber of the pump, whereby the barrier-liquid conveyed from the second exit chamber is conveyed into the process fluid.

9. The apparatus of claim 5, wherein said first and second set of components form a journal bearing.

10. The apparatus of claim 5, wherein said first and second sets of components form a combined journal and thrust bearing.

11. The apparatus of claim 1, wherein:

one of the components in one of the sets of components is axially slidable;

the apparatus includes a biasing spring, which spring is so arranged in the apparatus as to urge the slidable component towards the other component of the one set of components.

12. The apparatus of claim 1, wherein:

one of the components in the second set of components is axially slidable;

the apparatus being so disposed that the slidable component is exposed to pressure in the exit-chamber;

whereby the slidable component is urged to slide towards the other component of the second set of components by pressure in the exit-chamber.

13. The apparatus as claimed in claim 1, wherein:

the first and second rotor components are both fixed to a rotary shaft, and constrained against axially sliding along the rotary-shaft;

the first and second stator components both being axially slidable in a direction along the rotary shaft;

the apparatus includes at least one stator spring for applying force to the slidable stator components in a direction to increase interface contact.

14. The apparatus as claimed in claim 1, wherein:

the first and second rotor components are both axially slidable along a rotary-shaft;

the apparatus includes at least one rotor spring for applying force to the slidable rotor components in a direction to increase interface contact;

the first and second stator components are both fixed to the housing in that both are constrained against axial sliding relative to the housing.

15. The apparatus of claim 1, wherein the facing surfaces define the first interface as a first right cone, having a first cone-angle and the facing surfaces define the second interface as a second right cone, having a second cone-angle, and the first and second cone-angles are different.

16. The apparatus of claim 1, wherein:

the interface defined by the facing surfaces of at least one of the sets of components includes a relatively small plain area into which the spiral grooves do not extend, and in which both facing surfaces are plain and complimentary.

17. The apparatus of claim 1, wherein:

the apparatus includes a rotary-machine being a pump for pumping process fluid;

the pump having an impeller for pumping the process fluid, the impeller mounted on a rotary shaft within a housing;

the impeller and the rotary shaft are contained in an isolation-chamber;

the isolation chamber is a chamber in the housing of the pump, whose walls are totally enclosing, having no rotary shafts passing through the walls;

the apparatus includes a driver for transmitting drive torque to the rotary shaft through the walls of the chamber indirectly, by remote-acting force;

the first and second rotor components are carried by the rotary shaft;

and the first and second stator components are carried by the walls of the isolation chamber.

18. The apparatus of claim 1, wherein:

the apparatus includes a rotary machine including a crank shaft and a connecting-rod; and the first and second rotor components are carried by a crank-pin of the crank shaft, and the first and second stator components are carried by a big-end of the connecting-rod.

19. The apparatus of claim 1, wherein the axial lengths of the first and second rotor components are different.

* * * * *